United States Patent
Tsuji

(10) Patent No.: US 7,633,658 B2
(45) Date of Patent: Dec. 15, 2009

(54) COLOR CONVERSION DEFINITION METHOD, PROFILE PRODUCTION METHOD, COLOR CONVERSION DEFINITION APPARATUS, PROFILE PRODUCTION APPARATUS, COLOR CONVERSION DEFINITION PROGRAM STORAGE MEDIUM, AND PROFILE PRODUCTION PROGRAM STORAGE MEDIUM

(75) Inventor: Tetsuya Tsuji, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 637 days.

(21) Appl. No.: 11/068,108

(22) Filed: Mar. 1, 2005

(65) Prior Publication Data
US 2005/0206926 A1    Sep. 22, 2005

(30) Foreign Application Priority Data
Mar. 17, 2004 (JP) ............... 2004-075538

(51) Int. Cl.
*G06F 15/00* (2006.01)
*G06F 1/00* (2006.01)
*G03F 3/08* (2006.01)
*G06K 9/00* (2006.01)

(52) U.S. Cl. ............ 358/518; 358/1.9; 382/167

(58) Field of Classification Search ............ 358/1.1, 358/1.9, 500, 518; 382/162, 167
See application file for complete search history.

(56) References Cited

U.S. PATENT DOCUMENTS

| | | | | |
|---|---|---|---|---|
| 5,553,199 | A | * | 9/1996 | Spaulding et al. ............ 358/1.9 |
| 5,699,491 | A | * | 12/1997 | Barzel ......................... 358/1.9 |
| 2003/0189716 | A1 | * | 10/2003 | Tsuji et al. .................... 358/1.9 |

FOREIGN PATENT DOCUMENTS

| | | |
|---|---|---|
| JP | 9-83824 A | 3/1997 |
| JP | 2001-103329 A | 4/2001 |
| JP | 2004-7373 A | 1/2004 |
| JP | 2004-102489 A | 4/2004 |
| JP | 2005-268982 | 9/2005 |

* cited by examiner

*Primary Examiner*—King Y Poon
*Assistant Examiner*—Ming Hon
(74) *Attorney, Agent, or Firm*—Sughrue Mion, PLLC

(57) ABSTRACT

In a color conversion definition process, first, a profile of a virtual device having a color reproduction range that well simulates a color reproduction range of a printing system is produced. A first color conversion is then defined so as to convert a coordinate point in a color reproduction range of a printer expressed in a first RGB color space to a coordinate point in the color reproduction range of the virtual device expressed in a second RGB color space dependent on the virtual device. A second color conversion is then defined so as to convert a coordinate point in the color reproduction range of the virtual device expressed in the second RGB color space to a coordinate point in the color reproduction range of the printing system expressed in the CMYK color space. The resultant coordinate point represents a color very similar to a color represented by the printing system.

8 Claims, 39 Drawing Sheets

| | $R_2$ $G_2$ $B_2$ | C M Y K | $L^*$ $a^*$ $b^*$ |
|---|---|---|---|
| W | 255 255 255 | 0 0 0 0 | $L^*w$ $a^*w$ $b^*w$ |
| | $255 \times \frac{9}{10}$ 255 255 | 10 0 0 0 | $L^*_{11}$ $a^*_{11}$ $b^*_{11}$ |
| ↓ | $255 \times \frac{8}{10}$ 255 255 | 20 0 0 0 | $L^*_{12}$ $a^*_{12}$ $b^*_{12}$ |
| | $255 \times \frac{7}{10}$ 255 255 | 30 0 0 0 | $L^*_{13}$ $a^*_{13}$ $b^*_{13}$ |
| | ⋮ ⋮ ⋮ | ⋮ ⋮ ⋮ ⋮ | ⋮ ⋮ ⋮ |
| C | 0 255 255 | 100 0 0 0 | $L^*_C$ $a^*_C$ $b^*_C$ |

Fig. 20

| | $R_2$ $G_2$ $B_2$ | C M Y K | $L^*$ $a^*$ $b^*$ |
|---|---|---|---|
| C | 0 255 255 | 100 0 0 0 | $L^*_C$ $a^*_C$ $b^*_C$ |
| | 0 255 $255 \times \frac{9}{10}$ | 100 0 10 0 | $L^*_{21}$ $a^*_{21}$ $b^*_{21}$ |
| ↓ | 0 255 $255 \times \frac{8}{10}$ | 100 0 20 0 | $L^*_{22}$ $a^*_{22}$ $b^*_{22}$ |
| | 0 255 $255 \times \frac{7}{10}$ | 100 0 30 0 | $L^*_{23}$ $a^*_{23}$ $b^*_{23}$ |
| | ⋮ ⋮ ⋮ | ⋮ ⋮ ⋮ ⋮ | ⋮ ⋮ ⋮ |
| G | 0 255 0 | 100 0 100 0 | $L^*_G$ $a^*_G$ $b^*_G$ |

Fig. 21

| | $R_2$ $G_2$ $B_2$ | C M Y K | L* a* b* |
|---|---|---|---|
| R ↓ K | 255　0　0 | 0　100　100　0 | $L^*_R$　$a^*_R$　$b^*_R$ |
| | $255 \times \frac{9}{10}$　0　0 | 0　100　100　10 | $L^*_{31}$　$a^*_{31}$　$b^*_{31}$ |
| | $255 \times \frac{8}{10}$　0　0 | 0　100　100　20 | $L^*_{32}$　$a^*_{32}$　$b^*_{32}$ |
| | ⋮　⋮　⋮ | ⋮　⋮　⋮　⋮ | ⋮　⋮　⋮ |
| | $R_P$　0　0 | 0　100　100　Kparam | $L^*_{3P}$　$a^*_{3P}$　$b^*_{3P}$ |
| | ⋮　⋮　⋮ | { BLANK } | ⋮　⋮　⋮ |
| | $255 \times \frac{2}{10}$　0　0 | | $L^*_{3m}$　$a^*_{3m}$　$b^*_{3m}$ |
| | $255 \times \frac{1}{10}$　0　0 | | $L^*_{3n}$　$a^*_{3n}$　$b^*_{3n}$ |
| | 0　0　0 | 100　100　100　Kmax | $L^*_k$　$a^*_k$　$b^*_k$ |

| | $R_2$ | $G_2$ | $B_2$ | C | M | Y | K | $L^*$ | $a^*$ | $b^*$ |
|---|---|---|---|---|---|---|---|---|---|---|
| W ↓ ↓ ↓ C | 255 | 255 | 255 | | | | | $L^*_W$ | $a^*_W$ | $b^*_W$ |
| | $255 \times \frac{9}{10}$ | 255 | 255 | | | | | $L^*_{111}$ | $a^*_{111}$ | $b^*_{111}$ |
| | $255 \times \frac{8}{10}$ | 255 | 255 | | BLANK | | | $L^*_{112}$ | $a^*_{112}$ | $b^*_{112}$ |
| | $255 \times \frac{7}{10}$ | 255 | 255 | | | | | $L^*_{113}$ | $a^*_{113}$ | $b^*_{113}$ |
| | ⋮ | ⋮ | ⋮ | | | | | ⋮ | ⋮ | ⋮ |
| | 0 | 255 | 255 | | | | | $L^*_C$ | $a^*_C$ | $b^*_C$ |

Fig. 29

| $R_2$ | $G_2$ | $B_2$ | C | M | Y | K | $L^*$ | $a^*$ | $b^*$ |
|---|---|---|---|---|---|---|---|---|---|
| 255 | 255 | 255 | 0 | 0 | 0 | 0 | $L^*_W$ | $a^*_W$ | $b^*_W$ |
| $255 \times \frac{9}{10}$ | $255 \times \frac{9}{10}$ | $255 \times \frac{9}{10}$ | | | | | $L^*_W \times \frac{9}{10} + L^*_K \times \frac{1}{10}$ | $a^*_W \times \frac{9}{10} + a^*_K \times \frac{1}{10}$ | $b^*_W \times \frac{9}{10} + b^*_K \times \frac{1}{10}$ |
| ⋮ | ⋮ | ⋮ | \{ BLANK \} | | | | ⋮ | ⋮ | ⋮ |
| 0 | 0 | 0 | 100 | 100 | 100 | Kmax | $L^*_k$ | $a^*_k$ | $b^*_k$ |

Fig. 30

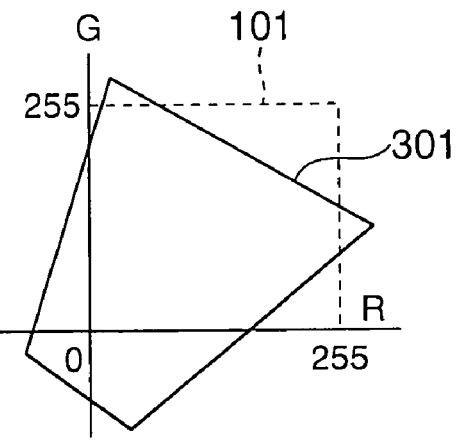
Fig.32(A) 1st RGB COLOR SPACE
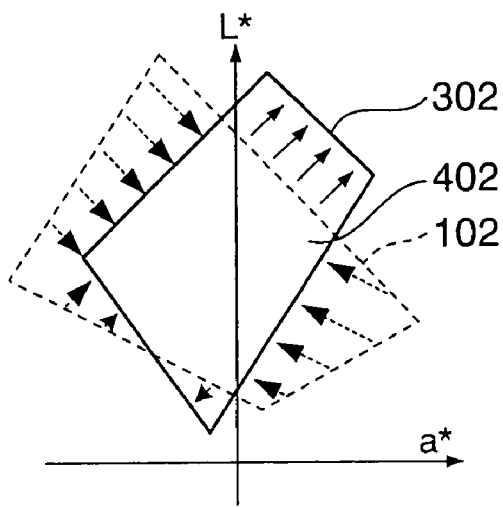
Fig.32(B) L*a*b* SPACE
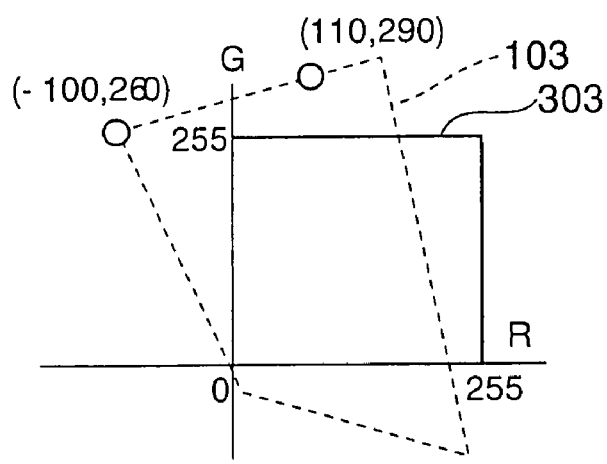
Fig.32(C) 2nd RGB COLOR SPACE

COLOR CONVERSION DEFINITION METHOD, PROFILE PRODUCTION METHOD, COLOR CONVERSION DEFINITION APPARATUS, PROFILE PRODUCTION APPARATUS, COLOR CONVERSION DEFINITION PROGRAM STORAGE MEDIUM, AND PROFILE PRODUCTION PROGRAM STORAGE MEDIUM

BACKGROUND OF THE INVENTION

1. Field of the Invention

The present invention relates to a color conversion definition method and a color definition apparatus that define a conversion from a coordinate point in a color reproduction range of a device (for example, printer) intervening between image data and an image to a coordinate point in a color reproduction range of a printing system, wherein the coordinate point in the color reproduction range of the device is expressed in a three-dimensional color space (RGB color space) having a R (red) axis, a G (green) axis and a B (blue) axis, dependent on the device (printer), and wherein the coordinate point in the color reproduction range of the printing system is expressed in a four-dimensional color space having a C (cyan) axis, a M (magenta) axis, a Y (yellow) axis and a K (black) axis. The present invention also relates to a color conversion definition program storage medium which stores a color conversion definition program that is executed on an information processing apparatus such as a computer thereby allowing the information processing apparatus to operate as the color conversion definition apparatus. The present invention also relates to a profile production method and a profile production apparatus that produce a profile that defines the correspondence between different color spaces. The present invention also relates to a profile production program storage medium which stores a profile production program that is executed on an information processing apparatus such as a computer thereby allowing the information processing apparatus to operate as the profile production apparatus.

2. Description of the Related Art

An apparatus is known that performs high-quality color processing on image data representing an image to be printed, such that when CMY data representing a combination of density values of C, M, and Y (a coordinate point in a CMY color space) is given, CMYK data representing a combination of dot percentage values of C, M, Y and K printing plates (a coordinate point in the CMYK color space) is output (an example may be found, for example, in Japanese Unexamined Patent Application Publication No. 9-83824, which will be hereinafter refereed to as Patent Document 1).

The technique associated with the apparatus has been established, although some improvement is still being made. There are many skilled persons who can operate the apparatus to perform high-quality color processing (referred to as setup).

In recent years, with increasing popularity of color management techniques, there has arisen a need for a technique of producing high-quality CMYK data intended for use in printing in accordance with color data other than CMY data. A specific example is a need for printing an image in accordance with given RGB data representing combinations of R, G, and B values (coordinate points in the RGB color space) such that the printed image has colors very similar to colors of an image printed by a particular printer in accordance with the same RGB data.

When RGB data is converted to CMYK data, it is required that the resultant CMYK data should represent a color that is calorimetrically identical to a color represented by the RGB data, and furthermore the resultant CMYK data should be excellent in printability. One of important factors associated with printability is a K value. When RGB data is converted to CMYK data representing a calorimetrically equal color, the K value has to be determined depending on a printing company or a printing system (in accordance with a printing K plate constraint (or a K-value constraint)).

Even if RGB data can be converted to CMYK data that represents a calorimetrically equal color and that is excellent in printability, using some technique, the color represented in an image printed by a particular printer in accordance with the RGB data becomes the same as the color represented in an image output in accordance with the CMYK data only a particular region in which the color reproduction range of the printer and the color reproduction range of the printing system overlap each other. When the color reproduction range (defined by edges of a printer profile) of the printer is greatly different from the color reproduction range (defined by edges of a printing-system profile) of the printing system (the color reproduction range of the printing system is generally narrower than the color representing range of the printer), a technique is necessary that can convert the RGB data to CMYK data that represents a color tone that is vary natural and very similar to the color tone of an image printed by the printer in accordance with the RGB data. Such conversion is referred to as gamut mapping.

An excellent gamut mapping technique has been proposed (Japanese Unexamined Patent Application Publication No. 2001-103329, which will be hereinafter refereed to as Patent Document 2). In the technique disclosed in Patent Document 2, the direction of mapping is determined in a color space intended for use by a device (for example, a RGB color space dependent on the device), but actual mapping is performed in a reference color space such as a L*a*b* color space. Use of this technique makes it possible to achieve high calorimetric accuracy in a region close to the gray axis and also achieve representation of high saturation colors in a region close to the boundary surface of the color reproduction gamut.

However, the technique disclosed in Patent Document 2 cannot directly map RGB data to CMYK data including a K value. Therefore, to map RGB data to CMYK data used by a printing system, for example as disclosed in Japanese Patent Application No. 2002-331112, the mapping is performed via an intervening device which deals with RGB data and which has a color reproduction range substantially equal to the color reproduction range of the printing system. That is, first, gamut mapping based on the technique disclosed in Patent Document 2 is performed from input RGB data to RGB data dealt with by the intervening device, and then the resultant RGB data is converted in terms of color matching to CMYK data used in printing in accordance with the K-value constraint. In this conversion technique disclosed in Japanese Patent Application No. 2002-331112, it is necessary to actually prepare the intervening device having the color reproduction range very similar to the color reproduction range of the printing system. To avoid this problem, Japanese Patent Application No. 2002-261174 discloses a technique to convert data via a virtual intervening device without preparing an actual device. That is, input RGB data is first converted (gamut mapped) to RGB data of the virtual intervening device having a color reproduction range very similar to that of the printing system, and the resultant RGB data is then converted in terms of color matching to CMYK data used in printing by the printing system in accordance with the K-value constraint.

However, Japanese Patent Application No. 2002-261174 simply discloses an idea of use of a virtual intervening device having a color reproduction range very similar to that of the printing system. However, actual conversion from RGB data intended for use by a printer to CMYK data for use by a printing system is not so simple. The color reproduction range of RGB data is given by a regular hexahedron with eight vertices in which (R, G, B) can vary from (0, 0, 0) to (255, 255, 255) (in this specific example, the maximum value of R, G, and B is 255). Therefore, when the color reproduction range of RGB data is mapped, for example, into the L*a*b* color space, the resultant range in the L*a*b* color space also has eight vertices. In contrast, the color reproduction range of CMYK data has additional vertices corresponding to black (C, M, Y, K)=(100, 100, 100, 100), reddish black (C, M, Y, K)=(0, 100, 100, 100), greenish black (C, M, Y, K)=(100, 0, 100, 100), and bluish black (C, M, Y, K)=(100, 100, 0, 100) (where C, M, Y, and K represent in dot percentage values of C, M, Y, and K printing plates, and the maximum allowable value of dot percentage is 100), and thus the color reproduction range of CMYK generally has a greater number of vertices (typically eleven vertices) than the color reproduction range of RGB data. This means that the range mapped from the color reproduction range of RGB data dealt with by the printer is not the same as the color reproduction range of the printing system. Thus, it is necessary to well handle this difference. Furthermore, in the conversion technique disclosed in Japanese Patent Application No. 2002-261174, although the idea of use of a virtual intervening device having a color reproduction range very similar to that of the printing system is disclosed, no discussion is made on the specific profile of the virtual device. However, the applicability of the gamut mapping disclosed in Patent Document 2 greatly varies depending on the profile of the virtual device, and thus the definition of the profile of the virtual device is important.

In view of the above, an object of the present invention is to provide a color conversion definition method of defining conversion from a coordinate point (RGB data) in a color reproduction range of a device such as a printer, represented in a RGB color space dependent on the device to a coordinate point (CMYK data) in a color reproduction range of printing, represented in a CMYK color space of printing, such that RGB data dealt with by the device is converted to CMYK data that can be used in printing to obtain a printed image having colors very similar to colors of an image output by the device that deals with the original RGB data. Another object of the present invention is to provide a color conversion definition apparatus that defines conversion from RGB data to CMYK data according to the above method. Still another object of the present invention is to provide a color conversion definition program storage medium which stores a color conversion definition program that is executed on an information processing apparatus such as a computer whereby the information processing apparatus operates as the color conversion definition apparatus.

Another object of the present invention is to provide a profile production method of producing a profile that sufficiently well approximates the color reproduction range of printing without creating gray level distortion in gamut mapping. A still another object of the present invention is to provide a profile production apparatus that produces such a profile. It is a still another object of the present invention to provide a profile production program storage medium which stores a profile production program that is executed on an information processing apparatus such as a computer whereby the information processing apparatus operates as the profile production apparatus.

Another object of the present invention is to provide a profile production method of producing a link profile that defines the correspondence between RGB data and CMYK data such that a given K-value constraint is strictly satisfied on a gray axis and in a region close to the gray axis and such that high saturation colors can be represented. A still another object of the present invention is to provide a profile production apparatus that produces such a link profile. It is a still another object of the present invention to provide a profile production program storage medium which stores a profile production program that is executed on an information processing apparatus such as a computer whereby the information processing apparatus operates as that profile production apparatus.

SUMMARY OF THE INVENTION

The present invention has been made in view of the above circumstances and provides a color conversion definition method, a profile production method, a color conversion definition apparatus, a profile production apparatus, a color conversion definition program storage medium, and a profile production program storage medium. More specifically, in an aspect, the present invention provides a method of defining a color conversion from a coordinate point in a color reproduction range of a first device expressed in a first RGB color space dependent on the first device intervening between image data and an image to a coordinate point in a color reproduction range of printing expressed in a CMYK color space for use in printing, the method including the steps of: producing a virtual device profile between a second RGB color space and a reference color space, the second RGB color space being dependent on a virtual second device intervening between image data and an image, the virtual second device having a color reproduction range simulating the color reproduction range of printing; defining a first color conversion from a coordinate point in the first RGB color space within the color reproduction range of the first device to a coordinate point in the second RGB color space within the color reproduction range of the second device, based on a device profile of the first device and the virtual device profile produced in the virtual device profile production step; and defining a second color conversion from a coordinate point in the second RGB color space within the color reproduction range of the second device to a coordinate point in the CMYK color space within the color reproduction range of printing.

No technique is known that can convert data (RGB data) representing coordinate points in a color reproduction range expressed in the RGB color space dealt with by a device to data (CMYK data) representing coordinate points expressed in the CMYK color space dealt with by a printing system for a case in which the color reproduction range of the device that deals with RGB data is greatly different from the color reproduction range of the printing system that deals with CMYK data.

In this color conversion definition method according to the present invention, a virtual device profile having a color reproduction range simulating color reproduction range of printings is first produced. In the first color conversion definition step after the virtual device profile production step, using the virtual device profile, the first color conversion from an arbitrary coordinate point in the RGB color space dependent on the device (the first RGB color space dependent on the first device) to a coordinate point in the second RGB color space dependent on the second device having the same color reproduction characteristic (gamut) as that of printing can be defined with high accuracy, because the definition is made based on the high-accuracy virtual device profile produced in the virtual device profile step. In accordance with the two-stage color conversion definition including the first color conversion definition and the second color conversion definition, which is made in the second color conversion definition step after the first color conversion definition is made, in terms of conversion from an arbitrary coordinate point in the second RGB color space to a coordinate point in the CMYK color space, an arbitrary coordinate point in the first RGB color space dependent on the first device can be converted to a coordinate point (CMYK data) in the CMYK color space such that a printed image having colors highly similar to colors of an image output by the first device can be obtained in accordance with the resultant CMYK data. Note that although the color conversion definitions (including the first color conversion definition and the second color conversion definition) are made via the two steps, the two color conversion definitions may be combined together into a single color conversion definition.

In this color conversion definition method according to the present invention, preferably, the virtual device profile production step includes the step of defining a color reproduction range of the second device such that vertices of W, C, M, Y, R, G, and B in the color reproduction range of the second device coincide with corresponding vertices of W, C, M, Y, R, G, and B in the color reproduction range of printing, a ridgeline between any two vertices of W, C, M, Y, R, G, and B in the color reproduction range of the second device coincides with a ridgeline between two corresponding vertices in the color reproduction range of printing, a vertex of K in the color reproduction range of the second device is set at a point (C, M, Y, K)=(100, 100, 100, $K_{max}$) where $K_{max}$ is a maximum allowable value of K according to a K-value constraint, and ridgelines extend from the respective vertices of R, G, and B to the vertex of K of the color reproduction range of the second device in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100).

By defining the color reproduction range of the second device such that ridgelines other than ridgelines from R, G, and B to K are defined so as to exactly coincide with corresponding ridgelines in the color reproduction range of printing, and ridgelines from R, G, and B to K are defined in the above-described manner such that no problems due to the difference in the number of vertices occur, it is possible to obtain the color reproduction range substantially equal to the color reproduction range of printing.

Preferably, the virtual device profile production step further includes the steps of: producing a ridgeline profile in which coordinates on ridgelines in the color reproduction range of the second device in the second RGB color space are related to coordinates in the reference color space such that when points equally spaced from each other on an arbitrary boundary edge of the color reproduction range, defined in the color reproduction range definition step, of the second device in the second RGB color space are mapped onto the reference color space, the resultant mapped points in the reference color space are located on a ridgeline corresponding to the arbitrary boundary edge of the color reproduction range of the second device and spaced equally from each other; and calculating a profile in surface planes other than ridgelines and in the inside of the color reproduction range of the second device by means of interpolation in which the ridgeline profile produced in the ridgeline profile producing step is used as a boundary condition.

As mentioned above, in the ridgeline profile production step, the coordinate rearrangement is made such that when coordinate points on the edges (ridgelines) in the second RGB color space are mapped in the reference color space, the resultant mapped points on the ridgelines in the reference color space are spaced equally from each other (in other words, such that coordinates are mapped linearly). Thereafter, the profile in terms of surface planes other than ridgelines and in the inside of the color reproduction range of the second device is calculated by means of interpolation. Thus, high applicability of the gamut mapping technique disclosed in Patent Document 2 can be achieved, and thus it becomes possible to perform high-accuracy gamut mapping.

Preferably, the virtual device profile production step further includes the step of producing a gray axis profile in which coordinates on a gray axis in the color reproduction range of the second device in the second RGB color space are related to coordinates in the reference color space such that when points equally spaced from each other on the gray axis extending between two vertices of W and K in the color reproduction range, defined in the color reproduction range definition step, of the second device in the second RGB color space are mapped onto the reference color space, the resultant mapped points in the reference color space are located on a gray axis corresponding to the gray axis in the color reproduction range of the second device and spaced equally from each other, and in the profile calculation step, a profile of the color reproduction range of the second device, associated with surface planes other than ridgelines and in the inside of the color reproduction range other than gray axis is calculated by means of interpolation in which the ridgeline profile produced in the ridgeline profile producing step and the gray axis profile produced in the gray axis profile production step are used as a boundary condition.

By performing the calculation by means of interpolation in which in addition to the ridgeline profile, the gray axis profile produced in the gray axis profile production step, it becomes possible to calculate the profile having no shift of the gray axis.

In the color conversion definition method according to the present invention, the second color conversion definition step preferably includes the steps of: defining K values for each point on the gray axis and each point on ridgelines of the color reproduction range of the second device such that the K value for each point on the gray axis is determined in accordance with a K-value constraint in printing, while, for each point on the ridgelines, a minimum value of K values allowable in definition of coordinates in the CMYK color space is employed; calculating the K value for each point on the surfaces of the color reproduction range of the second device other than points on the ridgelines and the K value for each point in the inside of the color reproduction range of the second device other than points on the gray axis by means of interpolation in which the K values determined for respective points on the ridgelines and points on the gray axis are used as a boundary condition; and using a K-value constraint to define the second color conversion over the entire color reproduction range by referring to a profile of printing under the constraint of K values over the entire color reproduction range of the second device, including the K values defined in the K-value definition step and the K values calculated in the K-value calculation step.

Thus, by determining K values on the gray axis by directly employing K values determined in accordance with the K-value constraint of printing, and by determining K values on ridgelines by employing minimum K values within ranges that allow definition of coordinate points in the CMYK color space, it becomes possible to strictly satisfy the K-value constraint on the gray axis while it becomes possible to represent colors with high saturation by minimizing the K values in region close to the surface of the color reproduction range.

In another aspect, the present invention provides a first profile production method of producing a virtual device profile between a RGB color space and a reference color space, the RGB color space being dependent on a virtual device intervening between image data and an image, the virtual device having a color reproduction range simulating the color reproduction range of printing, the method including the step of defining a color reproduction range of the second device such that vertices of W, C, M, Y, R, G, and B in the color reproduction range of the device coincide with corresponding vertices of W, C, M, Y, R, G, and B in the color reproduction range of printing, a ridgeline between any two vertices of W, C, M, Y, R, G, and B in the color reproduction range of the device coincide with a ridgeline between two corresponding vertices in the color reproduction range of printing, a vertex of K in the color reproduction range of the device is set at a point $(C, M, Y, K) = (100, 100, 100, K_{max})$ where $K_{max}$ is a maximum allowable value of K according to a K-value constraint, and ridgelines extend from the respective vertices of R, G, and B to the vertex of K of the color reproduction range of the device in such a manner that they first extend from the respective vertices of R, G, and B to midpoints along respective ridgelines toward vertices $(C, M, Y, K) = (0, 100, 100, 100)$, $(C, M, Y, K) = (100, 0, 100, 100)$, and $(C, M, Y, K) = (100, 100, 0, 100)$, and further extend from the respective midpoints to the vertex of K set at $(C, M, Y, K) = (100, 100, 100, K_{max})$ deviating from the ridgelines toward $(C, M, Y, K) = (0, 100, 100, 100)$, $(C, M, Y, K) = (100, 0, 100, 100)$, and $(C, M, Y, K) = (100, 100, 0, 100)$.

In this first profile production method according to the present invention, by defining the color reproduction range of the device such that ridgelines other than ridgelines from R, G, and B to K are defined so as to exactly coincide with corresponding ridgelines in the color reproduction range of printing, and ridgelines from R, G, and B to K are defined in the above-described manner such that no problems due to the difference in the number of vertices occur, it is possible to produce the profile having the color reproduction range substantially equal to the color reproduction range of printing.

Preferably, the first profile production method further includes the steps of: producing a ridgeline profile in which coordinates on ridgelines in the color reproduction range of the device in the RGB color space are related to coordinates in the reference color space such that when points equally spaced from each other on an arbitrary boundary edge of the color reproduction range, defined in the color reproduction range definition step, of the device in the RGB color space are mapped onto the reference color space, the resultant mapped points in the reference color space are located on a ridgeline corresponding to the arbitrary boundary edge of the color reproduction range of the device and spaced equally from each other; and calculating a profile in surface planes other than ridgelines and in the inside of the color reproduction range of the device by means of interpolation in which the ridgeline profile produced in the ridgeline profile producing step is used as a boundary condition.

As mentioned above, in the ridgeline profile production step, the coordinate rearrangement is made such that coordinates on ridgelines in the RGB color space are linearly mapped on ridgelines in the reference color space, and then the profile in terms of surface planes other than ridgelines and in the inside of the color reproduction range of the device is calculated by means of interpolation. Thus, high applicability of the gamut mapping technique disclosed in Patent Document 2 can be achieved.

Preferably, the first profile production method according to the present invention further includes the step of producing a gray axis profile in which coordinates on a gray axis in the color reproduction range of the device in the RGB color space are related to coordinates in the reference color space such that when points equally spaced from each other on the gray axis extending between two vertices of W and K in the color reproduction range, defined in the color reproduction range definition step, of the device in the RGB color space are mapped onto the reference color space, the resultant mapped points in the reference color space are located on a gray axis corresponding to the gray axis in the color reproduction range of the device and spaced equally from each other, and in the profile calculation step, a profile of the color reproduction range of the device, associated with surface planes other than ridgelines and in the inside of the color reproduction range other than gray axis is calculated by means of interpolation in which the ridgeline profile produced in the ridgeline profile producing step and the gray axis profile produced in the gray axis profile production step are used as a boundary condition.

By performing the calculation by means of interpolation in which in addition to the ridgeline profile, the gray axis profile produced in the gray axis profile production step, it becomes possible to calculate the profile having no shift of the gray axis.

In another aspect, the present invention provides a second profile production method producing a link profile defining a conversion from a coordinate point in a color reproduction range of a device expressed in a RGB color space dependent on the device intervening between image data and an image to a coordinate point in a color reproduction range of printing expressed in a CMYK color space for use in printing, the method including the steps of: defining K values for each point on the gray axis and each point on ridgelines of the color reproduction range of the device such that the K value for each point on the gray axis is determined in accordance with a K-value constraint in printing, while, for each point on the ridgelines, a minimum value of K values allowable in definition of coordinates in the CMYK color space is employed; calculating the K value for each point on the surfaces of the color reproduction range of the device other than points on the ridgelines and the K value for each point in the inside of the color reproduction range of the device other than points on the gray axis by means of interpolation in which the K values determined for respective points on the ridgelines and points on the gray axis are used as a boundary condition; and using a K-value constraint to produce the link profile over the entire color reproduction range of the device by referring to a profile of printing under the constraint of K values over the entire color reproduction range of the device, including the K values defined in the K-value definition step and the K values calculated in the K-value calculation step.

In this second profile production method according to the present invention, because K values on the gray axis are determined by directly employing K values determined in accordance with the K-value constraint of printing, the K-value constraint can be strictly satisfied.

In this second profile production method according to the present invention, because K values on ridgelines are determined by employing minimum K values within ranges that allow definition of coordinate points in the CMYK color space, it is possible to achieve beautiful representation also for colors with high saturation.

In another aspect, the present invention provides a color conversion definition apparatus on which the above-mentioned color conversion definition method according to the present invention is implemented. That is, the present invention provides a color conversion definition apparatus that defines a color conversion from a coordinate point in a color reproduction range of a first device expressed in a first RGB color space dependent on a first device intervening between image data and an image to a coordinate point in a color reproduction range of printing expressed in a CMYK color space of printing, the color conversion definition apparatus including: a profile production section that produces a virtual device profile between a second RGB color space and a reference color space, the second RGB color space being dependent on a virtual second device intervening between image data and an image, the virtual second device having a color reproduction range simulating the color reproduction range of printing; a first color conversion definition section that defines a first color conversion from a coordinate point in the first RGB color space within the color reproduction range of the first device to a coordinate point in the second RGB color space within the color reproduction range of the second device, based on a device profile of the first device and the virtual device profile produced in the virtual device profile production section; and a second color conversion definition section that defines a second color conversion from a coordinate point in the second RGB color space within the color reproduction range of the second device to a coordinate point in the CMYK color space within the color reproduction range of printing.

Note that any color conversion definition apparatus on which any aspect of color conversion definition method according to the present invention is implemented falls within the scope of the present invention.

In another aspect, the present invention provides a first profile production apparatus on which the first profile production method is implemented. That is, the present invention provides a first profile production apparatus that produces a virtual device profile between a RGB color space and a reference color space, the RGB color space being dependent on a virtual device intervening between image data and an image, the virtual device having a color reproduction range simulating a color reproduction range of printing, the apparatus including a color reproduction range definition section that defines a color reproduction range of the virtual device such that vertices of W, C, M, Y, R, G, and B in the color reproduction range of the device coincide with corresponding vertices of W, C, M, Y, R, G, and B in the color reproduction range of printing, a ridgeline between any two vertices of W, C, M, Y, R, G, and B in the color reproduction range of the device coincide with a ridgeline between two corresponding vertices in the color reproduction range of printing, a vertex of K in the color reproduction range of the device is set at a point $(C, M, Y, K)=(100, 100, 100, K_{max})$ where $K_{max}$ is a maximum allowable value of K according to a K-value constraint, and ridgelines extend from the respective vertices of R, G, and B to the vertex of K of the color reproduction range of the device in such a manner that they first extend from the respective vertices of R, G, and B to midpoints along respective ridgelines toward vertices $(C, M, Y, K)=(0, 100, 100, 100)$, $(C, M, Y, K)=(100, 0, 100, 100)$, and $(C, M, Y, K)=(100, 100, 0, 100)$, and further extend from the respective midpoints to the vertex of K set at $(C, M, Y, K)=(100, 100, 100, K_{max})$ deviating from the ridgelines toward $(C, N, Y, K)=(0, 100, 100, 100)$, $(C, M, Y, K)=(100, 0, 100, 100)$, and $(C, M, Y, K)=(100, 100, 0, 100)$.

Note that any profile production apparatus on which any aspect of the first profile production method according to the present invention is implemented falls within the scope of the present invention.

In another aspect, the present invention provides a second profile production apparatus on which the second profile production method is implemented. That is, the present invention provides a second profile production apparatus that produces a link profile defining a conversion from a coordinate point in a color reproduction range of a device expressed in a RGB color space dependent on the device intervening between image data and an image to a coordinate point in a color reproduction range of printing expressed in a CMYK color space of printing, the apparatus including: a K-value definition section that defines K values for each point on the gray axis and for each point on ridgelines of the color reproduction range of the device such that the K value for each point on the gray axis is determined in accordance with a K-value constraint in printing, while, for each point on the ridgelines, a minimum value of K values allowable in definition of coordinates in the CMYK color space is employed; a K-value calculation section that calculates a K value for each point on the surfaces of the color reproduction range of the device other than points on the ridgelines and a K value for each point in the inside of the color reproduction range of the device other than points on the gray axis by means of interpolation in which the K values determined for respective points on the ridgelines and points on the gray axis are used as a boundary condition; and a K-value constraint usage section that uses a K-value constraint to produce the link profile over the entire color reproduction range of the device by referring to a profile of printing under the constraint of K values over the entire color reproduction range of the device, including the K values defined by the K-value definition section and the K values calculated by the K-value calculation section.

In another aspect, the present invention provides a color conversion definition program storage medium which stores a color conversion definition program that allows an information processing apparatus such as a computer to operate as a color conversion definition apparatus according to the present invention. That is, the present invention provides a color conversion definition program storage medium which stores a color conversion definition program that is executed in an information processing apparatus whereby the information processing apparatus operates as a color conversion definition apparatus that defines a color conversion from a coordinate point in a color reproduction range of a first device expressed in a first RGB color space dependent on the first device intervening image data and an image to a coordinate point in a color reproduction range of printing expressed in a CMYK color space of printing, the color conversion definition apparatus including: a profile production section that produces a virtual device profile between a second RGB color space and a reference color space, the second RGB color space being dependent on a virtual second device intervening between image data and an image, the virtual second device having a color reproduction range simulating the color reproduction range of printing; a first color conversion definition section that defines a first color conversion from a coordinate point in the first RGB color space within the color reproduction range of the first device to a coordinate point in the second RGB color space within the color reproduction range of the second device, based on a device profile of the first device and the virtual device profile produced in the virtual device profile production section; and a second color conversion definition section that defines a second color conversion from a coordinate point in the second RGB color space within the color reproduction range of the second device to a coordinate point in the CMYK color space within the color reproduction range of printing.

Note that any color conversion definition program storage medium which stores a program that implements any aspect of color conversion definition method or any aspect of color conversion definition apparatus according to the present invention falls within the scope of the present invention.

In another aspect, the present invention provides a first profile production program storage medium which stores a first profile production program that allows an information processing apparatus such as a computer to operate as the first profile production apparatus according to the present invention. That is, the present invention provides the first profile production program storage medium which stores a first profile production program that is executed in the information processing apparatus whereby the information processing apparatus operates as a profile production apparatus that produces a virtual device profile between a RGB color space and a reference color space, the RGB color space being dependent on a virtual device intervening between image data and an image, the virtual device having a color reproduction range simulating a color reproduction range of printing, the apparatus including a color reproduction range definition section that defines a color reproduction range of the virtual device such that vertices of W, C, M, Y, R, G, and B in the color reproduction range of the device coincide with corresponding vertices of W, C, M, Y, R, G, and B in the color reproduction range of printing, a ridgeline between any two vertices of W, C, M, Y, R, G, and B in the color reproduction range of the second device coincide with a ridgeline between two corresponding vertices in the color reproduction range of printing, a vertex of K in the color reproduction range of the device is set at a point (C, M, Y, K)=(100, 100, 100, $K_{max}$ where $K_{max}$ is a maximum allowable value of K according to a K-value constraint, and ridgelines extend from the respective vertices of R, G, and B to the vertex of K of the color reproduction range of the device in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100).

Note that any profile production program storage medium storing a program that implements any aspect of the first profile production method or any aspect of the first profile production apparatus according to the present invention falls within the scope of the present invention.

In another aspect, the present invention provides a second profile production program storage medium which stores a second profile production program that allows an information processing apparatus such as a computer to operate as the second profile production apparatus according to the present invention. That is, the present invention provides the second profile production program storage medium which stores a second profile production program that is executed in an information processing apparatus whereby the information processing apparatus operates as a profile production apparatus that produces a link profile defining a conversion from a coordinate point in a color reproduction range of the device expressed in a RGB color space dependent on the device intervening between image data and an image to a coordinate point in a color reproduction range of printing expressed in a CMYK color space of printing, the apparatus including: a K-value definition section that defines K values for each point on the gray axis and for each point on ridgelines of the color reproduction range of the device such that the K value for each point on the gray axis is determined in accordance with a K-value constraint in printing, while, for each point on the ridgelines, a minimum value of K values allowable in definition of coordinates in the CMYK color space is employed; a K-value calculation section that calculates a K value for each point on the surfaces of the color reproduction range of the device other than points on the ridgelines and a K value for each point in the inside of the color reproduction range of the device other than points on the gray axis by means of interpolation in which the K values determined for respective points on the ridgelines and points on the gray axis are used as a boundary condition; and a K-value constraint usage section that uses a K-value constraint to produce the link profile over the entire color reproduction range of the device by referring to a profile of printing under the constraint of K values over the entire color reproduction range of the device, including the K values defined by the K-value definition section and the K values calculated by the K-value calculation section.

As described above, the present invention provides great advantages that the invention makes it possible to define a color conversion from RGB data dealt with by a device to CMYK data that can be used in printing to obtain a printed image having colors highly similar to colors of an image output by the device that deals with the original RGB data, and the invention also makes it possible to produce a profile in which the color conversion is accurately defined.

BRIEF DESCRIPTION OF THE DRAWINGS

FIG. 20 shows a table in which a ridgeline between W and C is defined;

FIG. 21 is shows a table in which a ridgeline between C and G is defined;

FIG. 29 is a diagram showing a table in which a ridgeline between W and C has been redefined;

FIG. 30 is a diagram showing a table in which a gray axis profile is defined;

FIGS. 32(A) to 32(C) are diagrams showing a color reproduction range of a printer and a proofer;

DETAILED DESCRIPTION OF THE INVENTION

The present invention is described in further detail below with reference to embodiments.

Figure 1:
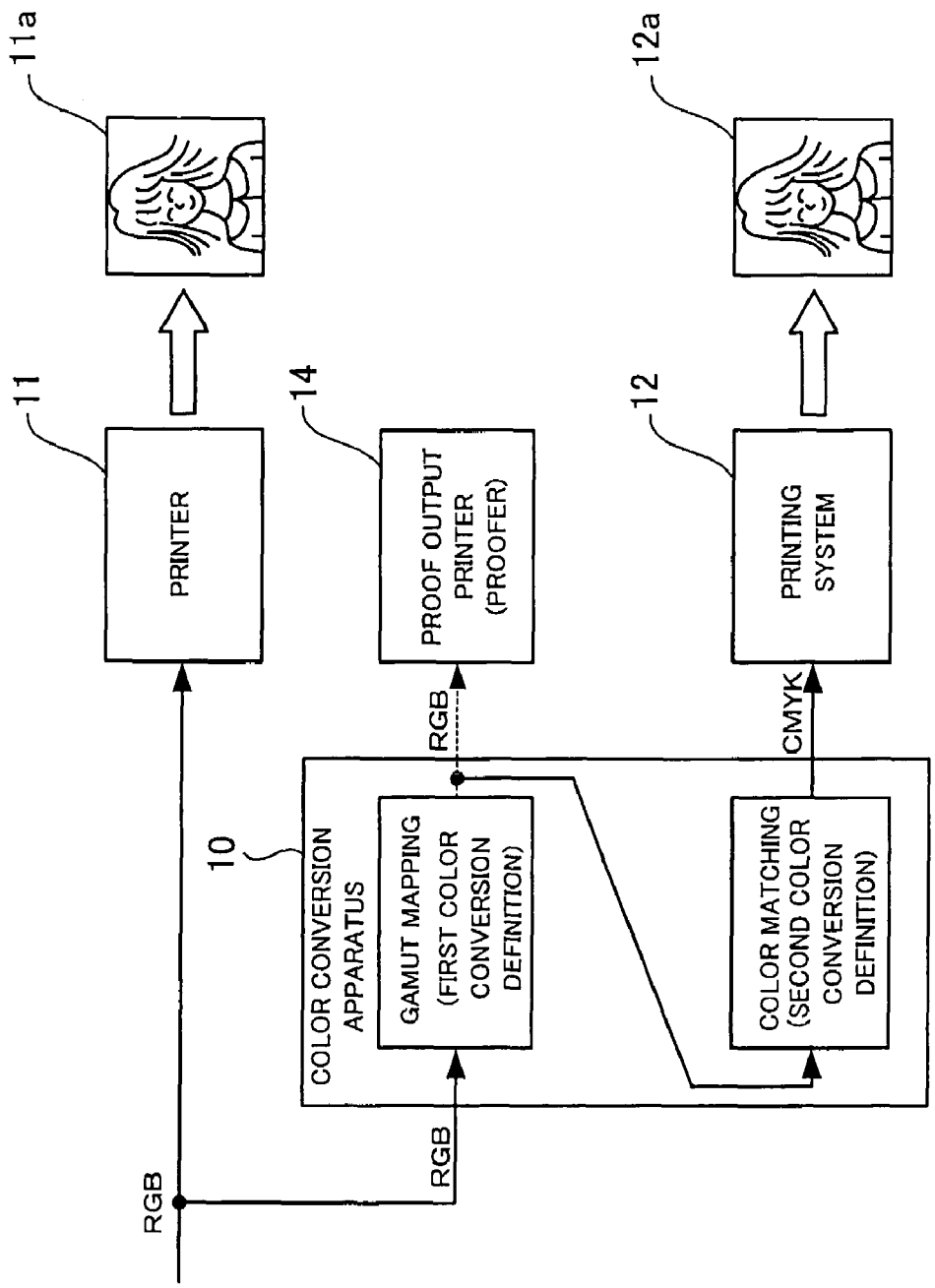
FIG. 1 is a block diagram of a system in which a color conversion defined according to the present invention is used.

FIG. 1 is a block diagram of a system in which a color conversion defined according to the present invention is used. First, referring to FIG. 1, an overview of the present invention is provided.

If RGB data of an image is input to a printer 11, the printer 11 outputs a printed image 11a based on the RGB data. It is required that the printed image 11a output by the printer 11 should have the exactly same colors as the colors of a printed image 12a output by a printing system 12 so that the colors of the printed image 12a can be exactly predicted based on the colors of the printed image 11a.

More specifically, first, RGB data is input to a color conversion apparatus 10. As will be described in detail later, the color conversion apparatus 10 has a first color conversion definition for converting input RGB data (RGB data intended for use by the printer 11) to RGB data intended for use by a virtual proof output printer (proofer) 14 and also has a second color conversion definition for further converting RGB data, obtained via the conversion based on the first color conversion definition, to CMYK data for use in printing by a printing system 12. The first and second color conversion definitions are made in advance in accordance with an embodiment of the invention and are stored in the color conversion apparatus 10. The color conversion apparatus 10 performs a color conversion according to the first color conversion definition (this color conversion is referred to as gamut mapping) and further performs a color conversion according to the second color conversion definition (this color conversion referred to as color matching) thereby converting input RGB data to CMYK data to be used in printing. Although in the present embodiment, for ease of understanding, the color conversion is performed via two steps, that is, the color conversion (gamut mapping) according to the first color conversion definition and the second color conversion (color matching) according to the second color conversion definition, the input RGB data may be directly converted to CMYK data used in printing according to a single color conversion definition obtained by combining the first color conversion definition and the second color conversion definition. This allows the conversion to be performed in a shorter time.

The CMYK data produced in the above-described manner is sent to the printing system 12. In the printing system 12, CMYK films are produced based on the CMYK data, and printing plates are produced based on the CMYK films. Finally, printing is performed using the printing plates to obtain a printed image 12a.

In some cases, before the printed image 12a is actually produced using the printing system 12, a color proof is produced to check whether the printed image 12a will be produced in a desired color tone. To this end, in general, a proof image is printed using a proofer capable of printing an image that very well simulates the printed image 12a. If the proof image for the printed image 12a is approved, the printed image 12a is actually produced.

In contrast, in embodiments of the present invention, as described in detail later, a virtual proofer 14 having a color reproduction range highly similar to the color reproduction range of the printing system 12 is used instead of the actual proofer used to provide a proof image of the printed image 12a, and the first color conversion definition mentioned above is used to convert input RGB data to RGB data to be dealt with by the proofer 14. This virtual proofer 14 is defined by a color reproduction characteristic (proofer profile) produced so as to be substantially equal in terms of the color reproduction range to the color reproduction characteristic of the printing system 12. The method of producing the proofer profile will be described later.

If the input RGB data is correctly converted into CMYK data by the color conversion apparatus 10, the printed image 12a will have the same colors as the colors of the print image 11a.

To correctly convert the input RGB data into CMYK data by the color converter 10, the difference between the color reproduction characteristic (printer profile) of the printer 11 and the color reproduction characteristic (printing-system profile) of the printing system 12 must be correctly taken into account in the color conversion, and furthermore, the CMYK data obtained as a result of the color conversion must match the printing system 12 (that is, the CMYK data must be correctly printable by the printing system 12).

However, a problem can occur when the color conversion from RGB data to CMYK data representing the color calorimetrically identical to the color represented by the RGB data is defined based on the color reproduction characteristic (printer profile) of the printer 11 and the color reproduction characteristic (printing-system profile) of printing system 12. That is, although the RGB data includes three variables R, G, and B, the CMYK data includes four variable C, M, Y, and K. This means that when a particular RGB data is given, there can be many CMYK data that represent a color calorimetrically identical to the color represented by the given RGB data, and thus the CMYK data cannot be uniquely determined. When arbitrary one is selected from a large number of CMYK data that are colorimetrically identical to each other, the selected CMYK data is not necessarily suitable in terms of printability.

RGB data may be converted to CMY data such as CMY block data and further to CMYK data by using a color converter that is adjusted by a skilled human operator such that the resultant CMYK data matches the printing system 12. However, in this case, although the obtained CMYK data satisfies the requirement in terms of printability by the printing system 12, the obtained CMYK data does not necessarily represent the same color as that represented by the original RGB data, and preference of a human operator or a printing company is reflected in the resultant CMYK data.

Furthermore, as described earlier, the color reproduction characteristic (printer profile) of the printer 11 can be different from the color reproduction characteristic (printing-system profile) of the printing system 12, and this difference must be taken into account in the color conversion.

Figure 10:
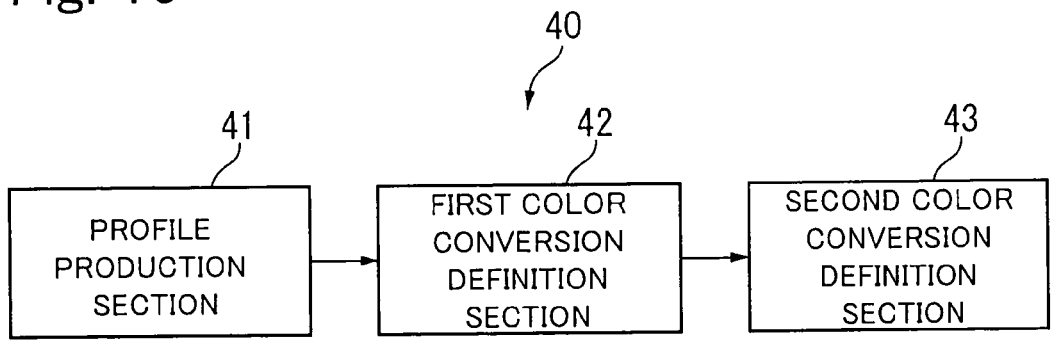
FIG. 10 is a functional block diagram of a color conversion definition apparatus according to an embodiment of the present invention.

In the color conversion apparatus 10 shown in FIG. 10, the color conversion definition (including the first color conversion definition and the second color conversion definition) is set such that when RGB data (coordinates in the RGB color space) adapted for use by the printer 11 is converted into CMYK data (coordinates in the CMYK color space) in accordance with the color conversion definition, the resultant CMYK data satisfies the requirement in terms of printability by the printing system 12, and an image printed according to the CMYK data is highly consistent in color with the printed image 11a output by the printer 11 in accordance with the RGB data, even when the color reproduction characteristic (printer profile) of the printer 11 is different from the color reproduction characteristic (printing-system profile) of the printing system 12. A specific method of setting the color conversion definition (including the first color conversion definition and the second color conversion definition) which can realize such a color conversion is described below.

Figure 2:
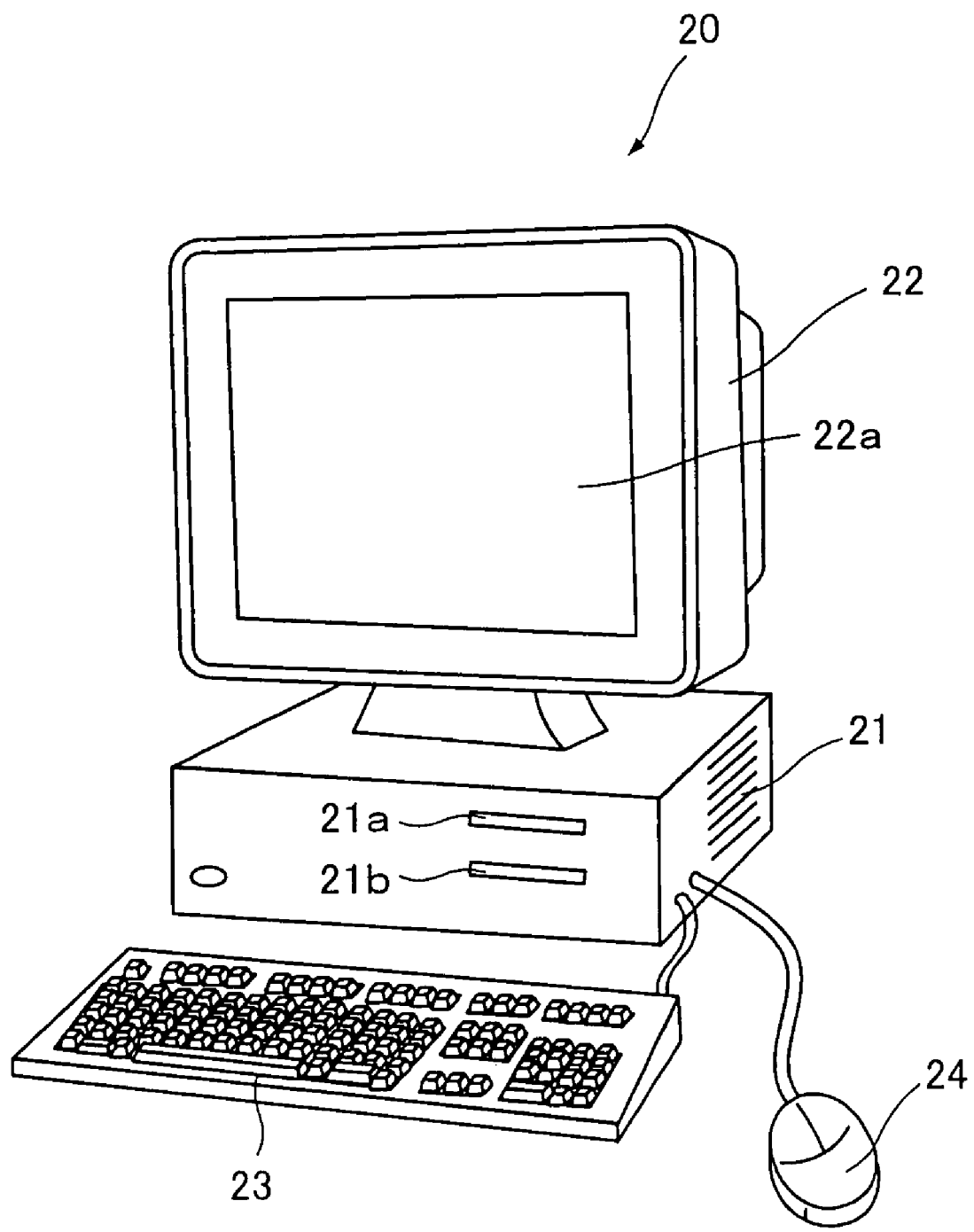
FIG. 2 is a perspective view showing the outward appearance of a personal computer embodying a color conversion definition apparatus according to the present invention.
Figure 3:
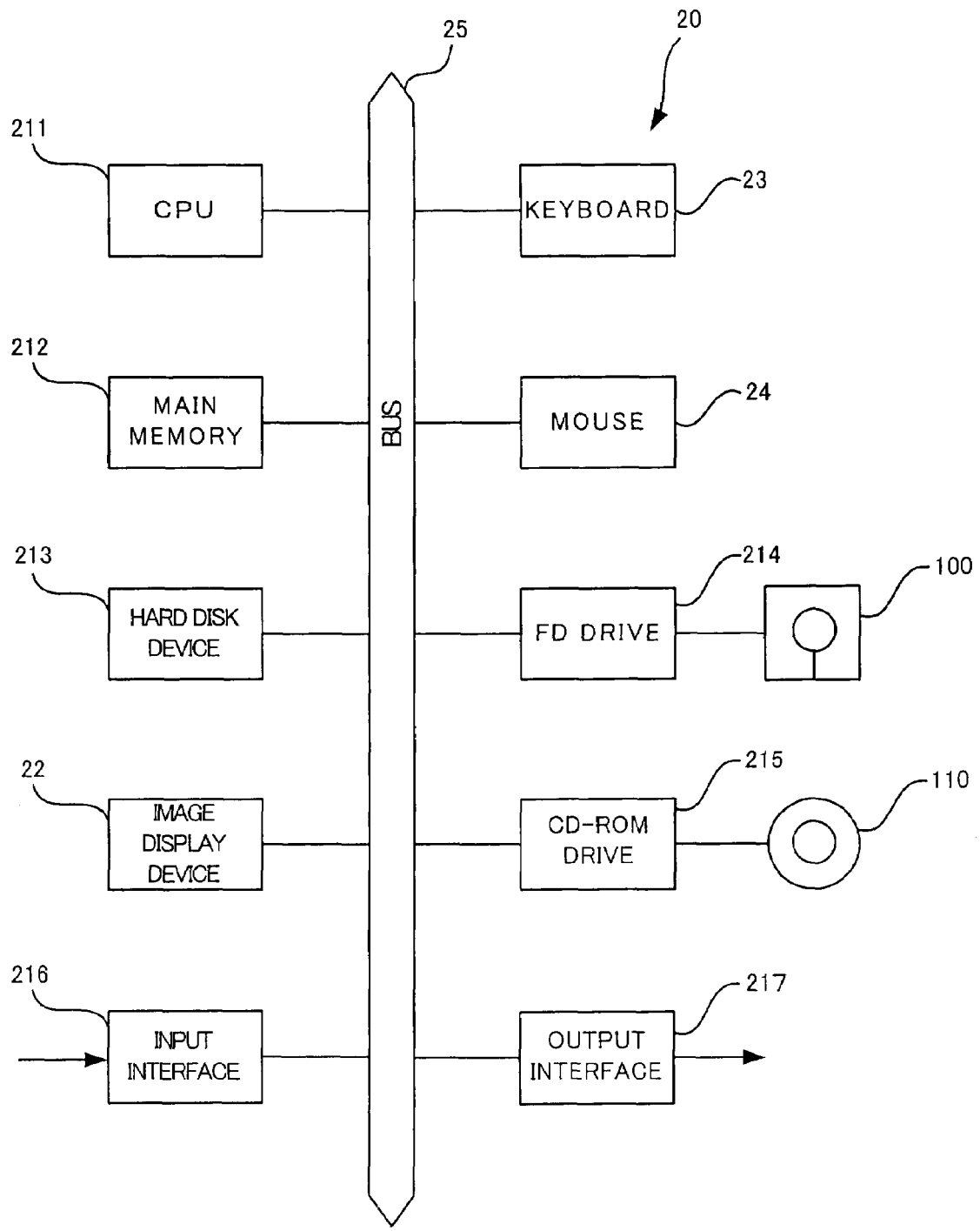
FIG. 3 is a diagram showing a hardware configuration of the personal computer shown in FIG. 1.

FIG. 2 is a perspective view showing the outward appearance of a personal computer embodying a color conversion definition apparatus according to the present invention. FIG. 3 is a diagram showing a hardware configuration of the personal computer shown in FIG. 1. This color conversion definition apparatus includes a profile production apparatus according to an embodiment of the present invention.

More specifically, the color conversion definition apparatus (including the profile production apparatus) according to the present embodiment of the invention is implemented using hardware of the personal computer 20 and software including an operating system (OS) and a color conversion definition generation program (profile generation program) that are installed on the personal computer 20 and executed thereon.

The color conversion apparatus 10 shown in FIG. 1 can also be implemented on the personal computer 20. That is, in the present embodiment, the personal computer 20 shown in FIGS. 2 and 3 serves as hardware for realizing not only the color conversion definition apparatus but also the color conversion apparatus 10 shown in FIG. 1. However, if desirable, a color conversion definition may be produced by using a personal computer different from the personal computer on which the color conversion apparatus 10 shown in FIG. 1 is implemented, the resultant color conversion definition may be installed on the color conversion apparatus 10 shown in FIG. 1.

First, the hardware of the personal computer shown in FIGS. 2 and 3 is described, and then the method of setting the color conversion definition using the personal computer according to the embodiment of the invention is described.

As shown in FIG. 2, the personal computer 20 includes, a main part 21, an image display device 22 for displaying an image on its display screen 22a according to a command from the main part 21, a keyboard 23 for inputting various kinds of information to the main part 21 by pressing keys, and a mouse 24 for pointing to an arbitrary position on the display screen 22a to input a command corresponding to an icon or the like for example pointed to by the mouse 24. The main part 21 has a FD loading slot 21a for loading a flexible disk (FD), and a CD-ROM loading slot 21b for loading a CD-ROM.

In the inside, as shown in FIG. 3, the main part 21 includes a CPU 211 that executes programs, a main memory 212 in which programs are loaded from a hard disk drive 213 in a form executable by the CPU 211, the hard disk drive 213 for storing programs and data, a FD drive 214 for accessing a flexible disk (FD) 100 loaded on the FD drive 214, and a CD-ROM drive 215 for accessing a CD-ROM 110 loaded on the CD-ROM drive 215. As described earlier, the personal computer 20 also serves as the color conversion apparatus 10 shown in FIG. 1. To this end, the personal computer 20 further includes an input interface 216 for receiving RGB data from the outside, and an output interface 217 for transmitting CMYK data to the printing system 12. These parts described above and the parts shown in FIG. 2, that is, the image display device 22, the keyboard 23, and the mouse 24 are connected to each other via a bus 25.

A color conversion definition generation program by which the personal computer 20 operates as the color conversion definition apparatus is stored on the CD-ROM 110. The CD-ROM 110 is mounted on the CD-ROM drive 215, and the color conversion definition generation program stored on the CD-ROM 110 is transferred to the hard disk device 213 and thus the color conversion definition generation program is uploaded to the personal computer 20.

Figure 4:
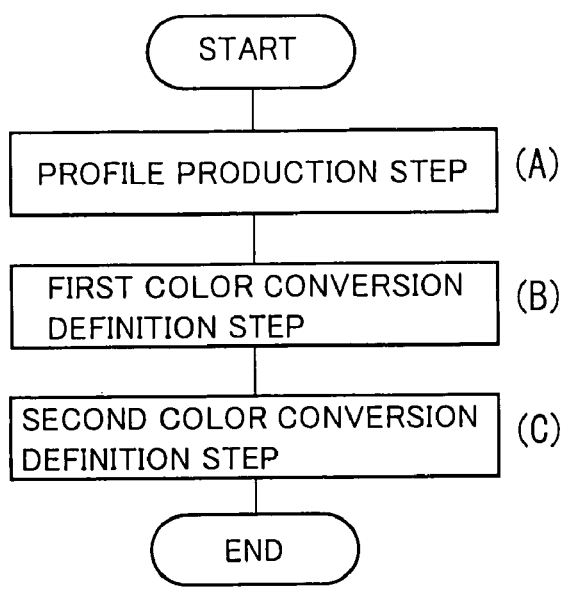
FIG. 4 is a flow chart showing a color conversion definition method according to an embodiment of the present invention.

FIG. 4 is a flow chart showing a color conversion definition method according to an embodiment of the present invention.

By this method, the color conversion is defined so as to map coordinate points in the color reproduction range of the first device (printer 11 shown in FIG. 1 in this specific example), expressed in the first RGB color space dependent on the first device that outputs an image according to image data, to coordinate points in the color reproduction range of the printing system 12 shown in FIG. 1, represented by the CMYK color space. The color conversion definition method includes: a profile production step (step (A)) of producing a virtual device profile (proofer profile) between a second RGB color space and a reference color space (L*a*b* color space in this specific example), the second RGB color space being dependent on a virtual second device (for example, the proofer 14 shown in FIG. 1) intervening between image data and an image, the virtual second device having a color reproduction range simulating the color reproduction range of printing; a first color conversion definition step (step (B)) of defining a first color conversion from a coordinate point in the first RGB color space within the color reproduction range of the first device (printer 11) to a coordinate point in the second RGB color space within the color reproduction range of the second device (proofer 14), based on a device profile (printer profiler) of the first device (printer 11) and the virtual device profile (proofer profile) produced in the virtual device profile production step (step (A)); and a second color conversion definition step (step (C)) of defining a second color conversion from a coordinate point in the second RGB color space within the color reproduction range of the second device (proofer 14) to a coordinate point in the CMYK color space within the color reproduction range of printing.

The details of the color conversion definition method shown in FIG. 4 will be described later.

Figure 5:
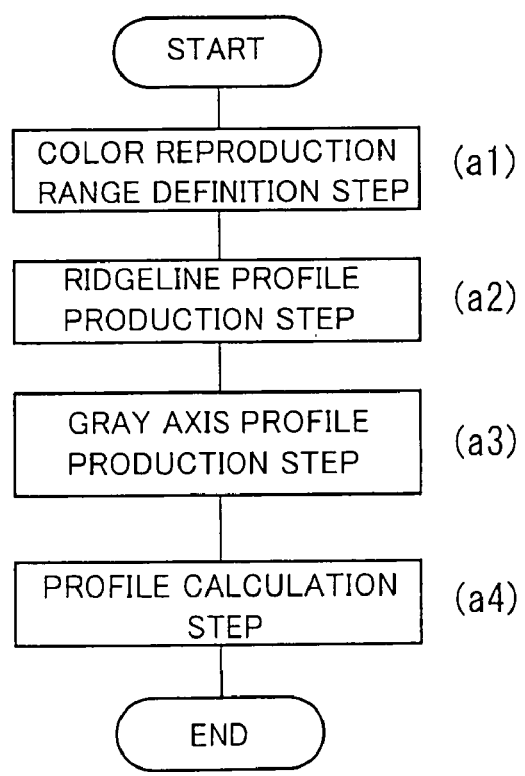
FIG. 5 is a flow chart showing a first profile production method according an embodiment of to the present invention.

Of the profile production methods according to the present invention, an embodiment of the first profile production method is shown in the form of a flow chart in FIG. 5. Note that the first profile production method may be implemented independently or as one step (step (A)) in the embodiment of the color conversion definition method shown in the form of the flow chart in FIG. 4 according to the present invention. In the latter sense, the flow chart shown in FIG. 5 shows the details of step (A) of the flow of the color conversion definition method shown in FIG. 4.

The first profile production method (profile production step (in step (A)) shown in FIG. 4) according to the present embodiment shown in FIG. 5 is a profile production method of producing a virtual device profile between a RGB color space (second RGB color space) and a reference color space (L*a*b* color space in this specific example), the RGB color space being dependent on a virtual device (the proofer 14 shown in FIG. 1) intervening between image data and an image, the virtual device having a color reproduction range simulating the color reproduction range of printing. The method includes a color reproduction range definition step (step (a1)), a ridgeline profile production step (step (a2)), a gray axis profile production step (step (a3)), and a profile calculation step (step (a4)).

In the color reproduction range definition step (in step (a1)), the color reproduction range of the device (proofer 14) is defined such that vertices of W, C, M, Y, R, G, and B in the color reproduction range of the device (proofer 14) coincide with corresponding vertices of W, C, M, Y, R, G, and B in the color reproduction range of printing, a ridgeline between any two vertices of W, C, M, Y, R, G, and B in the color reproduction range of the device (proofer 14) coincide with a ridgeline between two corresponding vertices in the color reproduction range of printing, a vertex of K in the color reproduction range of the device (proofer 14) is set at a point $(C, M, Y, K)=(100, 100, 100, K_{max})$ where $K_{max}$ is a maximum allowable value of K according to a printing K plate constraint (K-value constraint), and ridgelines extend from the respective vertices of R, G, and B to the vertex of K of the color reproduction range of the device (proofer 14) in such a manner that they first extend from the respective vertices of R, G, and B to midpoints along respective ridgelines toward vertices $(C, M, Y, K)=(0, 100, 100, 100)$, $(C, M, Y, K)=(100, 0, 100, 100)$, and $(C, M, Y, K)=(100, 100, 0, 100)$, and further extend from the respective midpoints to the vertex of K set at $(C, M, Y, K)=(100, 100, 100, K_{max})$ deviating from the ridgelines toward $(C, M, Y, K)=(0, 100, 100, 100)$, $(C, M, Y, K)=(100, 0, 100, 100)$, and $(C, M, Y, K)=(100, 100, 0, 100)$.

In the ridgeline profile production step (step (a2)), a ridgeline profile is produced in which coordinates on ridgelines in the color reproduction range of the device (proofer 14) in the RGB color space (second RGB color space) are related to coordinates in the reference color space (L*a*b* color space in this specific example) such that when points equally spaced from each other on an arbitrary boundary edge of the color reproduction range, defined in step (a1), of the device (proofer 14) in the RGB color space (second RGB color space) are mapped onto the reference color space, the resultant mapped points in the reference color space are located on a ridgeline corresponding to the arbitrary boundary edge of the color reproduction range of the device (proofer 14) and spaced equally from each other.

In the gray axis profile production step (step (a3)), a gray axis profile is produced in which coordinates on a gray axis in the color reproduction range of the device (proofer 14) in the RGB color space (second RGB color space) are related to coordinates in the reference color space such that when points-equally spaced from each other on the gray axis extending between two vertices of W and K in the color reproduction range, defined in step (a2), of the device (proofer 14) in the RGB color space (second RGB color space) are mapped onto the reference color space, the resultant mapped points in the reference color space are located on a gray axis corresponding to the gray axis in the color reproduction range of the device (proofer 14) and spaced equally from each other.

In the profile calculation step (step (a4)), a profile of the color reproduction range of the device (proofer 14), associated with surface planes other than ridgelines and in the inside of the color reproduction range other than gray axis, is calculated by means of interpolation in which the ridgeline profile produced in step (a2) and the gray axis profile produced in step (a3) are used as a boundary condition.

The details of the first profile production method shown in FIG. 5 (profile production step (in step (A)) shown in FIG. 4) will be described later.

Figure 6:
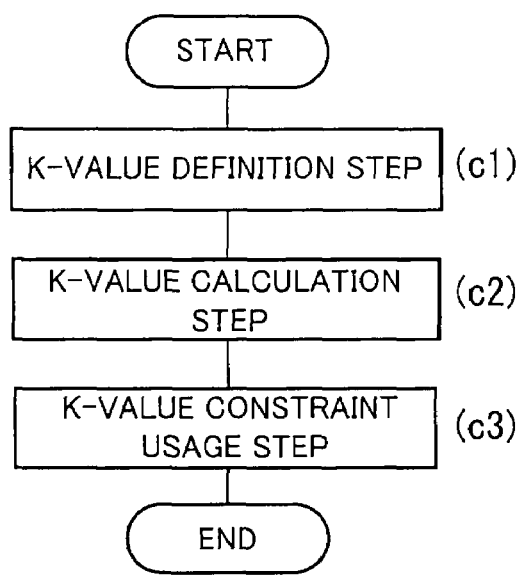
FIG. 6 is a flow chart showing a second profile production method according an embodiment of to the present invention.

Of the profile production methods according to the present invention, an embodiment of the second profile production method is shown in the form of a flow chart in FIG. 6. Note that the second profile production method shown in the flow chart of FIG. 6 may be implemented independently or as one step (step (C)) in the embodiment of the color conversion definition method shown in the form of the flow chart in FIG. 4 according to the present invention. In the latter sense, the flow chart shown in FIG. 6 shows the details of step (C) of the flow of the color conversion definition method shown in FIG. 4.

The second profile production method (second color conversion definition step (in step (C)) in FIG. 4) according to the present embodiment shown in FIG. 6 is a method of producing a link profile defining a color conversion from a coordinate point in a color reproduction range of a device (proofer 14) expressed in a RGB color space (second RGB color space) dependent on the device (proofer 14 shown in FIG. 1) intervening image data and an image to a coordinate point in a color reproduction range of printing expressed in a CMYK color space of printing. The method includes a K-value definition step (step (c1)), a K-value calculation step (step (c2)), and a K-value constraint usage step (step (c3)).

In the K-value definition step in (step (c1)), the value of K is defined for each point on the gray axis and on ridgelines of the color reproduction range of the device (proofer 14) such that the K value for each point on the gray axis is determined in accordance with a K-value constraint in printing, while, for each point on the ridgelines, a minimum value of K values allowable in definition of coordinates in the CMYK color space is employed.

In the K-value calculation step (in step (c2)), the K value for each point on the surfaces of the color reproduction range of the device (proofer 14) other than points on the ridgelines and K value for each point in the inside of the color reproduction range of the device (proofer 14) other than points on the gray axis are calculated by means of interpolation in which the K values determined for respective points on the ridgelines and points on the gray axis are used as a boundary condition.

In the K-value constraint usage step (step (c3)), the link profile over the entire color reproduction range is produced by referring to the profile of printing under the constraint of K values over the entire color reproduction range of the device (proofer 14), including the K values defined in the K-value definition step (in step (c1)) and the K values calculated in the K-value calculation step (in step (c2)).

The details of the second profile production method (second color conversion definition step (in step (C)) in FIG. 4) shown in FIG. 6 will be described later.

The color conversion definition method shown in FIG. 4 (including the first and second profile production methods shown in FIGS. 5 and 6) is practiced by installing a color conversion definition program of the present invention on the personal computer 20 shown in FIGS. 2 and 3 and executing the color conversion definition program on the personal computer 20.

Figure 7:
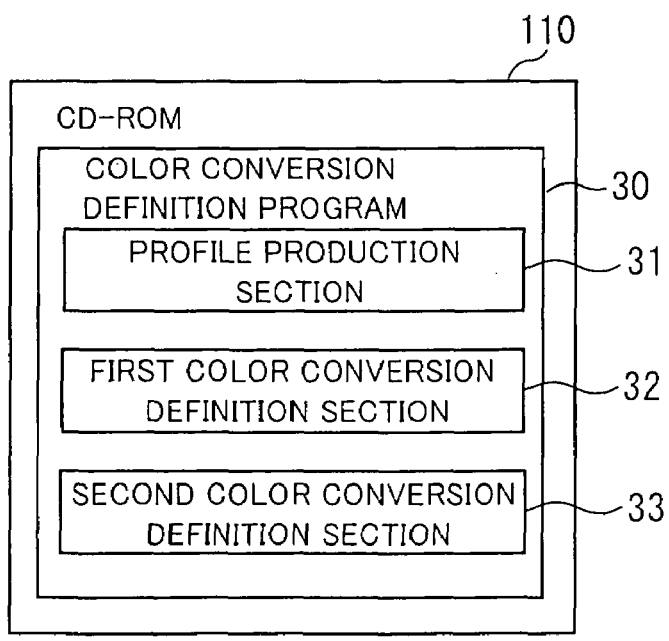
FIG. 7 is a diagram of a color conversion definition program storage medium according to an embodiment of the present invention.

FIG. 7 is a diagram of an embodiment of the color conversion definition program storage medium according to the present invention.

A color conversion definition program 30 shown in FIG. 7 is stored on the CD-ROM 110 shown in FIG. 3 which is an embodiment of the color conversion definition program storage medium according to the present invention and is installed onto the personal computer 20 shown in FIGS. 2 and 3 from the CD-ROM 110. By executing the color conversion definition program on the personal computer 20, the personal computer 20 can operate as a color conversion definition apparatus that defines a color conversion from a coordinate point in a color reproduction range of a first device (printer 11) expressed in a first RGB color space dependent on the first device (printer 11 shown in FIG. 1, in this specific example) intervening image data and an image to a coordinate point in a color reproduction range of printing expressed in a CMYK color space of printing. This color conversion definition program 30 includes a profile production section 31, a first color conversion definition section 32, and a second color conversion definition section 33.

The profile production section 31, the first color conversion definition section 32, and the second color conversion definition section 33 are program modules which cause, when the color conversion definition program 30 shown in FIG. 7 is executed on the personal computer 20 shown in FIGS. 2 and 3, the personal computer 20 to execute the profile production step (in step (A)), the first color conversion definition step (in step (B)), and the second color conversion definition step (in step (C)) in the color conversion definition method shown in FIG. 4. The details of the profile production section 31, the first color conversion definition section 32, and the second color conversion definition section 33 will be described later.

Figure 8:
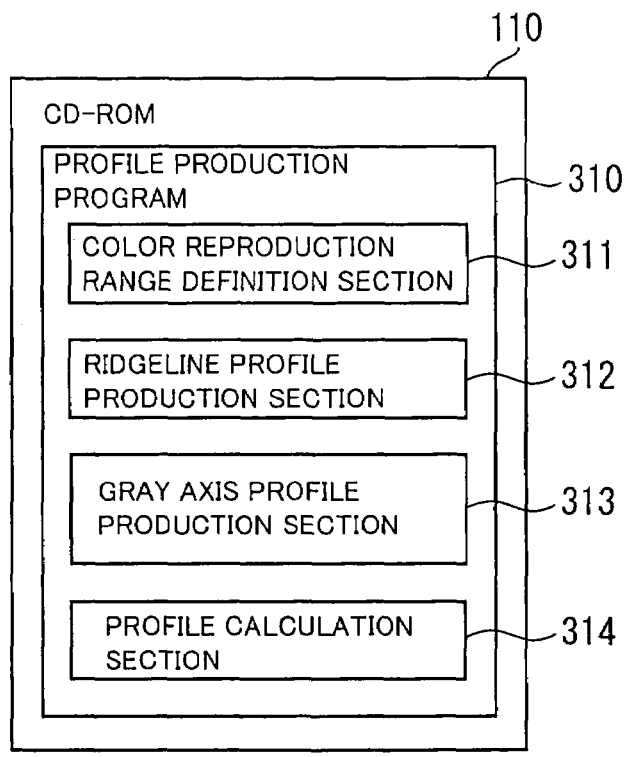
FIG. 8 is a diagram of a first profile production program storage medium according to an embodiment of the present invention.

FIG. 8 is a diagram of an embodiment of the first profile production program storage medium according to the present invention. Although in this specific example shown in FIG. 8, a profile production program 310 is stored independently on a CD-ROM 110 that is an embodiment of the first profile production program storage medium according to the present invention, the profile production program 310 shown herein is identical to the profile production section 31 of the color conversion definition program 30 shown in FIG. 7.

When the profile production program 310 shown in FIG. 8 is installed on the personal computer 20 shown in FIGS. 2 and 3 and executed thereon, the personal computer 20 operates as a profile production apparatus that produces a virtual device profile between a RGB color space (second RGB color space) and a reference color space, the RGB color space being dependent on a virtual device (the proofer 14 shown in FIG. 1) intervening between image data and an image, the virtual device having a color reproduction range simulating the color reproduction range of printing. The profile production program 310 includes a color reproduction range definition section 311, a ridgeline profile production section 312, a gray axis profile production section 313, and a profile calculation section 314.

Figure 15:
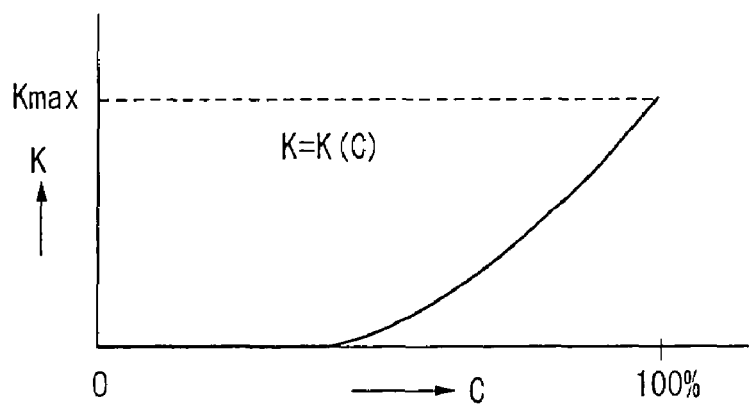
FIG. 15 is a diagram showing an example of a K-value constraint.

The color reproduction range definition sections 311, the ridgeline profile production section 312, the gray axis profile production section 313, and the profile calculation section 314 are program modules which cause, when the profile production program 310 shown in FIG. 8 is executed on the personal computer 20 shown in FIGS. 2 and 3, the personal computer 20 to execute the color reproduction range definition step (in step (a1)), the ridgeline profile production step (in step (a2)), the gray axis profile production step (in step (a3)), and the profile calculation step in step (a4), in the first profile production method shown in FIG. 15. The color reproduction range definition section 311, the ridgeline profile production section 312, the gray axis profile production section 313, and the profile calculation section 314 as a whole serve as a program module for executing the profile production step (in step (A)) of the color conversion definition method shown in FIG. 4. The details of the color reproduction range definition section 311, the ridgeline profile production section 312, the gray axis profile production section 313, and the profile calculation section 314 will be described later.

Figure 9:
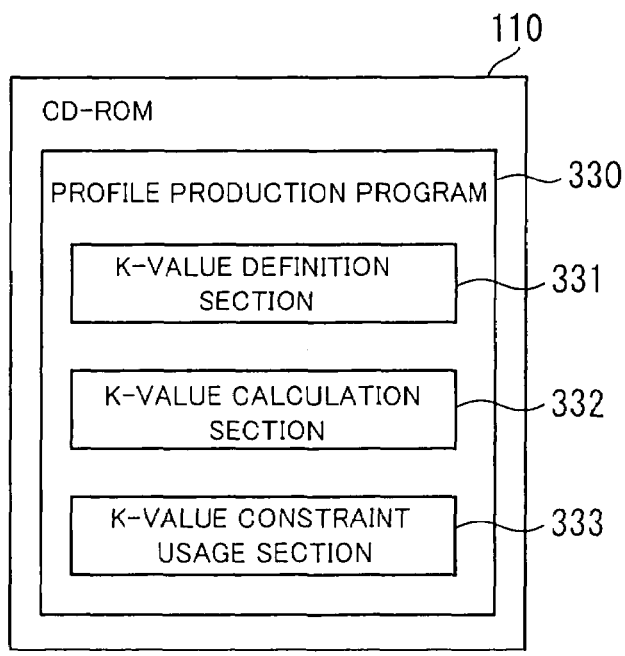
FIG. 9 is a diagram of a second profile production program storage medium according to an embodiment of the present invention.

FIG. 9 is a diagram of an embodiment of the second profile production program storage medium according to the present invention. Although in this specific example shown in FIG. 9, a profile production program 330 is stored independently on a CD-ROM 110 that is an embodiment of the second profile production program storage medium according to the present invention, the profile production program 330 shown herein is identical to the second color conversion definition section 33 of the color conversion definition program 30 shown in FIG. 7.

When the profile production program 330 shown in FIG. 9 is installed on the personal computer 20 shown in FIGS. 2 and 3 and executed thereon, the personal computer 20 operates as a profile production apparatus that produces a link profile defining a color conversion from a coordinate point in a color reproduction range of a device (proofer 14) expressed in a RGB color space (second RGB color space) dependent on the device (proofer 14 shown in FIG. 1) intervening image data and an image to a coordinate point in a color reproduction range of printing expressed in a CMYK color space of printing. The profile production program 330 includes a K-value definition section 331, a K-value calculation section 332, and a K-value constraint usage section 333.

The K-value definition section 331, the K-value calculation section 332, and the K-value constraint usage section 333 are program modules which cause, when the profile production program 330 shown in FIG. 9 is executed on the personal computer 20 shown in FIGS. 2 and 3, the personal computer 20 to execute the K-value definition step (in step (c1)), the K-value calculation step (in step (c2)), and the K-value constraint usage step (step (c3)), of the second profile production method shown in FIG. 6. The K-value definition section 331, the K-value calculation section 332, and the K-value constraint usage section 333 as a whole serve as a program module for executing the second color conversion definition step (in step (C)) of the color conversion definition method shown in FIG. 4. The details of the K-value definition section 331, the K-value calculation section 332, and the K-value constraint usage section 333 will be described later.

FIG. 10 is a functional block diagram of an embodiment of the color conversion definition apparatus according to the present invention.

A color conversion definition apparatus 40 shown in FIG. 10 is implemented on the personal computer 20 shown in FIGS. 2 and 3 by installing the color conversion definition program 30 from the CD-ROM 110 shown in FIG. 7 onto the personal computer 20 and executing the color conversion definition program 30 on the personal computer 20. The color conversion definition apparatus 40 includes a profile production section 41, a first color conversion definition section 42, and a second color conversion definition section 43. The profile production section 41, the first color conversion definition section 42, and the second color conversion definition section 43 are respectively implemented by executing the profile production section 31, the first color conversion definition section 32, and the second color conversion definition section 33 of the color conversion definition program 30 shown in FIG. 7 on the personal computer 20. The details of the profile production section 41, the first color conversion definition section 42, and the second color conversion definition section 43 will be described later.

Figure 11:
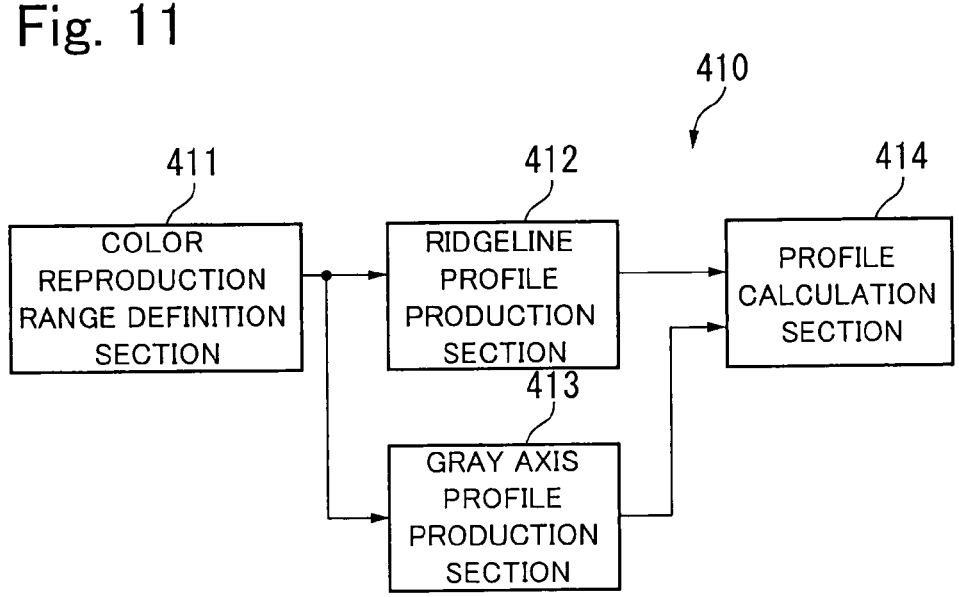
FIG. 11 is a functional block diagram of a first profile production apparatus according an embodiment of the present invention.

FIG. 11 is a functional block diagram of an embodiment of the first profile production apparatus according to the present invention.

A color conversion definition apparatus 410 shown in FIG. 11 is implemented on the personal computer 20 shown in FIGS. 2 and 3 by installing the profile production program 310 from the CD-ROM 110 shown in FIG. 8 onto the personal computer 20 and executing the profile production program 310 on the personal computer 20. The profile production apparatus 410 includes a color reproduction range definition section 411, a ridgeline profile production section 412, a gray axis profile production section 413, and a profile calculation section 414. The color reproduction range definition section 411, the ridgeline profile production section 412, the gray axis profile production section 413, and the profile calculation section 414 are respectively implemented by executing the color reproduction range definition section 311, the ridgeline profile production section 312, the gray axis profile production section 313, and the profile calculation section 314, of the profile production program 310 shown in FIG. 8 on the personal computer 20. The profile production section 41 of the color conversion definition apparatus 40 shown in FIG. 10 is identical to the profile production apparatus 410 shown in FIG. 11. The details of the color conversion definition apparatus 410 will be described later.

Figure 12:
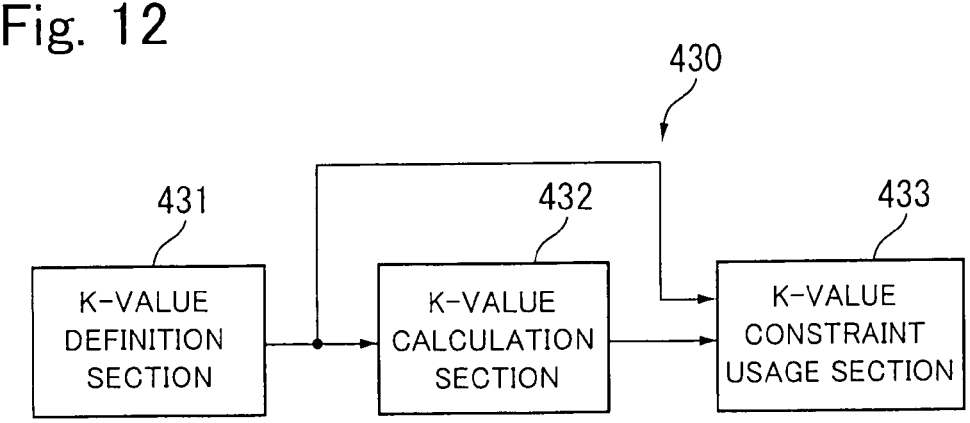
FIG. 12 is a functional block diagram of a second profile production apparatus according an embodiment of the present invention.

FIG. 12 is a functional block diagram of an embodiment of the second profile production apparatus according to the present invention.

A profile production apparatus 430 shown in FIG. 12 is implemented on the personal computer 20 shown in FIGS. 2 and 3 by installing the profile production program 330 from the CD-ROM 110 shown in FIG. 9 onto the personal computer 20 and executing the profile production program 330 on the personal computer 20. The profile production apparatus 430 includes a K-value definition section 431, a K-value calculation section 432, and a K-value constraint usage section 433. The K-value definition section 431, the K-value calculation section 432, and the K-value constraint usage section 433 are respectively implemented by executing the K-value definition section 331, the K-value calculation section 332, and the K-value constraint usage section 333, of the profile production program 330 shown in FIG. 9 on the personal computer 20. The second color conversion definition section 43 of the color conversion definition apparatus 40 shown in FIG. 10 is identical to the profile production apparatus 430 shown in FIG. 12.

The color conversion definition method shown in FIG. 4, the color conversion definition program 30, and the color conversion definition apparatus 40 shown in FIG. 10 are described in further detail below. In the description below, the profile production step (in step (A)) shown in FIG. 4 (the profile production section 31 shown in FIG. 7 and the profile production section 41 shown in FIG. 10), the first color conversion definition step (in step (B)) shown in FIG. 4 (the first color conversion definition section 32 shown in FIG. 7 and the first color conversion definition section 42 shown in FIG. 10), and the second color conversion definition step (in step (C)) shown in FIG. 4 (the second color conversion definition section 33 shown in FIG. 7 and the second color conversion definition section 43 shown in FIG. 10) will be described.

The details of the profile production method shown in FIG. 5 (the profile production program 310 shown in FIG. 8 and the profile production apparatus 410 shown in FIG. 11) and the profile production method shown in FIG. 6 (the profile production program 330 shown in FIG. 9 and the profile production apparatus 430 shown in FIG. 12) will also be described.

In the following description, FIGS. 4 to 6 associated with the color conversion definition method and the profile production method will be referred to, in order to indicate what step the description corresponds to. Note that the description given below referring to respective steps of the color conversion definition method and the profile production method shown in FIGS. 4 to 6 can apply to corresponding sections of the program and corresponding section of the apparatus, although the description will be given only for steps of methods.

In the step of executing the color conversion definition method shown in FIG. 4, the printer profile explained below, the printing-system profile, and the K-value constraint are assumed to have already been obtained.

Figure 13:
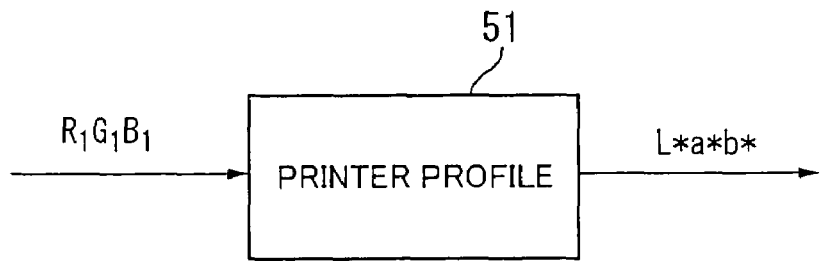
FIG. 13 is a conceptual diagram of a printer profile.

FIG. 13 is a conceptual diagram of a printer profile 51 of the printer 11 shown in FIG. 1. The printer profile 51 represents the correspondence between RGB data input to the printer 11 (hereinafter, such RGB data will be referred to as $R_1G_1B_1$ for distinction) and color (L*a*b* value) of the printed image 11a output from the printer 11. The printer profile 51 is given in the form of a lookup table (LUT).

As is widely known, the printer profile 51 can be produced by inputting $R_1G_1B_1$ data with various $R_1G_1B_1$ values to the printer 11, printing a color chart including corresponding color patches and measuring colors of the color patches of the color chart using a calorimeter thereby obtaining calorimetric values (L*a*b* values) of the respective color patches. Basically, the printer profile 51 represents the correspondence between the $R_1G_1B_1$ values and calorimetric values (L*a*b* values), obtained in the above-described manner.

Figure 14:
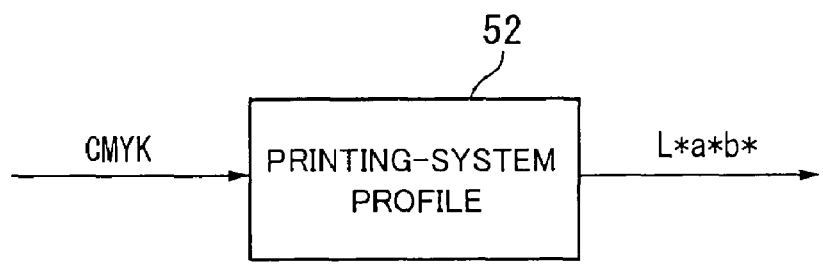
FIG. 14 is a conceptual diagram of a printing-system profile.

FIG. 14 is a conceptual diagram of a printing-system profile.

The printing-system profile 52 shown in FIG. 14 is a profile of the printing system 12 shown in FIG. 1. In contrast to the printer profiler 51 shown in FIG. 13, the printing-system profile 52 represents the correspondence between CMYK data input to the printing system 12 and colors (L*a*b* values) of the printed image 12a output from the printing system 12. The printing-system profile 52 is given also in the form of a lookup table (LUT). The printing-system profile 52 can be produced in a similar manner to the printer profile 51 shown in FIG. 13 in accordance with a widely known method, although the details thereof are not described herein.

In general, the color reproduction range of the printing-system profile 52 is different from that of the printer profile 51, That is, in general, the color reproduction range of the printing-system profile 52 is smaller than that of the printer profile 51 of the printer for use in providing a proof. Note that in contrast to the printer profile 51 shown in FIG. 13 which is a profile (LUT) representing the correspondence between 3-dimensional $R_1G_1B_1$ data and 3-dimensional L*a*b* data, the printing-system profile 52 shown in FIG. 14 is a profile (LUT) representing the correspondence between 4-dimensional CMYK data and 3-dimensional L*a*b* data.

FIG. 15 is a diagram showing a K-value constraint.

In the example shown in FIG. 15, the value of K is defined as a function of the value of cyan (C)(that is, K=K(C)). In the specific example shown in FIG. 15, K=0 in the range in which C has a small value, while K monotonically increases with C in the range in which C is greater than a particular value. The K-value constraint is determined by a printing company in accordance with its technical policy or preference. It is required that the K-value constraint should be strictly satisfied.

Figure 16:
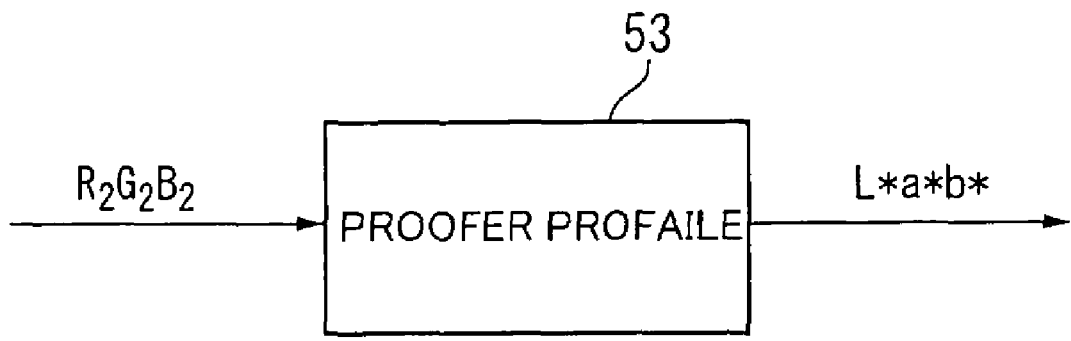
FIG. 16 is a conceptual diagram of a proofer profile produced in a profile production step (in step (A)) of the color conversion definition method shown in FIG. 4.

FIG. 16 is a conceptual diagram of the proofer profile produced in the profile production step (in step (A)) of the color conversion definition method shown in FIG. 4.

This proofer profile 53 shown in FIG. 16 is a profile of the proofer 14 that is a virtual printer. The proofer profile 53 is given in the form of a LUT representing the correspondence between RGB data input to the proofer 14 (hereinafter, such RGB data will be referred to as $R_2G_2B_2$ for distinction from RGB data input to the printer 11 shown in FIG. 1) and color (L*a*b* value) of a printed image output from the proofer 14. Note that the proofer profile 53 is a profile of virtual proofer 14, and it is logically produced as described below. That is, the proofer profile 53 is produced by the first profile production method according to the present invention shown in FIG. 5.

Figure 17:
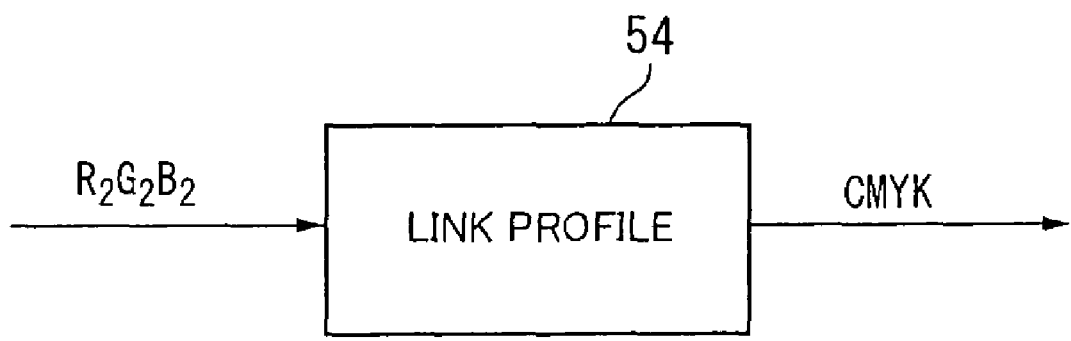
FIG. 17 is a conceptual diagram of a link profile produced in a second color conversion definition step (in step (C)) of the color conversion definition method shown in FIG. 4.

FIG. 17 is a conceptual diagram of the link profile produced via the second color conversion definition step (in step (C)) of the color conversion definition method shown in FIG. 4.

The link profile 54 shown in FIG. 17 is in the form of a LUT defined via the second color conversion step of the color conversion definition method according to the present invention so as to represent the correspondence between $R_2G_2B_2$ values, that is, the RGB data input to the proofer 14 shown in FIG. 1 and CMYK values, that is, the CMYK data input to the printing system 12 shown in FIG. 1. The link profile 54 is produced by the second profile production method shown in FIG. 6 according to the present invention.

In the profile production step (step (A)) of the color conversion definition method shown in FIG. 4, the proofer profile 53 conceptually shown in FIG. 16 is produced by sequentially performing the color reproduction range definition step (step (a1)), the ridgeline profile production step (step (a2)), the gray axis profile production step (step (a3)), and the profile calculation step (step (a4)), of the profile production method shown in FIG. 5. The details of each step are described below.

In the color reproduction range definition step (step (a1) in FIG. 5), the color reproduction range of the proofer 14 shown in FIG. 1 is defined such that vertices of W (white), C (cyan), M (Magenta), Y (yellow) R (red), G (green), and B (blue), that is, vertices other than a vertex of K (black) coincide with respective vertices of W, C, M, Y, R, G, and B of the color reproduction range of printing, and a ridgeline between any two vertices of W, C, M, Y, R, G, and B in the color reproduction range of the proofer 14 coincides with a ridgeline between two corresponding vertices in the color reproduction range of printing.

For the vertex of K (black) of the color reproduction range of the proofer 14, the vertex is set at a point (C, M, Y, K)=(100, 100, 100, $K_{max}$) where $K_{max}$ is a maximum allowable value of K according to the K-value constraint (FIG. 15). Ridgelines are drawn so as to extend from the respective vertices of R, G, and B to the vertex of K of the color reproduction range of the proofer 14 in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100). Note that the positions of the respective vertices of the color reproduction range of printing and positions of respective points in the L*a*b* color space corresponding to points (C, M, Y, K) can be determined from the printing-system profile shown in FIG. 14.

Before the further details of the step of defining the color reproduction range of the proofer 14 are described, the color reproduction range of printing is described.

Figure 18:
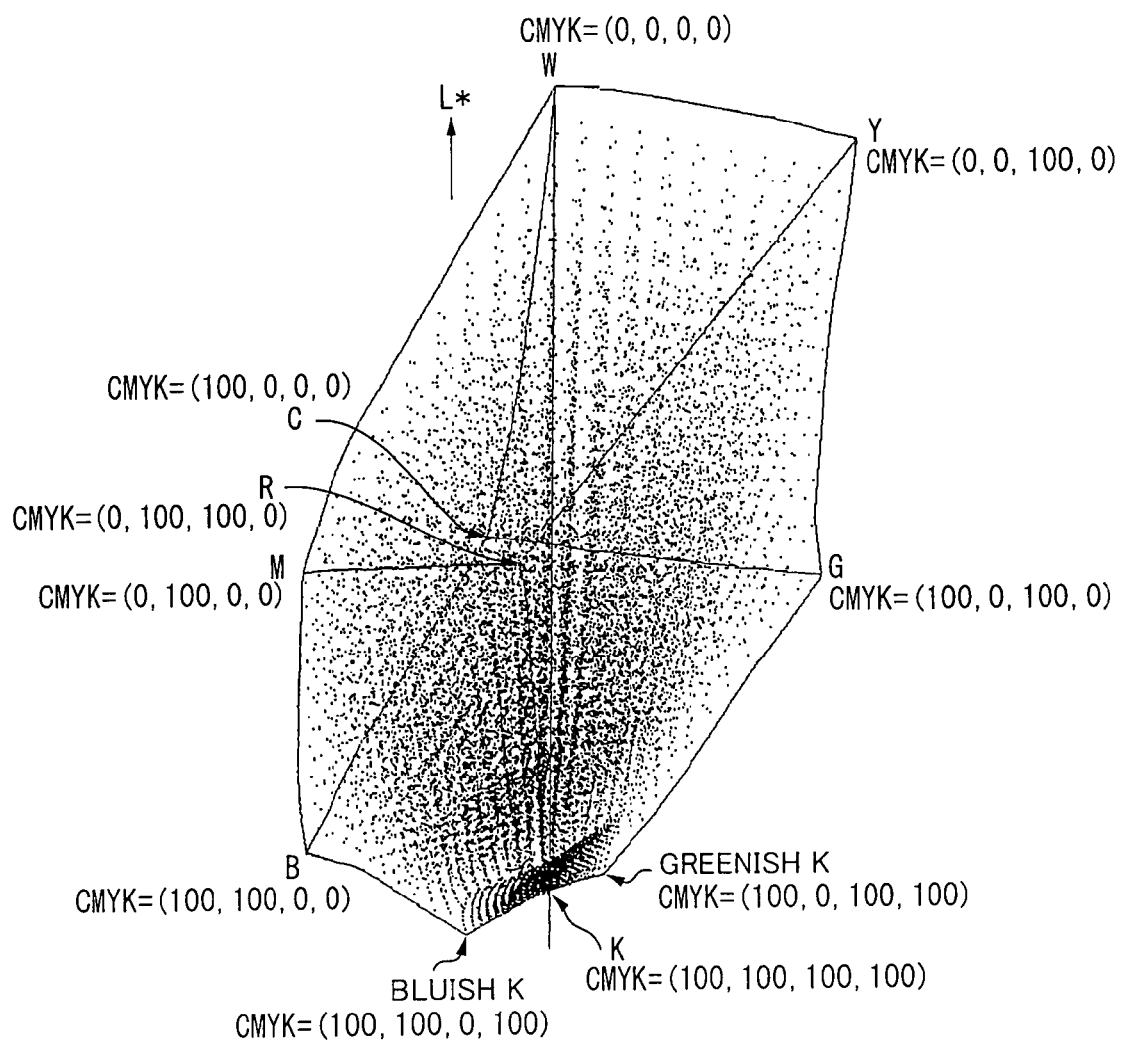
FIG. 18 is a diagram showing an example of a color reproduction range of a printing system.
Figure 19:
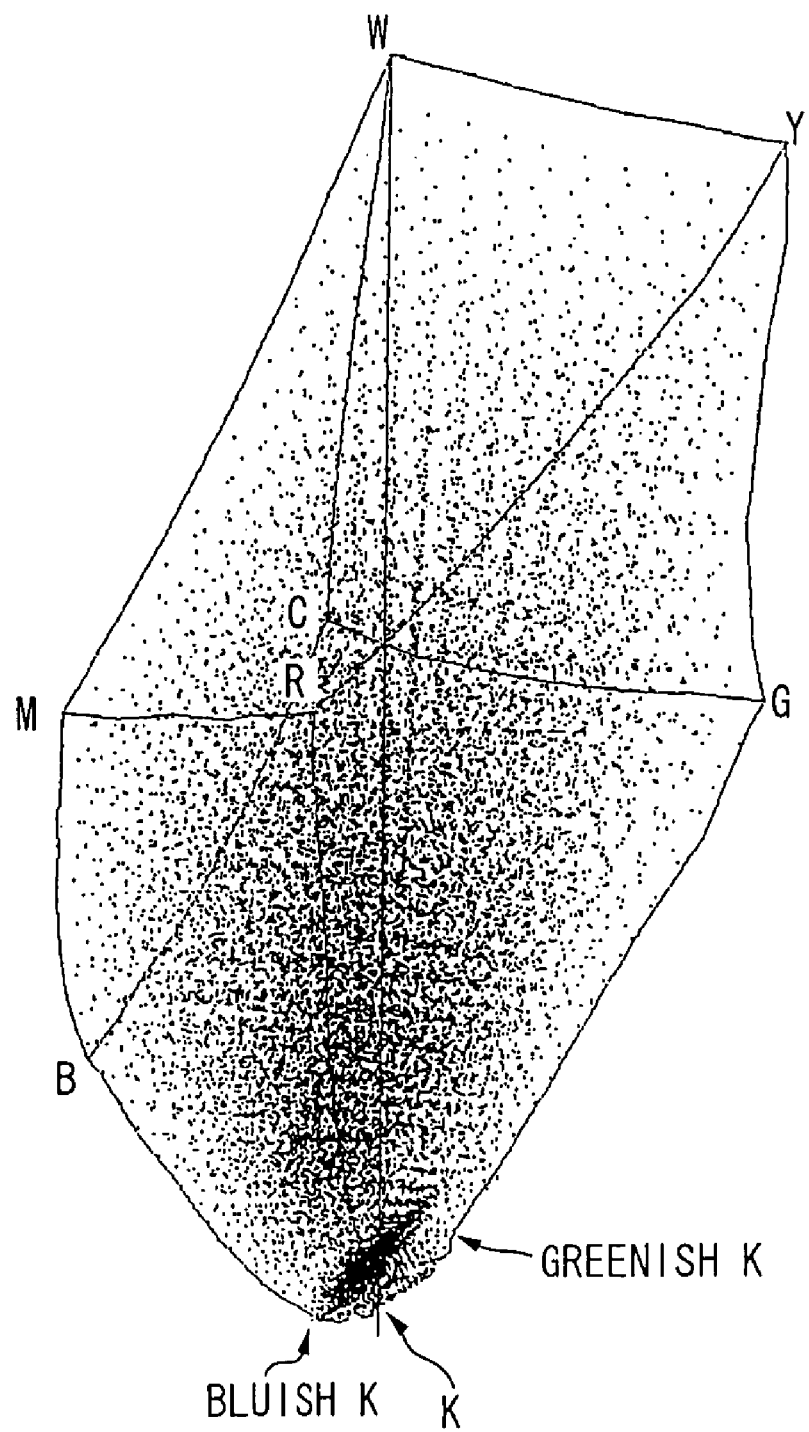
FIG. 19 is a diagram showing an example of a color reproduction range of a printing system.

FIGS. 18 and 19 are diagrams showing examples of the color reproduction range of printing. Conceptually, the color reproduction ranges shown in FIGS. 18 and 19 are determined from the printing-system profile 52 such as that shown in FIG. 14. In practice, they are determined from a different-type printing-system profile having a different internal definition (correspondence between CMYK and L*a*b*).

In each case of FIGS. 18 and 19, the color reproduction range of printing is represented in the L*a*b* color space, wherein dots denotes lattice points of a LUT defining the printing-system profile, and solid lines surrounding the dots denotes ridgelines extending between respective two vertices.

In each case of FIGS. 18 and 19, the color reproduction range of printing has a deformed shape. There is one vertex for each of W, C, M, Y, R, G, and B. For K, in addition to a vertex at (C, M, Y, K)=(100, 100, 100, 100), there are many vertices close to (C, M, Y, K)=(100, 100, 100, 100).

In the color reproduction range definition step (step (a1) in FIG. 5), first, the vertex of W (white point) of the color reproduction range of the proofer 14, that is, $(R_2, G_2, B_2)$=(255, 255, 255) is related to the color of paper to be used in printing, that is, (C, M, Y, K)=(0, 0, 0, 0). Note that 255 is the maximum RGB value in the $R_2G_2B_2$ color space of the color reproduction range of the proofer 14.

The vertex of K (black point) of the color reproduction range of the proofer 14, that is, $(R_2, G_2, B_2)$=(0, 0, 0) is related to point (C, M, Y, K)=(100, 100, 100, $K_{max}$) where $K_{max}$ is the maximum K values given by the function K=K(C) indicating the K-value constraint shown in FIG. 15. Note that 0 is the minimum RGB value in the color space of the color reproduction range of the proofer 14.

Vertices other than those of W and K, that is, vertices of C, M, Y, R, G, and B of the color reproduction range of the proofer 14 are placed at the same positions of the respective vertices of C, M, Y, R, G, and B of the color reproduction range of printing in the L*a*b* color space. Ridgelines other than three ridgelines from the vertex of K to respective vertices of R, G, and B, that is, nine ridgelines including three ridgelines from the vertex of W to respective vertices of C, M, and Y, two ridgelines from the vertex of C to respective vertices of G and B, two ridgelines from the vertex of M to respective vertices of B and R, and two ridgelines from the vertex of Y to respective vertices of R and G are drawn such that they coincide with corresponding ridgelines of the color reproduction range of printing expressed in the L*a*b* color space.

FIGS. 20 and 21 show tables in which a ridgeline between W and C and a ridgeline between C and G are respectively defined.

In FIG. 20, $(R_2, G_2, B_2)$=(255, 255, 255) is related to (C, M, Y, K)=(0, 0, 0, 0), that is, the white point. Note that the white point has an L*a*b* value equal to $L_W^* a_W^* b_W^*$ indicating the color of paper used.

The table shown in FIG. 20 represents the CMYK-to-$R_2G_2B_2$ correspondence for CMYK values taken in steps of 10 (in this specific case, values of C are varied in steps of 10). More specifically, $(R_2, G_2, B_2)$=(255×(9/10), 255, 255) is related to (C, M, Y, K)=(10, 0, 0, 0) at which the L*a*b* value is equal to $L_{11}^* a_{11}^* b_{11}^*$. Similarly other points on the ridgeline from W to C in the color reproduction range of the proofer 14 are related to corresponding points on the ridgeline from W to C in the color reproduction range of printing, and an end point $(R_2, G_2, B_2)$=(0, 255, 255), that is the vertex of C, is related to (C, M, Y, K)=(100, 0, 0, 0) at which the L*a*b* value is equal to $L_C^* a_C^* b_C^*$.

Thus, the correspondence between sets of values of $R_2$, $G_2$, and $B_2$ and sets of values of C, M, Y, and K defines the correspondence in terms of the ridgeline from W and C, and the correspondence between the CMYK and L*a*b* is determined from the printing-system profile 52 shown in FIG. 14.

In FIG. 21, in the top row of the table, as in the bottom row of the table in FIG. 20, the vertex of C $(R_2, G_2, B_2)$=(0, 255, 255) is related to (C, M, Y, K)=(100, 0, 0, 0) at which the L*a*b* value is equal to $L_C^* a_C^* b_C^*$. The correspondence in terms of points on the ridgeline from this vertex of C to the vertex of G is defined by relating points such that $(R_2, G_2, B_2)$=(0, 255, 255×(9/10)) is related to (C, M, Y, K)=(100, 0, 10, 0) at which the L*a*b* value is equal to $L_{21}^* a_{21}^* b_{21}^*$, and similarly other points on the ridgeline from C to G in the color reproduction range of the proofer 14 are related to corresponding points on the ridgeline from C to G in the color reproduction range printing. At an end point of this ridgeline, the vertex of G, that is, $(R_2, G_2, B_2)$=(0, 255, 0) is related to (C, M, Y, K)=(100, 0, 100, 0) at which the L*a*b* value is equal to $L_G^* a_G^* b_G^*$.

Thus, nine ridgelines other than three ridgelines from the vertex of K to respective vertices of R, G, and B are defined.

Subsequently, ridgelines from respective vertices of R, G, and B to the vertex of K defined at (C, M, Y, K)=(100, 100, 100, $K_{max}$) are defined.

Figures 22, 23:
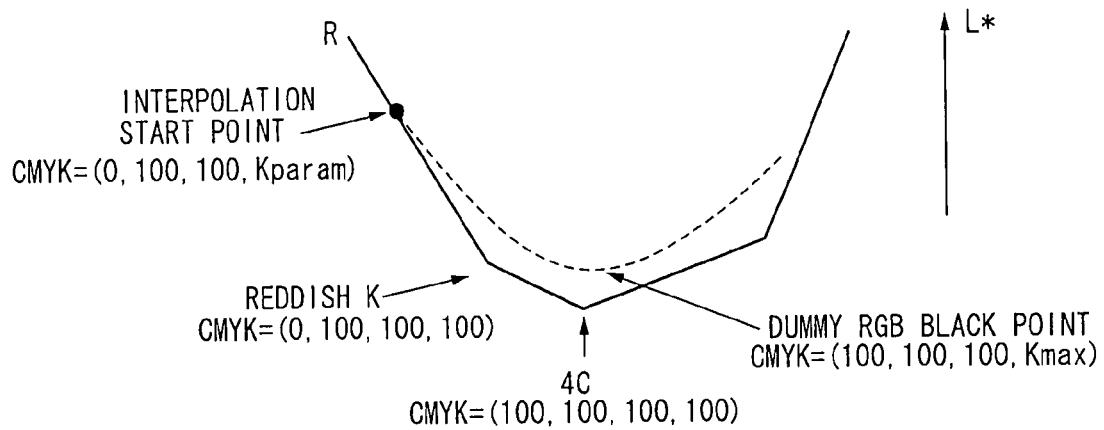
FIG. 22 is a diagram showing a manner in which a ridgeline between a vertex of R and a vertex of K is defined.
FIG. 23 is a diagram showing a table in which a ridgeline between vertices R and K is defined.

FIG. 22 is a diagram showing a manner in which a ridgeline between the vertex of R and the vertex of K is defined.

Conceptually, the ridgeline is defined such that it extends first from the vertex of R toward reddish K point until reaching a midpoint (C, M, Y, K)=(0, 100, 100, $K_{param}$), and then deviates from the ridgeline from R to reddish K and extends from the midpoint (C, M, Y, K)=(0, 100, 100, $K_{param}$) to the vertex of K defined at (C, M, Y, K)=(100, 100, 100, $K_{max}$).

FIG. 23 shows a table in which the ridgeline between vertices R and K is defined.

For the vertex of R, $(R_2, G_2, B_2)$=(255, 0, 0) is related to (C, M, Y, K)=(0, 100, 100, 0) at which the L*a*b* value is equal to $L_R^* a_R^* b_R^*$. In the range from this vertex of R to the midpoint K=$K_{param}$, points are related such that $(R_2, G_2, B_2)$=(255×(9/10), 0, 0) is related to (C, M, Y, K)=(0, 100, 100, 10) at which the L*a*b* value is equal to $L_{31}^* a_{31}^* b_{31}^*$ and further points are related along the ridgeline from the vertex of R toward the reddish K. At the midpoint K=$K_{param}$, $(R_2, G_2, B_2)$=$(R_p, 0, 0)$ is related to (C, M, Y, K)=(0, 100, 100, $K_{param}$) at which the L*a*b* value is equal to $L_{3P}^* a_{3P}^* b_{3P}^*$.

In the example shown in FIG. 23, $K_{param}$ has a value equal to an integral multiple of 10 for convenience of illustration, the value of $K_{param}$ is not necessarily needed to be equal to an integral multiple of 10.

After the midpoint $K_{param}$ on the ridgeline from R to reddish K is reached, points are defined along a line deviating from the ridgeline from R to reddish K and extending from the midpoint $K_{param}$ to the vertex of K (C, M, Y, K)=(100, 100, 100, $K_{max}$). The points on the curved line deviating from the ridgeline from R to reddish K and extending toward the vertex of K can be determined by means of interpolation such as quasi Hermite interpolation. Note that $R_2G_2B_2$ is related to CMYK at any point on the ridgeline from R toward reddish K, and $(R_2, G_2, B_2)$=(0, 0, 0) is related to (C, M, Y, K)=(100, 100, 100, $K_{max}$) at the vertex of K at which L*a*b* is related to $L_K^* a_K^* b_K^*$, but $R_2G_2B_2$ is not related to any CMYK in the ranges from midpoint to the vertex of K, and $R_2G_2B_2$ is related directly to L*a*b*. This does not create any problem in the following process, because CMYK values are used simply to relate ridgelines (all ridgelines including those extending from respective vertices of R, G, and B to the vertex of K) to ridgelines in the color reproduction range of the printing system, and the CMYK values become unnecessary once the correspondence in terms of ridgelines has been defined.

Note that $K=K_{param}$, at which the ridgeline deviates from the line from R to reddish K, should be smaller than the maximum value of K ($K_{max}$) prescribed in the K-value constraint $K=K(C)$, that is, $K_{param}<K_{max}$.

If $K_{param}$ is greater than $K_{max}$, K values at points close to gray axis become greater than K values on the gray axis. Because the black point on the profile of the proofer 14 is fixed at $K_{max}$, inversion of the K value can occur in a shadow area close to the gray axis in the proofer profile. The inversion of the K value can cause inversion in C, M, or Y value, which will not be accepted by a printing operator.

In general, the gray axis of the profile of the printer 11 serving as an input device shown in FIG. 1 (the printer profile 13 shown in FIG. 13) is not necessarily coincident with the gray axis of the proofer profile 14 produced above, but, in general, the gray axis of the profile of the printer 11 is slightly different from gray axis of the proofer profile. The K-value constraint $K=K(C)$ shown in FIG. 15 should be satisfied not in the proofer 14 but in the actual printer 11. To satisfy the K-value constraint $K=K(C)$ in printer 11 whose gray axis is not necessarily coincident with the gray axis of the proofer 14, it is required that the K-value constraint $K=K(C)$ should be satisfied not only on the gray axis of the proofer profiler being produced but also in the vicinity of the gray axis. However, if $K_{param}>K_{max}$, there is a possibility that the K-value constraint $K=K(C)$ is not satisfied in the vicinity of the gray axis (for example, K-value constraint $K=K(C)$ is not satisfied on the gray axis of the printer 11) although the K-value constraint $K=K(C)$ is satisfied on the gray axis of the proofer profile being currently produced.

For the reason described above, $K_{param}$ must be set to be smaller than $K_{max}$.

Ridgelines from respective vertices of G and B to the vertex of K are also defined in a similar manner to the ridgeline from the vertex of R to the vertex of K described above. The value of $K_{param}$ may or may not be equal for the three ridgelines from the respective vertices of R, G, and B to the vertex of K.

Figure 24:
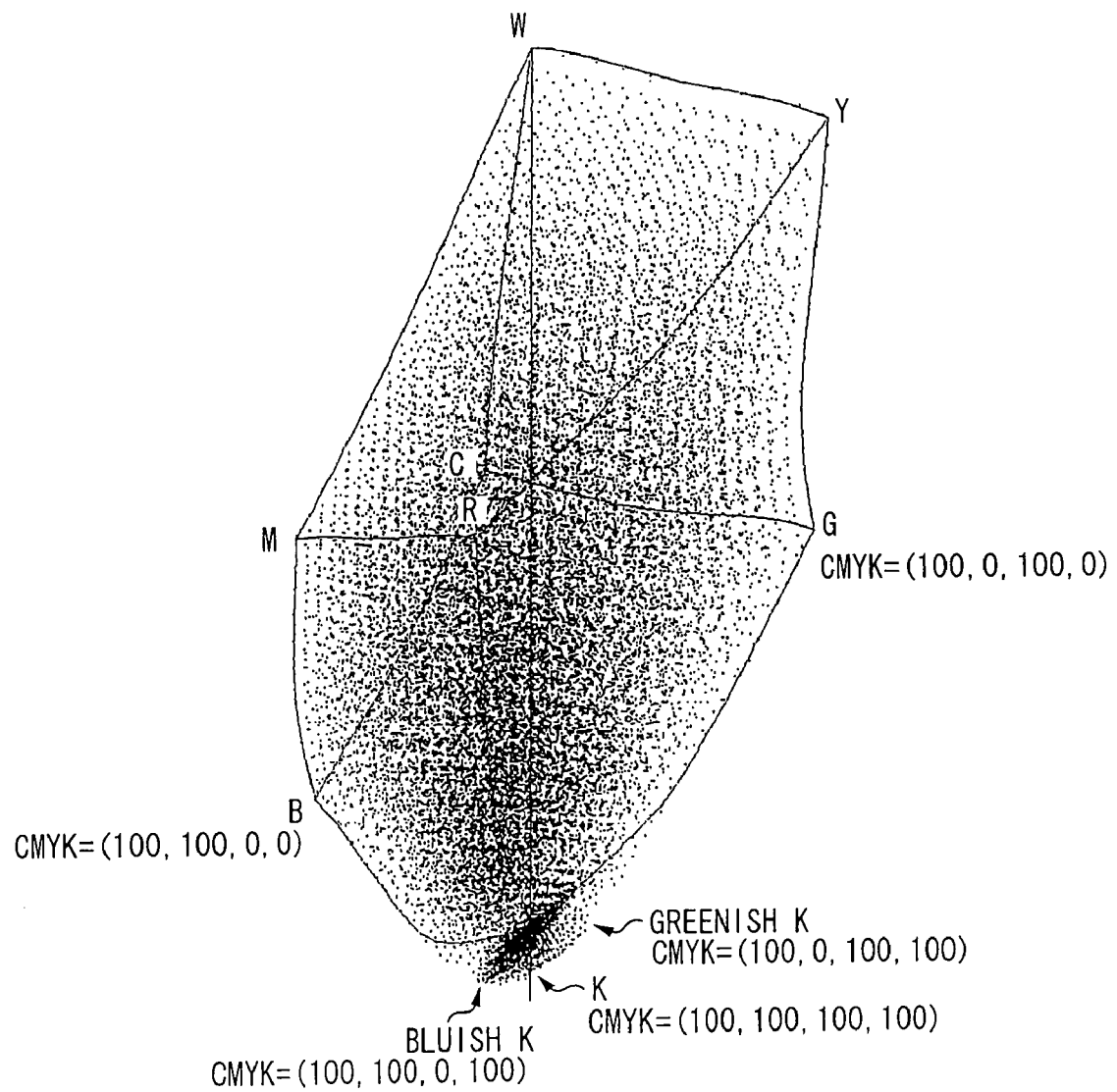
FIG. 24 is a diagram showing an example of a color reproduction range of a proofer, produced so as to well simulate a color reproduction range of a printing system.
Figure 25:
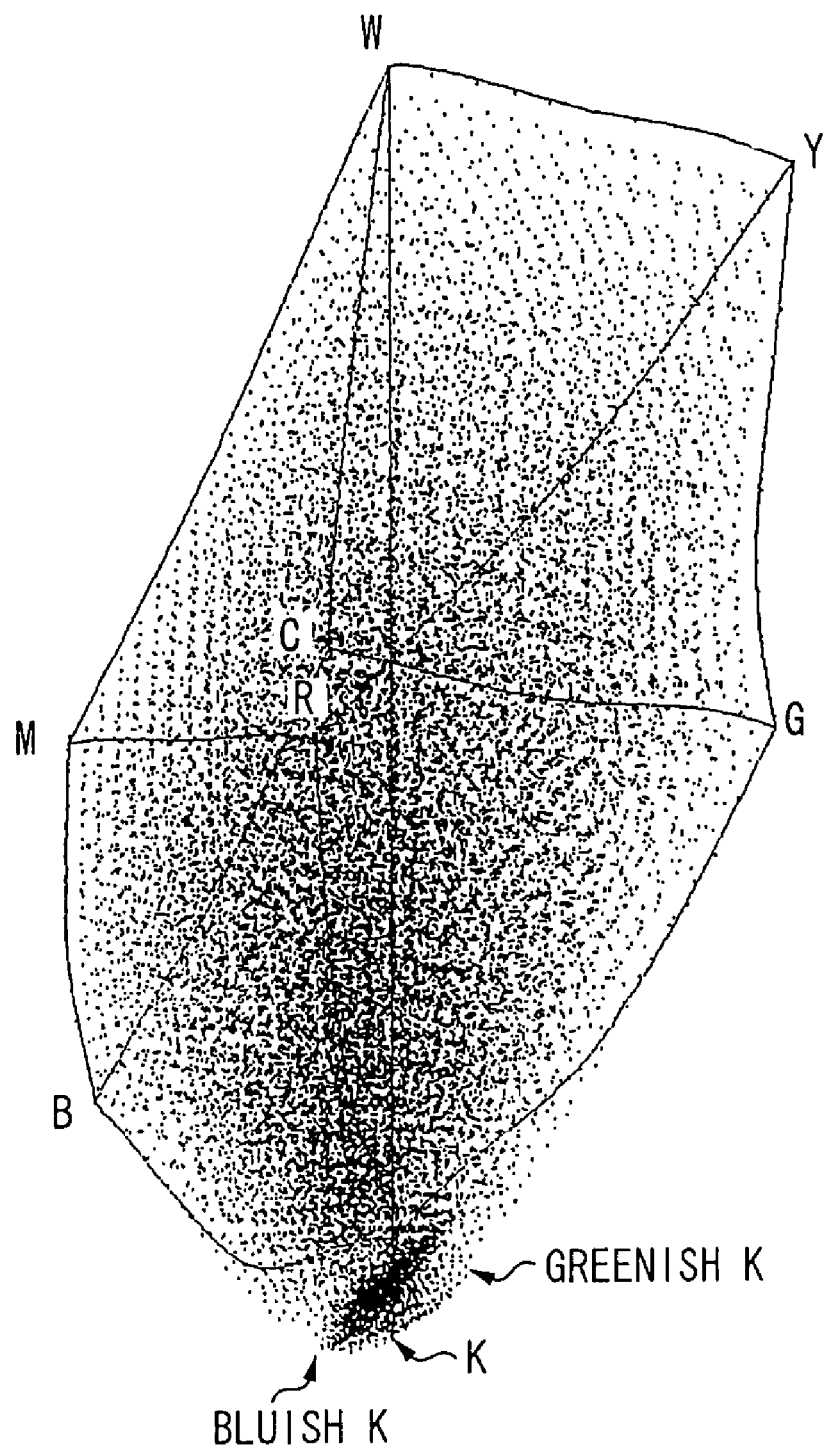
FIG. 25 is a diagram showing an example of a color reproduction range of a proofer, produced so as to well simulate a color reproduction range of a printing system.
Figure 26:
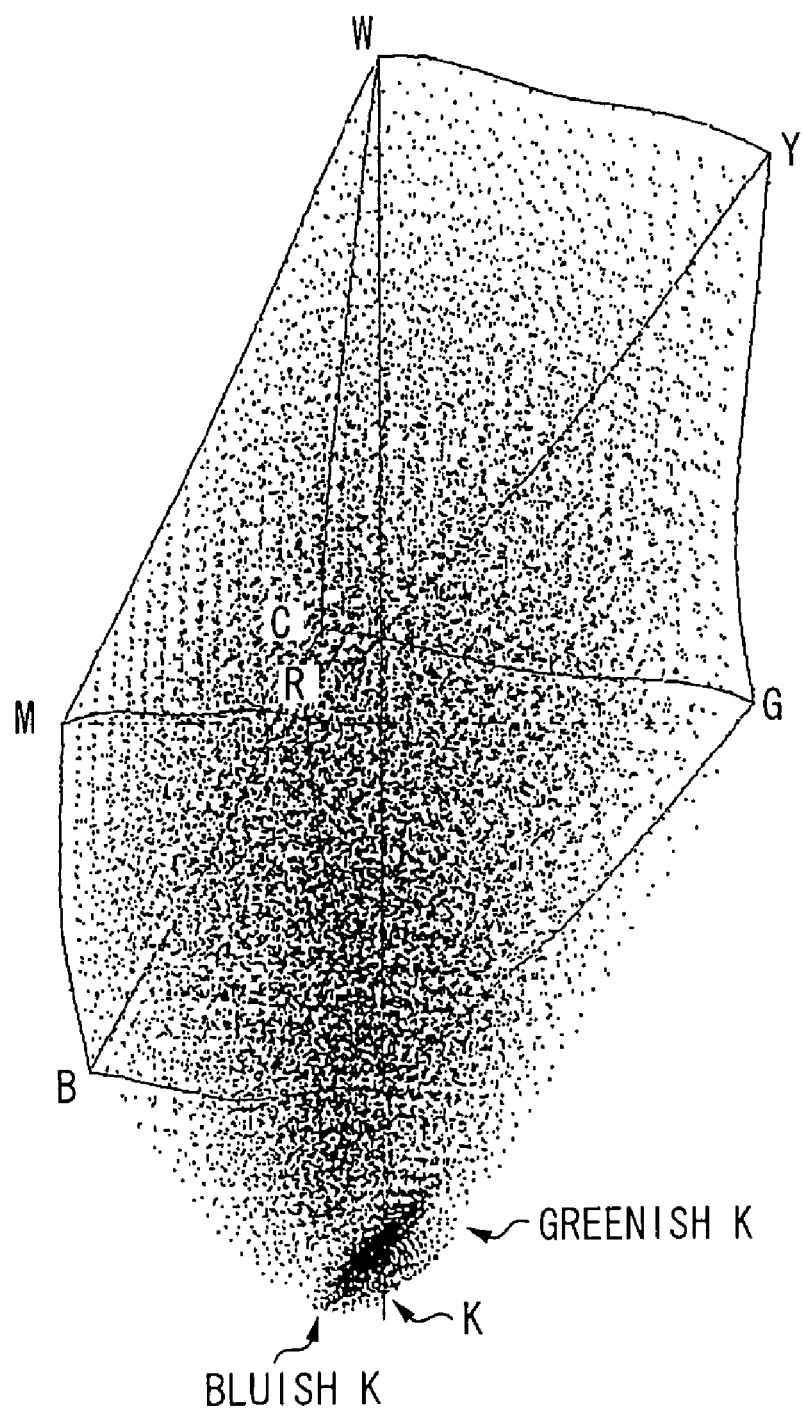
FIG. 26 is a diagram showing an example of a color reproduction range of a proofer, produced so as to well simulate a color reproduction range of a printing system.

FIGS. 24 to 26 are diagrams showing examples of the color reproduction range of the proofer 14, produced in the above-described manner in accordance with the color reproduction range of printing.

In FIGS. 24 to 26, dots are identical to those in the printing-system profile (LUT) shown in FIG. 19. Solid lines denote ridgelines of the color reproduction range of the proofer produced in the above-described manner for the respective cases in which the maximum value of K prescribed in the K value constraint $K=K(C)$ is 86, 64, and 18, respectively.

As can be seen from FIGS. 24 to 26, the difference between the proofer profile and the printing-system profile in an area close to K increases with decreasing $K_{max}$. The value of $K_{max}$ is determined by a specific printing company in accordance with the technical policy that K values greater than $K_{max}$ are not used in printing, and thus the proofer profile does not need to be consistent with the printing-system profile for K values greater than $K_{max}$. It is sufficient to employ $K_{max}$ as the black point in the proofer profile.

The color reproduction range definition step (step (a1)) shown in FIG. 5 has been described above.

Now, the ridgeline profile production step (step (a2)) shown in FIG. 5 is explained.

A ridgeline profile is produced by modifying the correspondence between $R_2G_2B_2$ values and $L*a*b*$ values such that equally spaced points on ridgelines in the $R_2G_2B_2$ (edges of a regular hexahedron in the $R_2G_2B_2$ color space) correspond to equally spaced points on ridgelines in the $L*a*b*$ color space.

Figure 27:
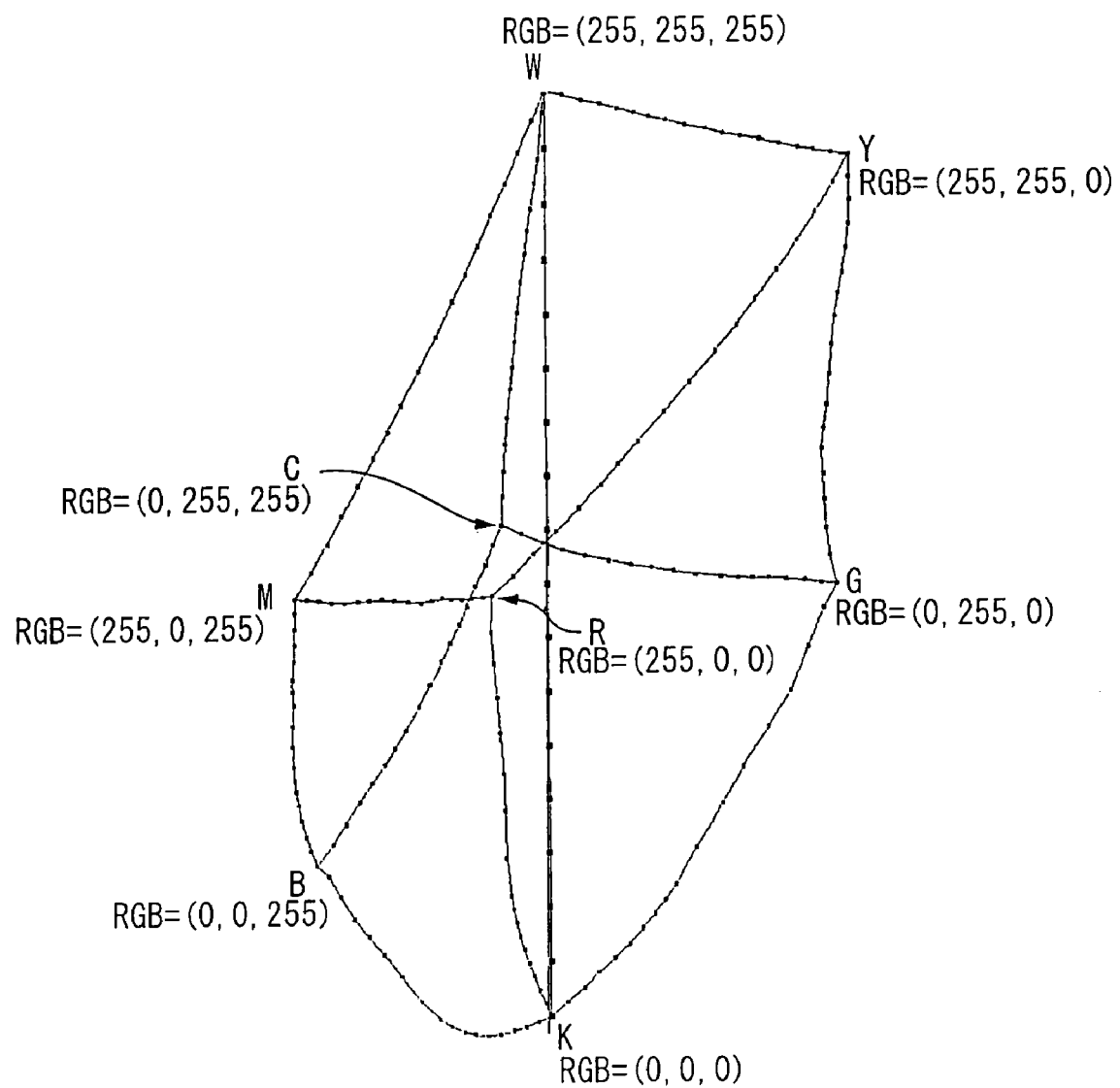
FIG. 27 is a diagram showing points on ridgelines in an original state in which the correspondence has not yet been modified.
Figure 28:
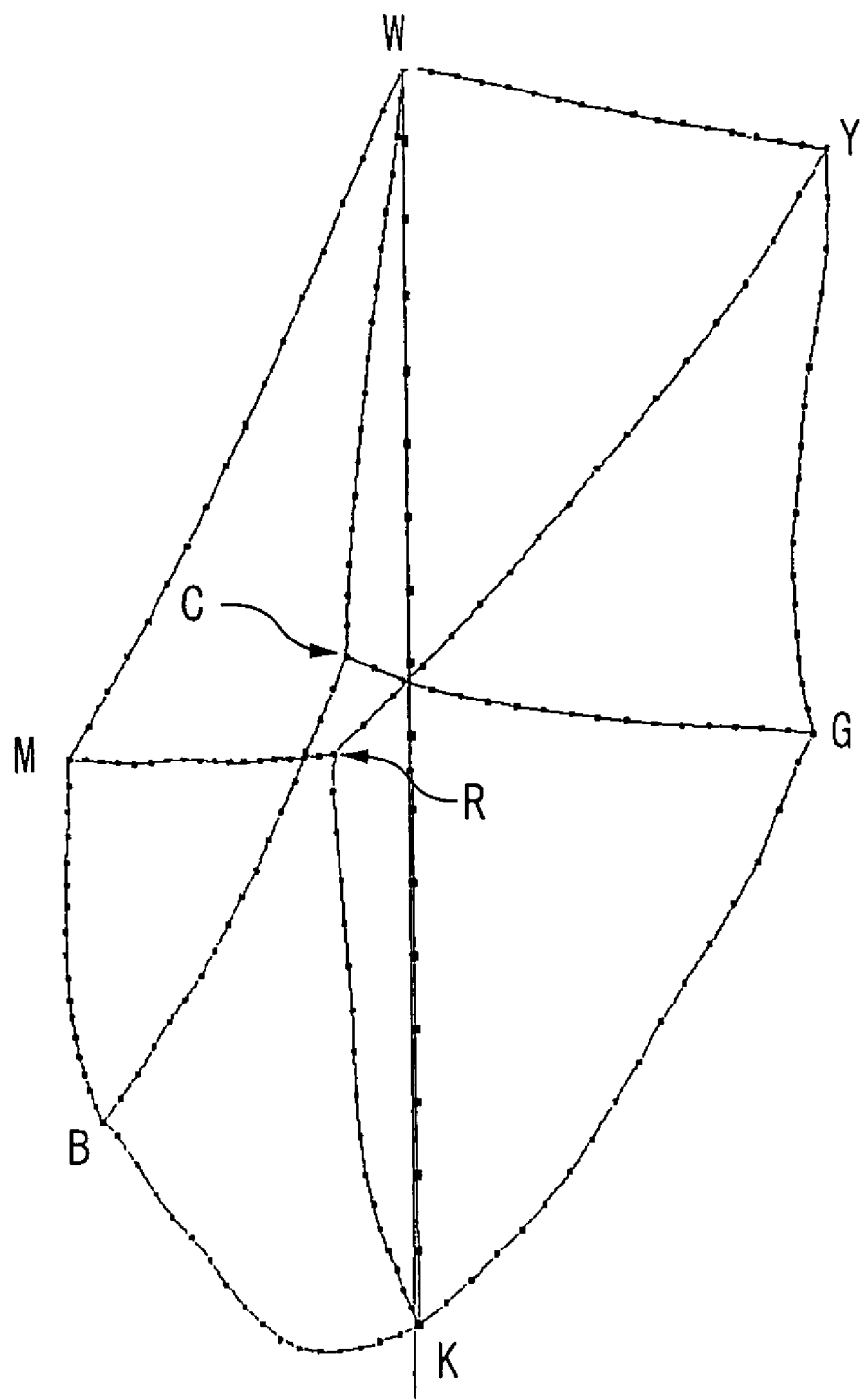
FIG. 28 is a diagram showing points on ridgelines in a state in which the correspondence has been modified.

FIG. 27 is a diagram showing points on ridgelines in an original state, and FIG. 28 shows points on ridgelines in a state in which the correspondence has been modified.

As shown in FIGS. 20, 21, and 23 (hereinafter, FIG. 20 will be referred to, as a representative example), points $(R_2, G_2, B_2)=(255, 255, 255)$, $(255\times(\%_{10}), 255, 255)$, $(255\times(\%_{10}), 255, 255)$, ..., $(0, 255, 255)$ are located at equal intervals in the $R_2G_2B_2$ color space. However, when those points are mapped into the $L*a*b*$ color space, the resultant points $(L*, a*, b*)=(L_W*, a_W*, b_W*)$, $(L_{11}*, a_{11}*, b_{11}*)$, $(L_{12}*, a_{12}*, b_{12}*)$, ..., $(L_C*, a_C*, b_C*)$ in the $L*a*b*$ color space are not necessarily located at equal intervals, but they are generally located at irregular intervals. In the ridgeline profile production step, $L*a*b*$ values are redefined such that points on ridgelines in the $R_2G_2B_2$ color space are mapped to equally spaced points on the same ridgelines as the original ones in the $L*a*b*$ color space. The point-to-point distance along ridgelines may be different among ridgelines in the $L*a*b*$ color space.

FIG. 29 shows a table in which a ridgeline between W and C is redefined.

In the table shown in FIG. 29, points $(R_2, G_2, B_2)=(255, 255, 255)$, $(255\times(\%_{10}), 255, 255)$, $(255\times(\%_{10}), 255, 255)$, ..., $(0, 255, 255)$ are at the same locations as the original locations defined in the table shown in FIG. 20, and thus they are located at equal intervals in the $R_2 G_2B_2$ color space. However, unlike in the table shown in FIG. 20, corresponding points in the $L*a*b*$ color space are also located at equal intervals such as at $(L*, a*, b*)=(L_W*, a_W*, b_W*)$, $(L_{111}*, a_{111}*, b_{111}*)$ $(L_{112}*, a_{112}*, b_{112}*)$, ..., $(L_C*, a_C*, b_C*)$. Note that no CMYK values are defined in the table shown in FIG. 29, but CMYK values are defined after the K-value constraint over the entire color reproduction range is determined, as will be described later.

The redefining of the $L*a*b*$ values may be performed using a one-dimensional LUT representing the $L*a*b*$ value as a function of the distance along a ridgeline from an end (vertex) of that ridgeline.

Although FIG. 29 illustrates only one ridgeline between W and C, the redefining of $L*a*b*$ values corresponding to respective $R_2G_2B_2$ values on ridgelines is performed for all twelve ridgelines.

By redefining the correspondence in the above-described manner, it becomes possible to perform gamut mapping without creating gray level distortion.

The details of the ridgeline profile production step (step (a2)) shown in FIG. 5 have been described above.

Now, the gray axis profile production step (step (a3)) shown in FIG. 5 is explained.

In the gray axis profile production step (step (a3)), a gray axis profile is produced such that points located at equal intervals on the gray axis extending between vertices W and K of the color reproduction range of the proofer 14 in the $R_2G_2B_2$ color space are mapped to points located at equal intervals on the gray axis extending between vertices W and K in the $L*a*b*$ color space defined in the color reproduction range definition step (step (a1)) in FIG. 5.

FIG. 30 shows a table in which the gray axis profile is defined.

In this table, the vertex of W located at $(R_2, G_2, B_2)=(255, 255, 255)$ in the $R_2G_2B_2$ color space is related to a point of W located at (L*, a*, b*)=($L_W^*$, $a_W^*$, $b_W^*$) in the L*a*b* color space, wherein (L*, a*, b*)=($L_W^*$, $a_W^*$, $b_W^*$) is related to (C, M, Y, K)=(0, 0, 0, 0). The vertex of K located at ($R_2$, $G_2$, $B_2$)=(0, 0, 0) in the $R_2G_2B_2$ color space is related to a point of K located at (L*, a*, b*)=($L_K^*$, $a_K^*$, $b_K^*$) in the L*a*b* color space, wherein (L*, a*, b*)=($L_K^*$, $a_K^*$, $b_K^*$) is related to (C, M, Y, K)=(100, 100, 100, $K_{max}$) defined in the above-described manner. Furthermore, points located at equal intervals on the gray axis extending between W and K in the $R_2G_2B_2$ color space, such as ($R_2$, $G_2$, $B_2$)=(255, 255, 255), (255×(9/10), 255×(9/10)), 255×(9/10), ..., (0, 0, 0), are related to points located at equal intervals on the gray axis extending between W and K in the L*a*b* color space, such as (L*, a*, b*)=($L_W^*$, $a_W^*$, $b_W^*$), ($L_W$×(9/10)+$L_K^*$×(1/10), $a_W^*$×(9/10)+$a_K^*$×(1/10), $b_W^*$×(9/10)+$b_K^*$×(1/10)), ..., ($L_K^*$, $a_K^*$, $b_K^*$).

The reason why points located at equal intervals on the gray axis in the $R_2G_2B_2$ color space are related to points located at equal intervals on the gray axis in the L*a*b* color space is to realize gamut mapping that does not result in distortion in gray levels.

In FIGS. 27 and 28, points located at equal intervals on the gray axis are shown.

In the profile calculation step (step (a4)) shown in FIG. 5, a profile of the color reproduction range of the proofer 14, associated with surface planes other than ridgelines and in the inside of the color reproduction range other than gray axis, is calculated by means of interpolation in which the ridgeline profile produced in the ridgeline profile production step (in step (a2)) and the gray axis profile produced in the gray axis profile production step (in step (a3)) are used as a boundary condition.

In the calculation, coefficients $a_0$ to $a_9$, $b_0$ to $b_9$ and $c_0$ to $c_9$ of the following quadratics are determined such that the quadratics best fits for the $R_2G_2B_2$ values and the corresponding L*a*b* values defined in the ridgeline profile and the gray axis profile produced in the above-described manner.

$$L^* = a_0 R_2^2 + a_1 G_2^2 + a_2 B_2^2 + a_3 R_2 G_2 + a_4 G_2 B_2 + a_5 B_2 R_2 + a_6 R_2 + a_7 G_2 + a_8 B_2 + a_9$$

$$a^* = b_0 R_2^2 + b_1 G_2^2 + b_2 B_2^2 + b_3 R_2 G_2 + b_4 G_2 B_2 + b_5 B_2 R_2 + b_6 R_2 + b_7 G_2 + b_8 B_2 + b_9$$

$$b^* = c_0 R_2^2 + c_1 G_2^2 + c_2 B_2^2 + c_3 R_2 G_2 + c_4 G_2 B_2 + c_5 B_2 R_2 + c_6 R_2 + c_7 G_2 + c_8 B_2 + c_9$$

Using the quadratics whose coefficients are determined in the above-described manner, $R_2G_2B_2$ values are related to L*a*b* values over the entire color reproduction range of the proofer 14.

Figure 31:
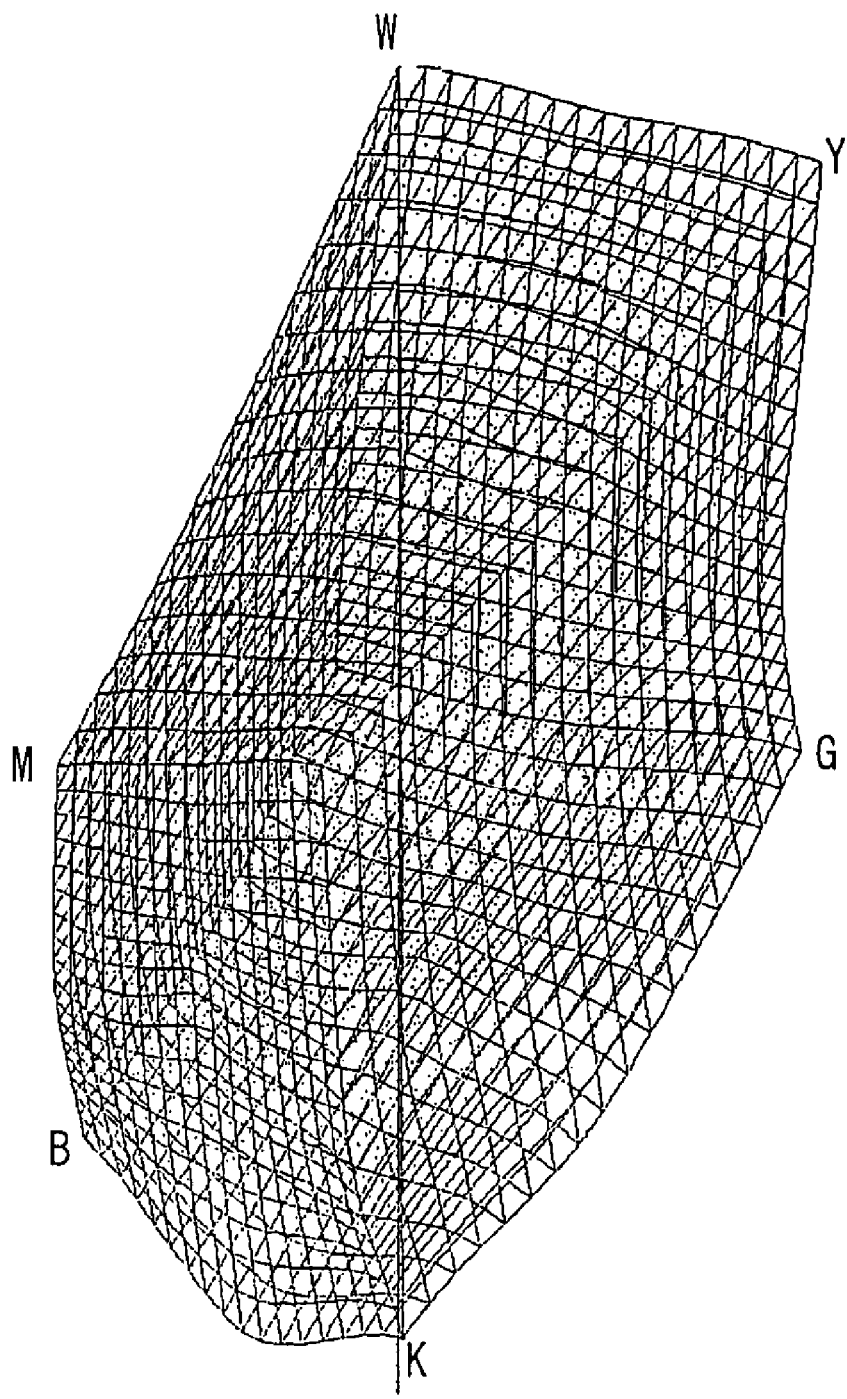
FIG. 31 is a conceptual diagram showing a color reproduction characteristic (proofer profile)

FIG. 31 is a conceptual diagram showing the color reproduction characteristic (proofer profile) obtained by defining the correspondence over the entire color reproduction range of the proofer 14 in the above-described manner.

Thus, in the profile production step (profile production method shown in FIG. 5) in step (A) of the color conversion definition method shown in FIG. 4, the proofer profile of the virtual proofer 14 shown in FIG. 1 is determined as described above. This proofer profile simulates the color reproduction range of printing very well, except for a region in which the K value is greater than $K_{max}$ and which was discarded because this region is unnecessary.

In the present embodiment described above, the gray axis profile is produced in the gray axis profile production step (step (a3)) in FIG. 5, and then in the profile calculation step (step (a4)) in FIG. 5, the profile over the entire color reproduction range is produced by means of interpolation in which the ridgeline profile and the gray axis profile are used as the boundary condition. Alternatively, the gray axis profile production step (step (a3)) may be omitted, and the profile over the entire color reproduction range may be produced by means of interpolation in which only the ridgeline profile is used as the boundary condition.

Now, the first color conversion definition step (step (B)) of the color conversion definition method shown in FIG. 4 is explained. Herein, by way of example, first color conversion definition step is based on the technique disclosed in Patent Document 2.

FIGS. 32(A) to 32(C) are diagrams showing the color reproduction range of the printer 11 and the proofer 14 shown in FIG. 1.

FIG. 32(A) shows the first RGB color space ($R_1G_1B_1$ color space) dependent on the printer 11, wherein only an R-G plane in the first RGB color space is shown for simplicity of illustration. FIG. 32(B) shows the L*a*b* employed herein as the reference color space, wherein only an L*-a* plane in the L*a*b* space is shown for simplicity of illustration. FIG. 32(C) shows the second RGB color space ($R_2G_2B_2$ color space) dependent on the proofer 14, wherein only an R-G plane is shown for simplicity of illustration.

The printer 11 outputs a printed image 11a in accordance with the image data including R, G, and B components each taking a value in the range from 0 to 255. In this case, the color reproduction range of the printer 11 is given by a rectangular area 101 shown in FIG. 32(A).

If the color reproduction range 101 (shown in FIG. 32(A)) of the printer 11 is mapped into the L*a*b* space in accordance with the color reproduction characteristic (the printer profile 51 (shown in FIG. 13)) of the printer 11, the resultant color reproduction range of the printer 11 in the L*a*b* space is given by an area 102 in FIG. 32(B). If the color reproduction range 102 is further mapped into the second RGB color space ($R_2G_2B_2$ color space) dependent on the proofer 14 in accordance with the color reproduction characteristic (proofer profile 53 (shown in FIG. 16)) of the proofer 14, the resultant color reproduction range of the printer 11 is given by an area 103 shown in FIG. 32(C).

On the other hand, the color reproduction range (proofer profile) of the proofer 14 shown in FIG. 1 is given by a cubic region (a rectangular area 303 in the R-G plane in FIG. 32(C)) in the second RGB color space shown in FIG. 32(C), wherein R, G, and B values can vary within the range from 0 to 255 in this cubic region. Thus, when image data indicating coordinate points whose R, G, and B components are each within the range from 0 to 255 in the first RGB color space ($R_1G_1B_1$ color space) dependent on the printer 11 is converted to image data expressed in the second RGB color space ($R_2G_2B_2$ color space) via the L*a*b* color space, there is a possibility that some of the resultant points in the second RGB color space ($R_2G_2B_2$ color space) have a color that has values out of the allowable range (0 to 255) for all RGB components and that cannot be represented by the proofer 14. For example, (R, G)=(110, 290) or (R, G)=(−100, 260) shown in FIG. 32(C) are such points. Such image data having a value out of the color reproduction range of the proofer 14 cannot be dealt with by the proofer 14. To avoid the above problem, it has been proposed to clip the image data so that the resultant image data has a value on the boundary of the color reproduction range of proofer 14. More specifically, (R, G)=(110, 290) is converted to (R, G)=(110, 255), and (R, G)=(−100, 260) is converted to (R, G)=(0, 255).

In the case of mapping into a color space dependent on a particular device (the proofer 14 in this specific example), the flexibility of mapping is low. That is, data out the color reproduction range of the proofer 14 is simply clipped and values on the boundary of the color reproduction range are employed. Thus, when a color reproduction range of a particular device (for example, the printer 11) is mapped to a color reproduction range of another device (for example, the proofer 14), a great reduction can occur in mapping accuracy in particular in a region close to a boundary of the color reproduction range.

On the other hand, when the color reproduction range 303 of the proofer 14, given by the rectangular area extending from 0 to 255 in respective direction as shown in FIG. 32(C) is mapped into the L*a*b* space according to the color reproduction characteristic (proofer profile) of the proofer 14, the resultant color reproduction range in the L*a*b* color space is given by an area 302 shown in FIG. 32(B). According to one of known techniques, it is possible to convert data in the color reproduction range 102 of the printer 11 (first device) to data in the color reproduction range 302 of the proofer 14 (second device) in the reference color space such as the L*a*b* color space.

In the color conversion (mapping) in the L*a*b* space, when as wide a region as possible in the color reproduction range representable by the proofer 14 is used, both compression and expansion can generally occur. In the compression, data located outside a common area 402, in which the color reproduction range 101 of the printer 11 and the color reproduction range 302 of the proofer 14 overlap, is mapped into the inside of the common area 402 as represented by broken arrows in FIG. 32(B). In the expansion, data located inside the common area is expanded to the outside of the common area 402 within the inside of the color reproduction range 302 of the proofer 14 as represented by solid arrows in FIG. 32(B).

However, in the mapping in the reference color space such as the L*a*b* color space according to conventional techniques, too great flexibility of mapping can cause a discontinuity or an in color tone or an unnatural color tone.

If the color reproduction range 302 of the proofer 14 mapped in the L*a*b* space in FIG. 32(B) is further mapped into the first RGB color space shown FIG. 32(A), the resultant mapped region 301 has a deformed shape including a region extending outward from the edge of the rectangular area 101 of the color reproduction range of the printer 11, as shown in FIG. 32(A).

The reference color space is described in further detail below. In the embodiments described above, the L*a*b* color space is employed as the reference color space. However, the reference color space is not limited to the L*a*b* color space. Any color space defined without dependent on a particular input or output device may be employed as the reference color space.

For example, instead of the L*a*b* color space, a XYZ color space may be employed, or a coordinate system defined such that each coordinate point in a color space is uniquely related to a coordinate point in the coordinate system may be employed. An example of such a coordinate system is a standard RGB signal coordinate system defined as follows.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Herein, if $R_{sRGB}$ expressed in 8 bits is denoted as $R_{8bit}$, then $R_{8bit} = 255 \times 12.92 R_{sRGB}$ ($0 < R_{sRGB} < 0.00304$)

$R_{8bit} = 255 \times 1.055 R_{sRGB}^{(1.0/2.4)} - 0.055$
 ($0.00304 \leq R_{sRGB} \leq 1$)

Similarly, if $G_{sRGB}$ and $B_{sRGB}$ expressed in 8 bits are respectively denoted as $G_{8bit}$ and $B_{8bit}$, then $G_{8bit}$ and $B_{8bit}$ can be obtained from $G_{sRGB}$ and $B_{sRGB}$.

Alternatively, the color space defined for the CMY density of a reversal film may be employed as the reference color space. Once the reference color space is defined, the color reproduction range can be strictly defined in that reference color space.

Figure 33:
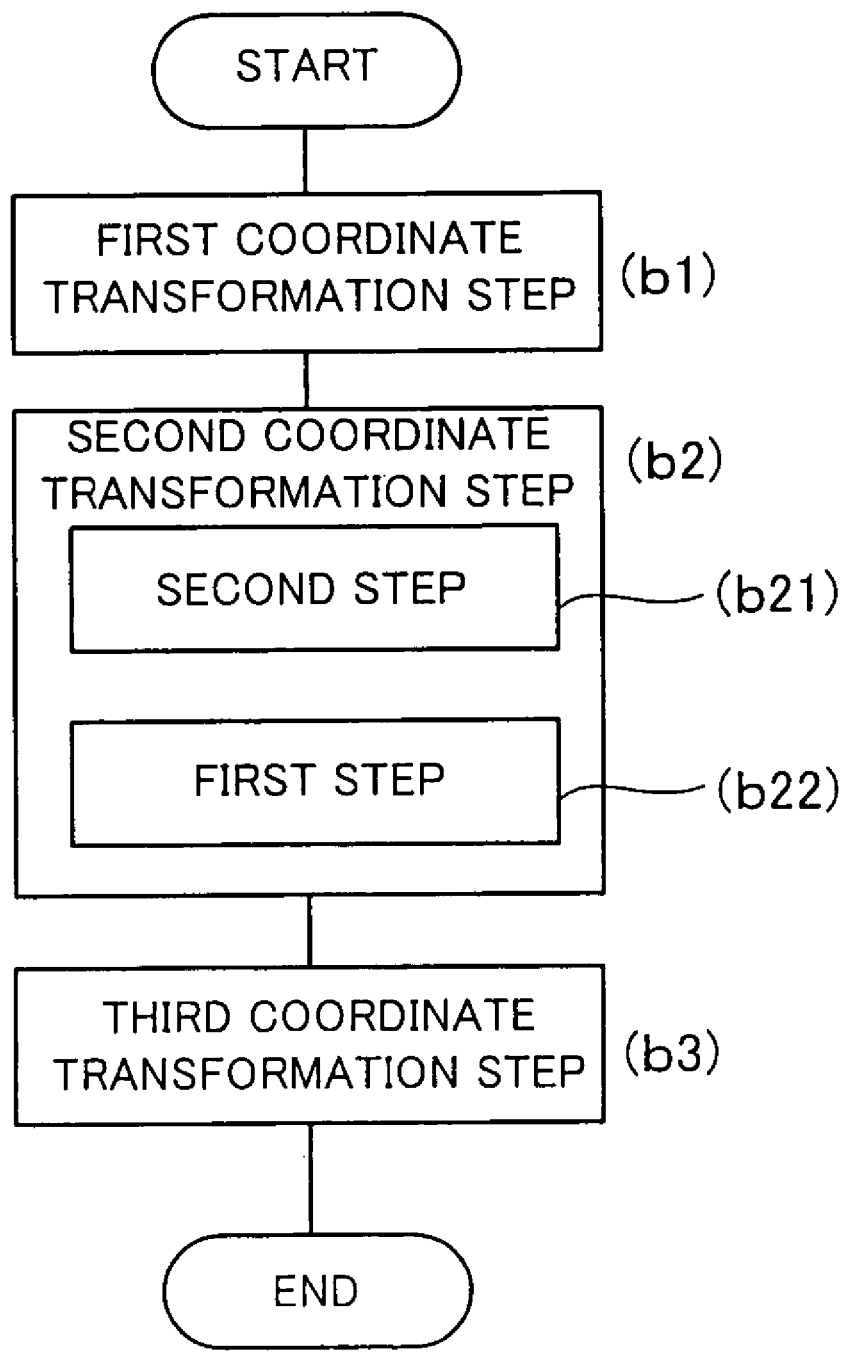
FIG. 33 is a flow chart showing a first color conversion definition step of a color conversion definition method implemented on a computer system by executing a color conversion definition program on the computer system.

FIG. 33 is a flow chart showing the first color conversion definition step of the color conversion definition method implemented by executing the color conversion definition program on the computer system shown in FIGS. 2 and 3. Note that the step shown in FIG. 33 corresponds to the first color conversion definition step (in step (B)) shown in FIG. 4.

The first color conversion according to the present invention is defined via a first coordinate transformation step (step b1), a second coordinate transformation step (step b2), and a third coordinate transformation step (step b3). Basically, in the second coordinate transformation step (step b2), a first step (step b22) is executed. In the present embodiment, in order to more precisely define the color conversion, a second step (step b21) is performed before the first step.

Figure 34:
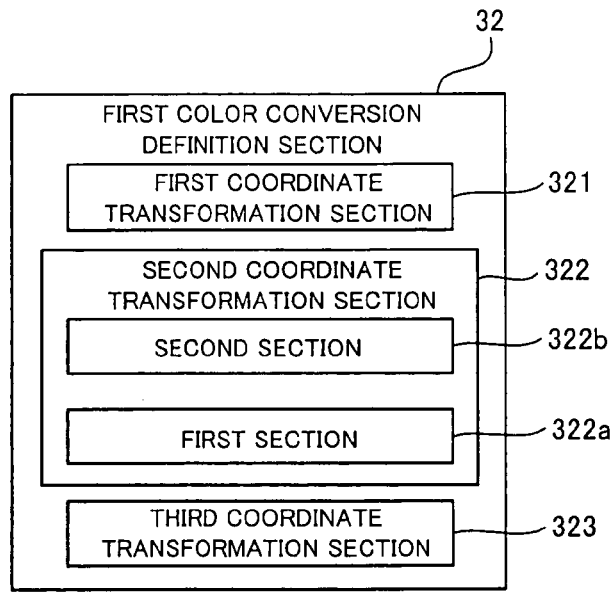
FIG. 34 is a block diagram showing the structure of a first color conversion definition section of a color conversion definition program executed on a computer system.

FIG. 34 is a block diagram showing the structure of the first color conversion definition section 32 (FIG. 7) of the color conversion definition program executed on the computer system shown in FIGS. 2 and 3.

The first color conversion definition section 32 includes a first coordinate transformation section 321, a second coordinate transformation section 322, and a third coordinate transformation section 323. The second coordinate transformation section 322 includes a first section 322a and a second section 322b that is executed before the first section 322a.

Figure 35:
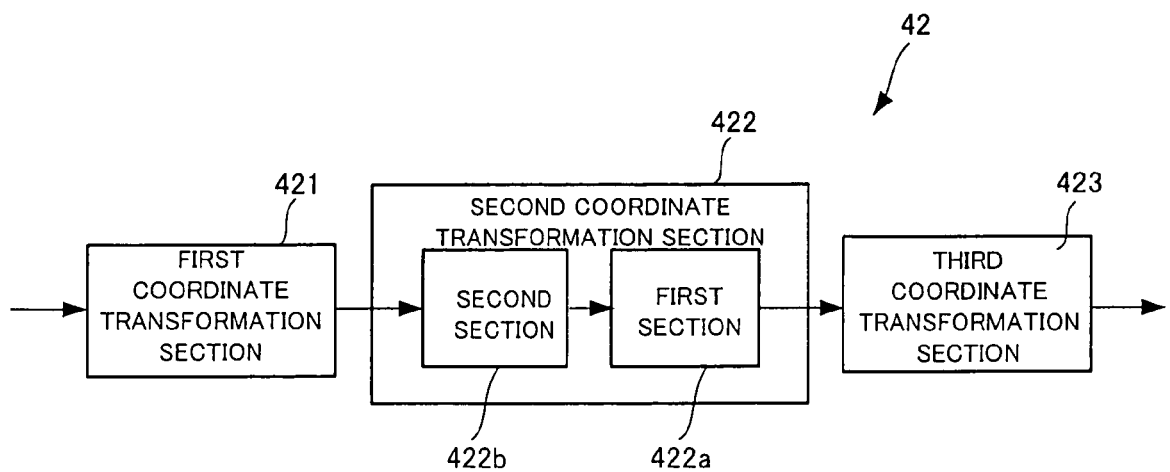
FIG. 35 is a functional block diagram of a first color conversion definition section of a color conversion definition apparatus that is implemented on a computer system by executing a color conversion definition program on the computer.

FIG. 35 is a functional block diagram of the first color conversion definition section 42 (FIG. 10) of the color conversion definition apparatus 40 that is implemented on the computer 20 by executing the color conversion definition program on the computer 20 shown in FIGS. 2 and 3.

The first color conversion definition section 42 includes a first coordinate transformation section 421, a second coordinate transformation section 422, and a third coordinate transformation section 423. The second coordinate transformation section 422 includes a first section 422a and a second section 422b disposed before the first section 422a.

Step b1, step b2 (steps b21 and b22), and step b3 of the first color conversion definition step of the color conversion definition method shown in FIG. 33 correspond to the sections 321, 322 (322b, 322a) and 323, respectively, of the first color conversion definition section 32 shown in FIG. 34 and also correspond to the sections 421, 422 (422b, 422a) and 423 of the first color conversion definition section 42 shown in FIG. 35. Thus, although only steps b1, b2 (b21, b22) and b3 of the first color conversion definition step shown in FIG. 33 are described below, sections 321, 322 (322b, 322a), and 323 of the first color conversion definition section 32 shown in FIG. 34 and sections 421,422 (422b, 422a) and 423 of the first color conversion definition section 42 shown in FIG. 35 will become apparent from the explanation of steps b1, b2 (b21, b22) and b3.

Each step (step b1, b2 (b21, b22), and b3) of the first color conversion definition step shown in FIG. 33 is explained below.

First, in step b1 in FIG. 33, in accordance with the color reproduction characteristic (printer profile) of the printer 11, each coordinate point (at each discrete lattice point) in the first RGB color space dependent on the printer 11 is mapped to the device-independent reference color space (for example, the L*a*b* color space).

FIGS. 36(A) to 36(D) are diagrams illustrating the manner in which the color reproduction range of the printer 11 and the color reproduction range of the proofer 14 are subjected to the coordinate transformation in the L*a*b* space in the second step in the second coordinate transformation step executed in step b21 of FIG. 33.

In this step, an adaptation transformation based on the Von Kries transformation is performed such that a coordinate point $W_1$ corresponding to white color (color of paper on which to print the image 11a) represented in the printed image 11a output by the printer 11 (FIG. 1) becomes coincident with a coordinate point $W_3$ corresponding to white color (color of paper on which to print the proof image) represented in the proof image virtually output by the proofer 14, and a coordinate point $B_1$ corresponding to black color (represented by the printer 11 by using maximum amounts of R, G, and B inks) represented in the printed image 11a becomes coincident with a coordinate point $B_3$ corresponding to black color (color represented by the proofer 14 by using maximum amounts of R, G, and B inks) represented by the proofer 14.

The coordinate transformation is described in further detail below with reference to FIGS. 36A to 36D. First, the color reproduction range 102a (shown in FIG. 36(A)) of the printer 11 and the color reproduction range 302a (shown in FIG. 36(A)) of the proofer 14 are parallel-displaced so that the black points $B_1$ and $B_3$ thereof come to the origin O (theoretical black point) as shown in FIG. 36(B) whereby the black point of the color reproduction range 102b of the printer 11 becomes coincident with the black point of the color reproduction range 302b of the proofer 14.

Figure 36:
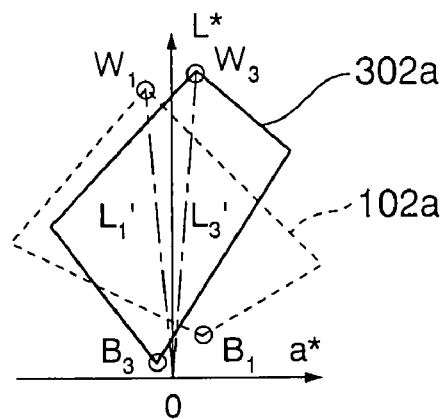
FIGS. 36(A) to 36(D) are diagrams of a second step in a second coordinate transformation step performed in a step of FIG. 33.
Figure 36:
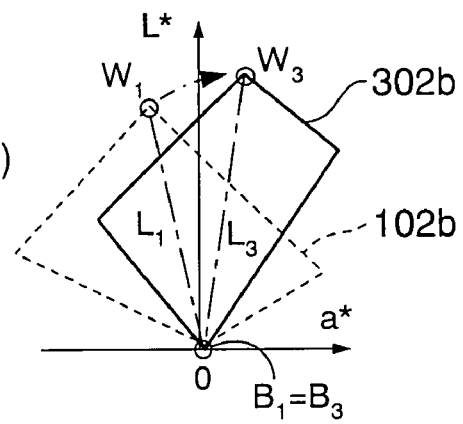
Figure 36:
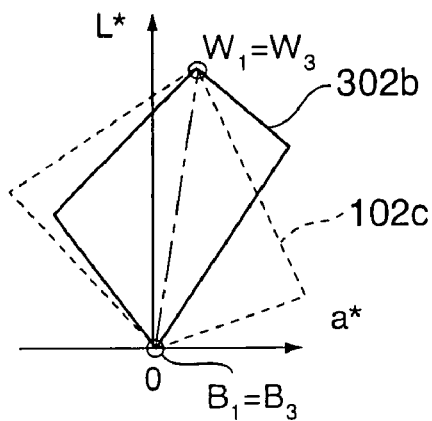
Figure 36:
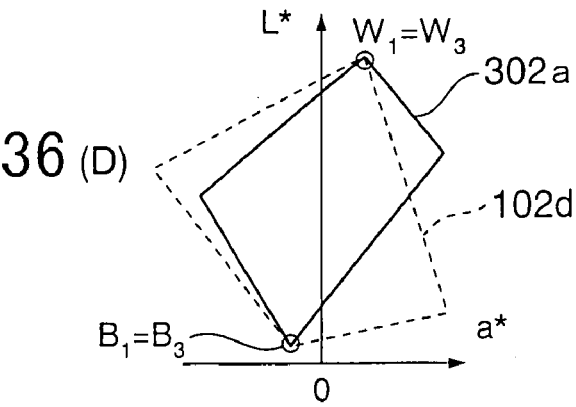

Furthermore, a coordinate transformation including rotation and expansion/compression is performed on the entire color reproduction range 102b of the printer 11 such that the white point $W_1$ of the parallel-displaced color reproduction range 102b of the printer 11 comes to the same position as the white point $W_3$ of the parallel-displaced color reproduction range 302b of the proofer 14, that is, a straight line $L_1$ shown in FIG. 36(B) comes to the same position as that of a straight line $L_3$.

FIG. 36(C) shows a state in which, as a result of the coordinate transformation including the rotation and the expansion/compression, the color reproduction range of the printer 11 has been transformed from the color reproduction range 102b shown in FIG. 36(B) to a color reproduction range 102c shown in FIG. 36(C). In this state, the white point $W_1$ of the color reproduction range of the printer 11 is coincident with the white point $W_3$ of the color reproduction range of the proofer 14.

Subsequently, as shown in FIG. 36(D), the color reproduction range 102c of the printer 11 whose white point and black point has become coincident with the white point and the black point of the color reproduction range 302b of the proofer 14 in the state shown in FIG. 36(C) is parallel-displaced until the white point and the black point respectively come to the original positions of the white point $W_3$ and the black point $B_3$ of the color reproduction range 302a of the proofer 14 shown in FIG. 36(A).

Thus, the color reproduction range 102d of the printer 11 is obtained whose white point $W_1$ and black point $B_1$ are coincident with the white point $W_3$ and the black point $B_3$, respectively, of the proofer 14.

The process described above can be performed in accordance with mathematical formulas described below. Although in FIGS. 36A to 36D, the color reproduction range is expressed in the L*a*b* color space, the Von Kries transformation or an adaptation transformation based on the Von Kries transformation is generally performed in a XYZ space, and thus the XYZ space is used in the following discussion.

The XYZ space is one of reference color spaces whose coordinate points uniquely correspond to coordinate points in the L*a*b* space.

Herein, if the XYZ coordinates of the white point $W_1$ and the black point $B_1$ of the color reproduction range 102a, shown in FIG. 36(A), of the printer 11 are respectively denoted as $(LXW_1, LYW_1, LZW_1)$ and $(LXB_1, LYB_1, LZB_1)$, and the XYZ coordinates of the white point $W_3$ and the black point $B_3$ of the color reproduction range 302a, shown in FIG. 36(A), of the proofer 14 are respectively denoted as $(LXW_3, LYW_3, LZW_3)$ and $(LXB_3, LYB_3, LZB_3)$, then XYZ coordinates $(LXW_1', LYW_1', LZW_1')$ and $(LXW_3', LYW_3', LZW_3')$ of the respective white points $W_1$ and $W_3$ shown in FIG. 36(B) are given by the following equations:

$$LXW_1'=LXW_1-LXB_1$$

$$LYW_1'=LYW_1-LYB_1$$

$$LZW_1'=LZW_1-LZB_1 \quad (1)$$

$$LXW_3'=LXW_3-LXB_3$$

$$LYW_3'=LYW_3-LYB_3$$

$$LZW_3'=LZW_3-LZB_3 \quad (2)$$

After the XYZ coordinates $(LXW_1', LYW_1', LZW_1')$ and $(LXW_3', LYB_3', LZB_3')$ of the respective white points $W_1$ and $W_3$ are determined according to the above equations, a Von Kries matrix is determined which rotates or expands/compresses the color reproduction range 102b of the printer 11 such that the white point $W_1$ $(LXW_1', LYW_1', LZW_1')$ comes to the same position of that of the white point $W_3$ $(LXW_3', LYW_3', LZW_3')$.

Let us denote the resultant Von Kries matrix as $$VK=[MTX_{VK}] \quad (3)$$

This Von Kries matrix has 3 rows and 3 columns.

When coordinate points in the first RGB color space dependent on the printer 11 are mapped, in step b1 of FIG. 33, into the L*a*b* space and further into the XYZ space (or when coordinate points in the first RGB color space dependent on the printer 11 are directly mapped into the XYZ space), if the coordinates of the resultant mapped points are generically denoted by (X, Y, Z), then the coordinates (X, Y, Z) of the black point (FIG. 36(B)) can be determined from the following equations:

$$X1=X-LXB_1$$

$$Y1=Y-LYB_1$$

$$Z1=Z-LZB_1 \quad (4)$$

Furthermore, the Von Kries transformation (FIG. 36(C)) is performed in accordance with the following equation.

$$\begin{pmatrix} X2 \\ Y2 \\ Z2 \end{pmatrix} = (MTX_{VK}) \begin{pmatrix} X1 \\ Y1 \\ Z1 \end{pmatrix} \quad (5)$$

Subsequently, in accordance with the following equations, an adjustment is performed such that the black point comes to the same position as that of the black point of the proofer 14 (as shown in FIG. 36(D)).

$$X'=X2-LXB_3$$

$$Y'=Y2-LYB_3$$

$$Z'=Z2-LZB_3 \quad (6)$$

By performing the above process for coordinate points, the color reproduction range 102a (shown in FIG. 36(A)) of the printer 11 expressed in the L*a*b* space is transformed to the color reproduction range 102d shown in FIG. 36(D) such that the white point and the black point become coincident with the white point and the black point, respectively, of the color reproduction range 302a of the proofer 14.

If the adaptation transformation is performed in the XYZ space, coordinates (X, Y, Z) of the black point (black points $B_1$ and $B_3$ shown in FIG. 36(A)) before the adaptation transformation is performed are close to (0, 0, 0), and thus only slight changes in coordinate value occur for the black point. This means that when the white point is moved in accordance with equation (1) and (2), the amount of movement is very small. Another advantage of use of the XYZ space is that the adaptation transformation is possible for a wide region. Note that the adaptation transformation is not necessarily needed to be performed in the XYZ space, but the adaptation transformation may be performed in the L*a*b* or in other reference color spaces.

In the adaptation transformation described above, both white and black points are adjusted. Alternatively, the adaptation transformation may be performed such that only the white point is adjusted without taking into account the black point, although color conversion accuracy is slightly worse than that achieved when both white and black points are adjusted.

In the case in which the adaptation transformation is performed such that only the white point is adjusted, the coordinate transformation is performed such that the straight line $L_1'$ shown in FIG. 36(A) comes to the same position as that of the straight line $L_3'$ and such that the white point $W_1$ comes to the same position as that of the white point $W_3$. Mathematically, subtraction of the coordinates of the black point in accordance with equations (1) and (2) is not performed, and the Von Kries matrix for the rotation and expansion/compression is determined such that the white point $W_1$ ($LXW_1$, $LYW_1$ $LZW_1$) becomes coincident with the white point $W_3$ ($LXW_3$, $LYW_3$ $LZW_3$). Furthermore, using this Von Kries matrix, the coordinate transformation is directly performed without performing the adjustment of the black point according to equation (4).

For example, when an image is displayed on a CRT display, the white color of the displayed image is generally bluish. The adaptation transformation described above is necessary when the color conversion is performed between two devices whose white color is significantly different from each other, as is the case in which an image displayed on a CRT display is printed. On the other hand, when two devices have substantially the same white color as is the case in which a comparison is made between an image 11a is printed on white paper by the printer 11 and a proof image virtually printed on similar white paper by the virtual proofer 14, the above-described adaptation transformation, i.e., the second step (step b21) in the second coordinate transformation step in FIG. 33 may not be performed.

Now, the first step (step b22) in the second coordinate transformation step in the flow chart shown in FIG. 33 is explained with reference to some specific examples.

Figure 37:
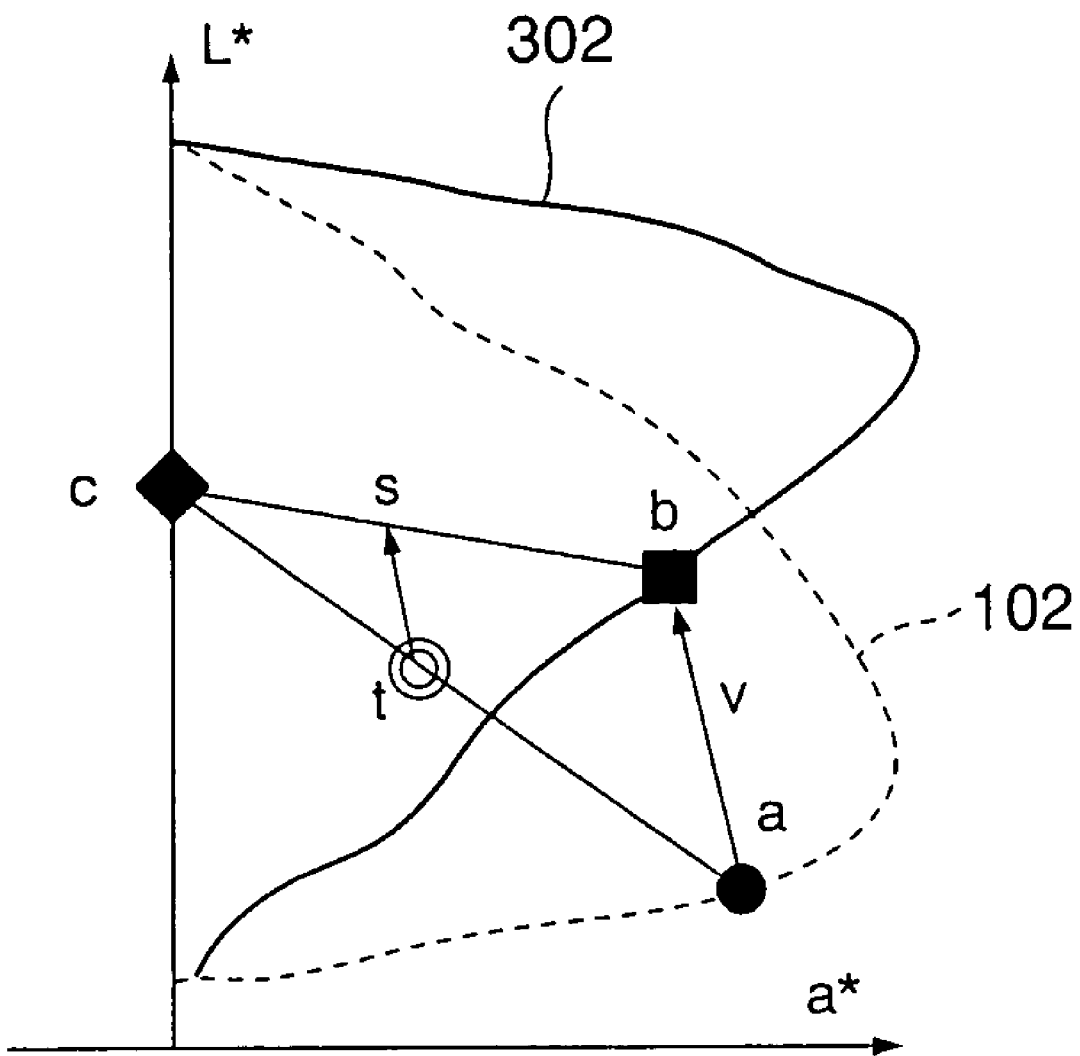
FIG. 37 is a diagram showing an example of a coordinate transformation in the first step.
Figure 38:
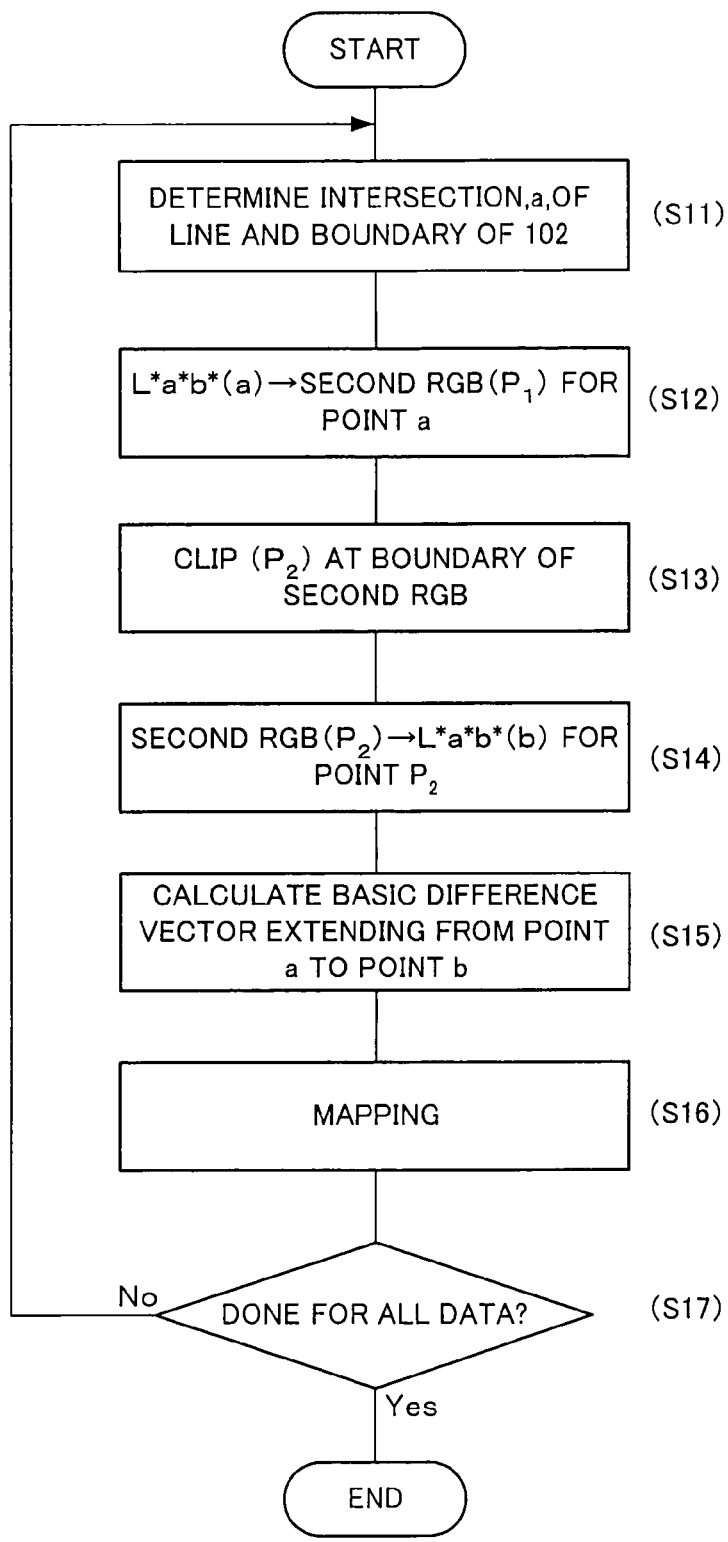
FIG. 38 is a flow chart of the example of the coordinate transformation shown in FIG. 37.

FIG. 37 shows a first example of a coordinate transformation in the first step, and FIG. 38 is a flow chart of the first example of the coordinate transformation. Although only an L*-a* plane in the L*a*b* space is shown in FIG. 37 for simplicity of illustration, a 3-dimensional coordinate transformation in the L*a*b* space is performed in the actual process. In other examples described later, a similar illustration will be used.

First, a reference coordinate transformation point c to be used as a reference in the coordinate transformation is set. In accordance with a setting constraint which may not be very strict and which may be predetermined, for example, empirically, the reference coordinate transformation point c is set within a common region in the L*a*b* space in which the color reproduction range 102 of the printer 11 and the color reproduction range 302 of the proofer 14 overlap. In the present embodiment, the reference coordinate transformation point c is set on a L* axis (gray axis) in the common area. If the reference coordinate transformation point c is set on the L* axis, the reference coordinate transformation point c remains at the original position via the coordinate transformation, and thus a good gray balance is maintained. In this specific example, for example, the reference coordinate transformation point c is set at a point (L*, a*, b*)=(50, 0, 0).

In a case in which the second coordinate transformation step (step b2) shown in the flow chart of FIG. 33 includes the adaptation transformation (step b21) described above with reference to FIGS. 36(A) to (D), the color reproduction range 102 of the printer 11 mapped into the L*a*b* space is assumed, in the following discussion, to have already been subjected to the adaptation transformation.

Let a first coordinate point t denote a coordinate point of interest which is in the color reproduction range 102 of the printer 11 in the L*a*b* space and which is to be subjected to mapping.

First, an intersection of a straight line passing through both the reference coordinate transformation point c and the first coordinate point t and a boundary of the color reproduction range 102 of the printer 11 is determined (step S11 in FIG. 38). This intersection is referred to as a first reference coordinate point a.

When the first reference coordinate point a determined in the above-described manner is located outside the color reproduction range 302 of the proofer 14 mapped into the L*a*b* space as shown in FIG. 37, processing is further performed as described bellow in accordance with the flow chart shown in FIG. 38.

The first reference coordinate point a determined in the above-described manner is mapped into the second RGB color space dependent on the proofer 14 from the L*a*b* space (step S12 in FIG. 38). The first reference coordinate point mapped into the second RGB color space is denoted as $P_1$.

Subsequently, in the second RGB color space, the first reference coordinate point $P_1$ is mapped onto a boundary of the color reproduction range of the proofer 14 by clipping the coordinate values of the first reference coordinate point $P_1$ (step S13). A point $P_2$ obtained on the edge of the color reproduction range of the proofer 14 as a result of the mapping is then mapped from the second RGB color space into the L*a*b* space (step S14). A coordinate point in the L*a*b* space obtained as a result of the mapping is referred to as a second reference coordinate point b (FIG. 37).

Thereafter, a basic difference vector v is determined which extends from the first reference coordinate point a to the second reference coordinate point b and which thus indicates the difference between the first reference coordinate point a and the second reference coordinate point b shown in FIG. 37 (step S15). The first coordinate point t to be mapped is then moved in a direction parallel to the direction of the basic difference vector v to a point on a line extending from the reference coordinate transformation point c to the second reference coordinate point b. The resultant point to which the first coordinate point t has been mapped is referred to as a second coordinate point s (step S16).

The coordinate transformation described above is performed for all coordinate points in the L*a*b* space which are located within the color reproduction range 102 of the printer 11 and whose corresponding first reference coordinate point a obtained in the step S11 falls outside the color reproduction range 302 of the proofer 14 (step 17).

In the coordinate transformation explained above with reference to FIGS. 37 and 38, the actual mapping is performed in the L*a*b* space, although the determination of the direction of the coordinate transformation, i.e., the determination of the basic difference vector v, is performed in the second RGB color space by determining, for the first reference coordinate point a located on a boundary of the color reproduction range of the printer 11, the corresponding second reference coordinate point b located on a boundary of the color reproduction range of the proofer 14.

Thus, since the direction of the coordinate transformation (mapping) is determined in the second RGB color space (device dependent color space) which directly represents colors perceived by human eyes, the possibility of creating a discontinuous or unnatural color tone is suppressed to a very low level. Besides, the performing the actual coordinate transformation in the L*a*b* space (reference color space) makes it possible to achieve very high accuracy in coordinate transformation (mapping).

Note that although in FIG. 37 the coordinate transformation (mapping) is performed in the two-dimensional plane for the convenience of illustration, the mapping is actually performed in the three-dimensional space, as mentioned earlier.

Figure 39:
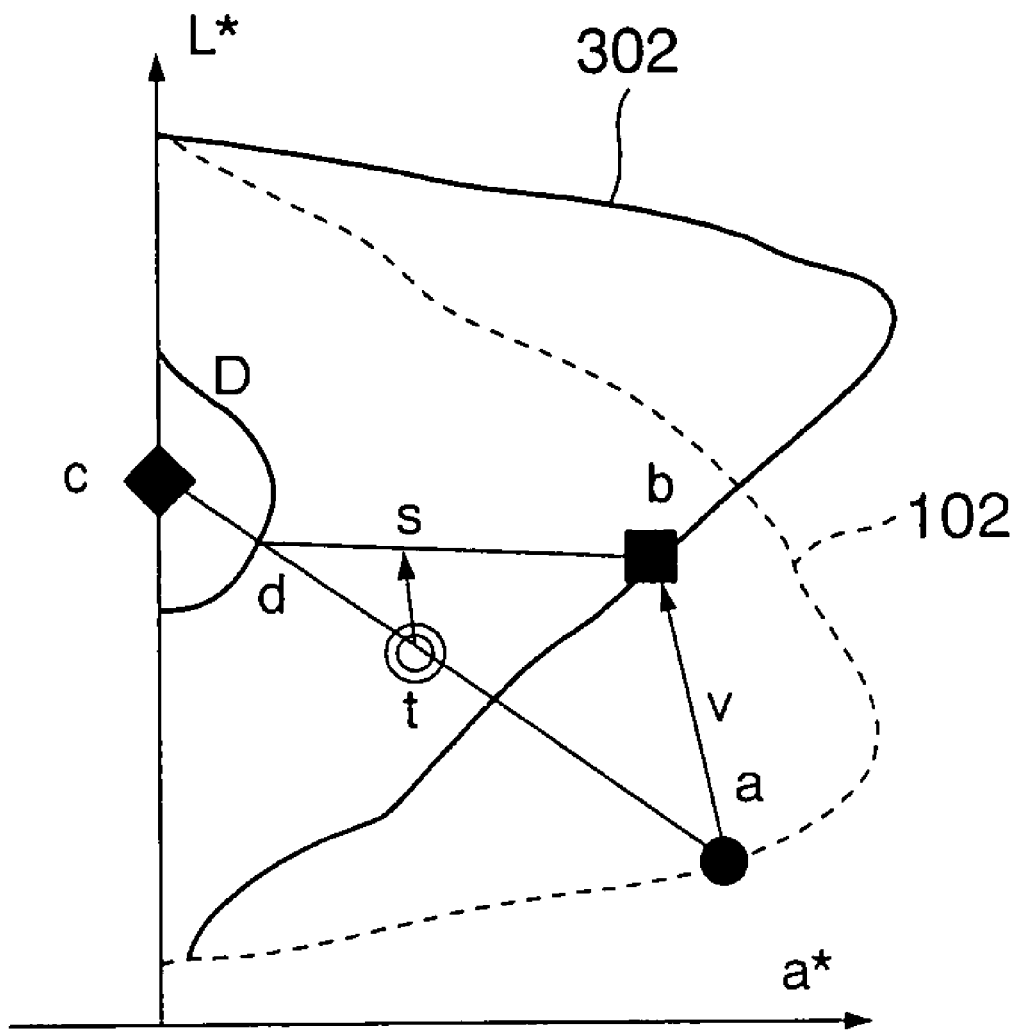
FIG. 39 is a diagram showing a modification to the example of the coordinate transformation shown in FIGS. 37 and 38.

FIG. 39 is a diagram showing a modification to the example of the coordinate transformation described above with reference to FIGS. 37 and 38.

In this embodiment, a region D is set around the reference coordinate transformation point c, and an intersection d of a boundary of the region D and a straight line extending from the reference coordinate transformation point c to the first reference coordinate point a is determined. The first coordinate point t is then mapped to a coordinate point s on a straight line extending from the intersection d to the second reference coordinate point b.

Note that in this embodiment, coordinate points within the region D remain at their original position without being moved by the coordinate transformation.

As described above, in order to maintain a good gray balance, it is desirable to maintain the L* axis (gray axis) at the same position without moving it in the coordinate transformation. In this regard, in the present embodiment, a region in which coordinate points remain at their original point in the coordinate transformation can be arbitrarily set by properly defining the region D as shown in FIG. 39.

Figure 40:
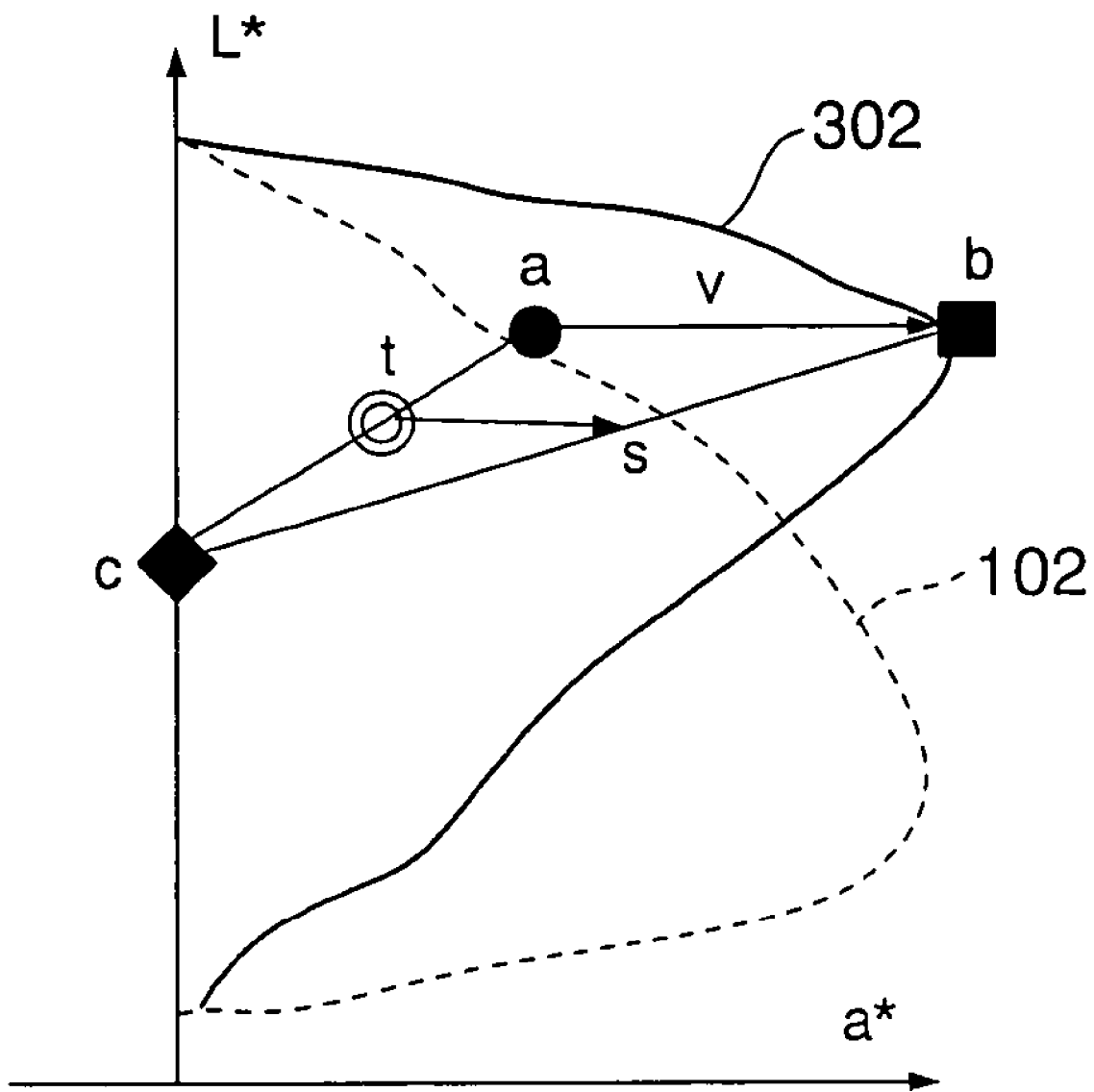
FIG. 40 is a diagram showing an example of the coordinate transformation in the first step in the flow chart shown in FIG. 33.
Figure 41:
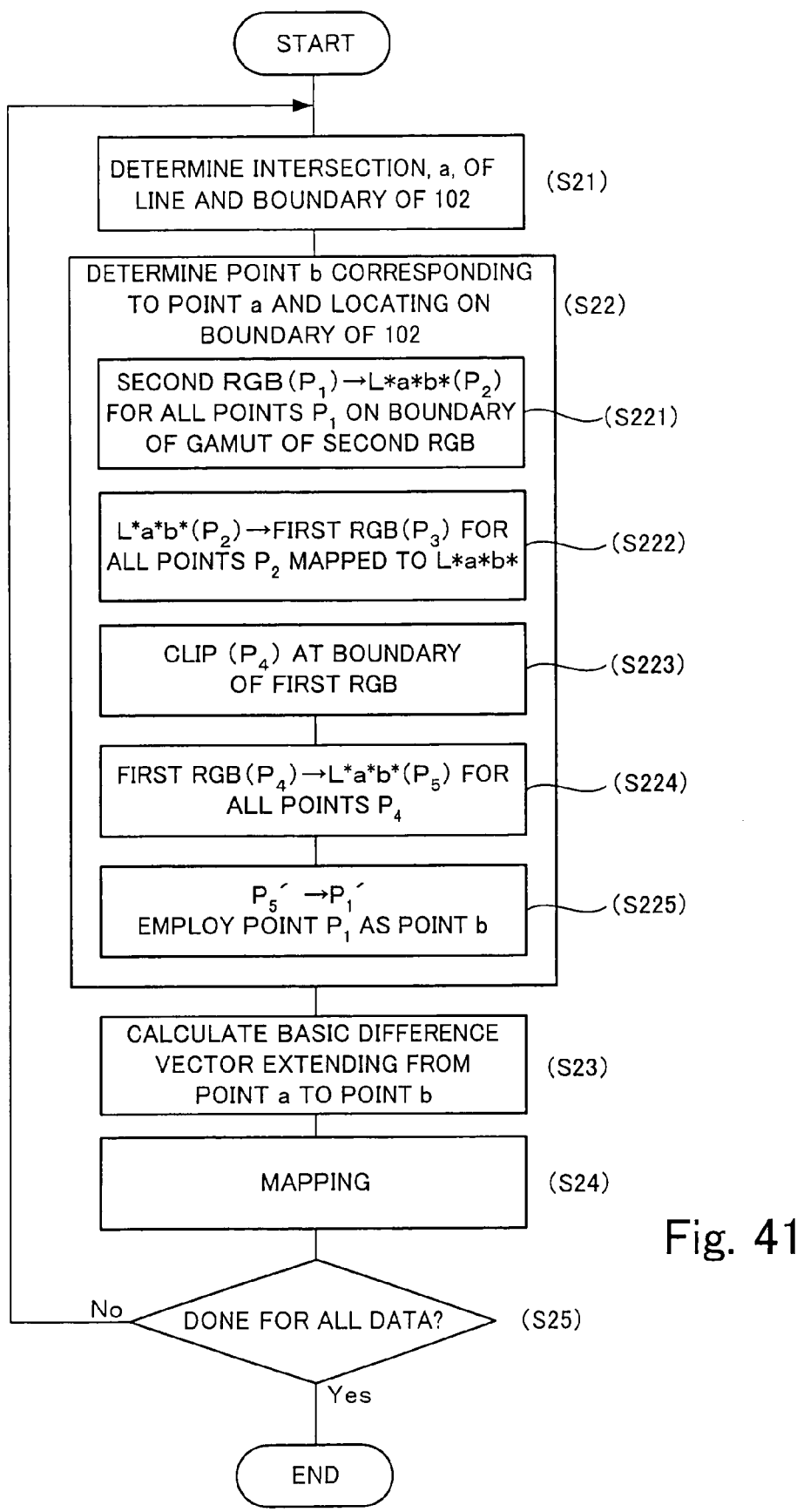
FIG. 41 is a flow chart of the example of the coordinate transformation shown in FIG. 40.

FIG. 40 shows a second example of a coordinate transformation in the first step in the flow chart shown in FIG. 33, and FIG. 41 is a flow chart of the second example of the coordinate transformation.

In this second example, as in the first example described above with reference to FIGS. 37 and 38, first, a reference coordinate transformation point c to be used as a reference in the coordinate transformation is set on the L* axis (gray axis).

An intersection of a straight line passing through the reference coordinate transformation point c and a first coordinate point t to be subjected to the coordinate transformation and a boundary of the color reproduction range 102, mapped in the L*a*b* space, of the printer 11 is determined (step S21). This intersection is referred to as a first reference coordinate point a. In a case in which the second coordinate transformation step (step b2) shown in the flow chart of FIG. 33 includes an adaptation transformation, the color reproduction range 102 of the printer 11 mapped into the L*a*b* space is assumed, in the following discussion, to have already been subjected to the adaptation transformation, as in the first example described above.

In this second example, unlike the first example described above with reference to the flow chart shown in FIG. 38, when the first reference coordinate point a determined in the above-described manner is located inside the color reproduction range 302 of the proofer 14 mapped into the L*a*b* space as shown in FIG. 40, processing is further performed as described below in accordance with the flow chart shown in FIG. 40.

First, for the given first reference coordinate point a on the boundary of the color reproduction range of the printer 11, a corresponding second reference coordinate point b is determined which is located on a boundary of the color reproduction range of the proofer 14 (step S22). In this second example, unlike the first example described above with reference to FIGS. 37 and 38, the first reference coordinate point a is located within the inside of the color reproduction range 302 of the proofer 14 as shown in FIG. 40, and thus the method used in the first example cannot be used to determine the second reference coordinate point b. If the first reference coordinate point a is mapped into the second RGB color space in a similar manner to the first example in which the first reference coordinate point a is located outside the color reproduction range 302 of the proofer 14, the resultant mapped position of the first reference coordinate point a falls within the inside of the color reproduction range of the proofer 14 in the second RGB color space, and thus the clipping is impossible. Thus, the second reference coordinate point b is determined differently as described below.

First, all points (generically denoted as point $P_1$) on the boundary of the color reproduction range (gamut) of the proofer 14 in the second RGB color space are mapped into the L*a*b* space from the second RGB color space (step S221). Furthermore, resultant points $P_2$ mapped into the L*a*b* space are all mapped into the first RGB color space (step S222). Subsequently, of resultant points $P_3$ mapped into the first RGB color space, points located outside of the color reproduction range of the printer 11 in the first RGB color space are mapped onto the boundary of the color reproduction range of the printer 11 by clipping each of R, G, and B values greater than 255 at 255 and negative R, G, and B values at 0 (step S223).

Thereafter, all resultant points $P_4$ obtained by mapping original points into the first RGB color space and further by performing the clipping are mapped into the L*a*b* space from the first RGB color space (step S224). From resultant points $P_5$ mapped into the L*a*b* space, a point $P_5'$ is detected which is coincident with the first reference coordinate point a or which is located closest to the first reference coordinate point a if there is no point $P_5$ coincident with the first reference coordinate point a. From all points $P_1$ located on the boundary of the color reproduction range of the proofer 14 in the second RGB color space, a point $P_1'$ is detected from which the point $P_5'$ originates. The detected point $P_1'$ is employed as the second reference coordinate point b (step S225).

Thus, by performing the above-described processes, the second reference coordinate point b corresponding to the reference coordinate point a shown in FIG. 40 can be determined.

In the process shown in the flow chart of FIG. 41, all points $P_1$ located on the boundary of the color reproduction range of the proofer 14 in the second RGB color space are simply mapped in the first RGB color space. Alternatively, in FIG.

40, of coordinate points located on the boundary of color reproduction range 302 of the proofer 14 mapped into to the L*a*b* space, only coordinate points located outside the color reproduction range 102 of the printer 11 mapped in the L*a*b* space may be mapped into the first RGB color space. In a case in which it is possible to limit candidates for the second reference coordinate point b to particular points of those located outside the color reproduction range 102 of the printer 11, only the limited candidates for the second reference coordinate point b may be mapped into the first RGB color space, and clipping may be performed for the resultant points.

After the second reference coordinate point b is detected in step S22 in FIG. 41, as shown in FIG. 40, as in the process shown in the flow chart of FIG. 38, a basic difference vector v is determined which extends from the first reference coordinate point a to the second reference coordinate point b (step S23). Subsequently, the second coordinate point s corresponding to the first coordinate point t is determined in a similar manner to the process in the first example described above with reference to FIGS. 37 and 38 (step S24).

The coordinate transformation described above is performed for all coordinate points in the L*a*b* space which are located within the color reproduction range 102 of the printer 11 and whose corresponding first reference coordinate point a obtained in the step S21 falls inside the color reproduction range 302 of the proofer 14 (step S25).

Figure 42:
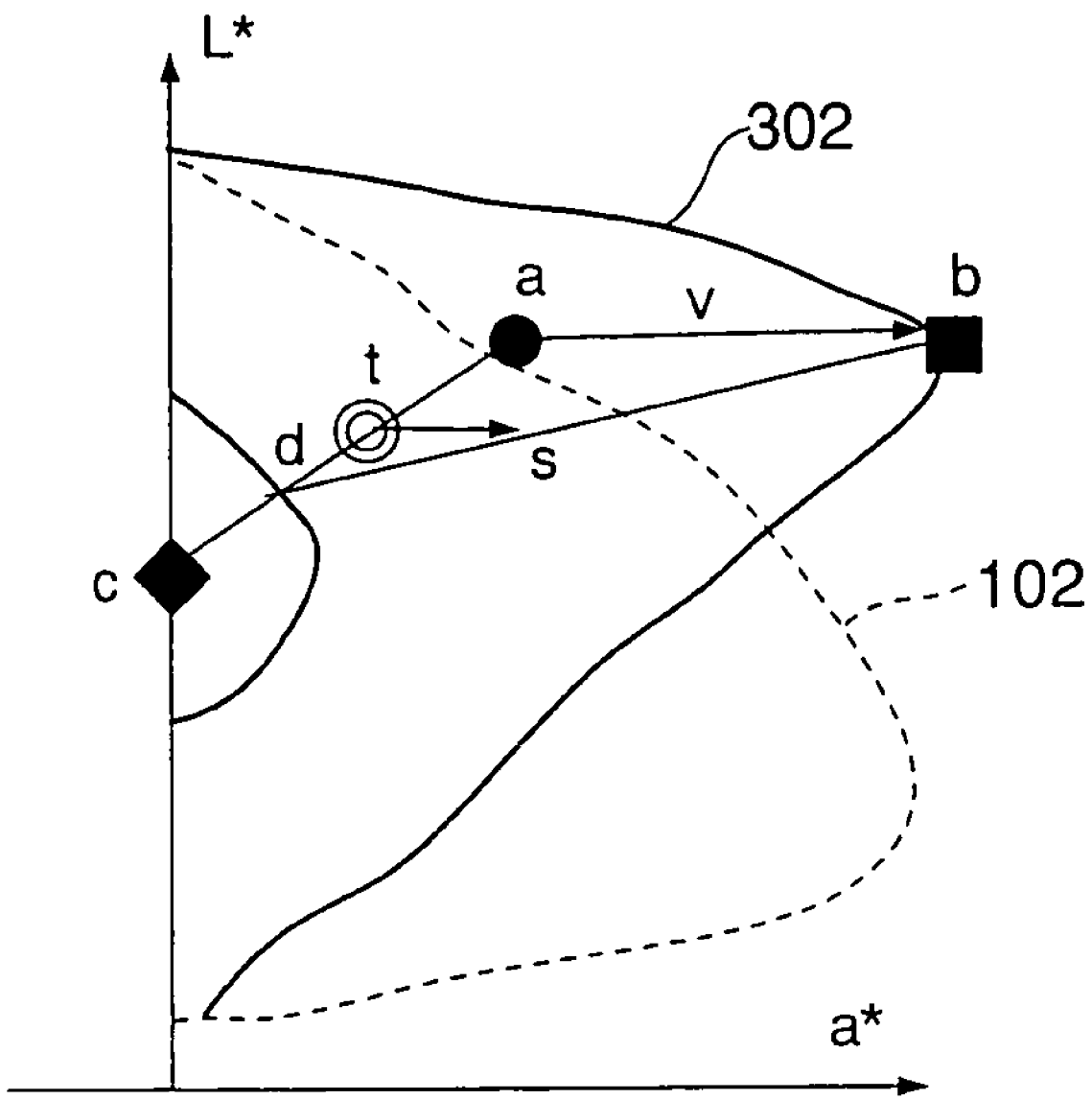
FIG. 42 is a diagram showing a modification to the example of the coordinate transformation shown in FIGS. 40 and 41.

FIG. 42 is a diagram showing a modification to the second example of the coordinate transformation described above with reference to FIGS. 40 and 41.

In this modified coordinate transformation process, in a similar manner as described above with reference to FIG. 39, a region D is set around the reference coordinate transformation point c, and an intersection d of a boundary of the region D and a straight line extending from the reference coordinate transformation point c to the first reference coordinate point a is determined. The first coordinate point t is then mapped to a coordinate point s on a straight line extending from the intersection d to the second reference coordinate point b. Note that coordinate points within the region D remain at their original position without being moved by the coordinate transformation.

Figure 43:
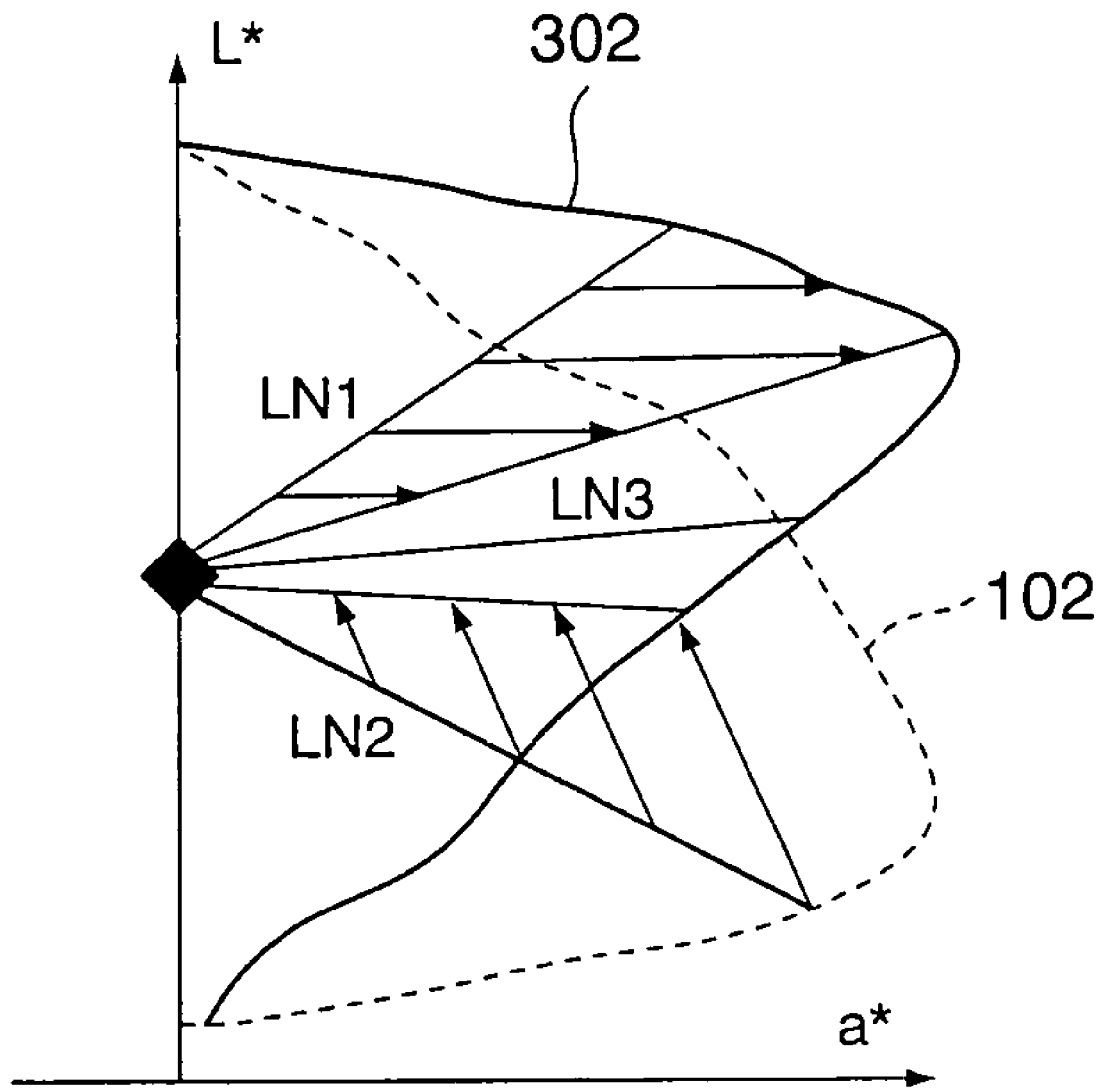
FIG. 43 is a diagram showing an example of a manner in which mapping is performed by a combination of compression shown FIGS. 37 and 38 and expansion shown in FIGS. 40 and 41.

FIG. 43 shows an example of a manner in which mapping is performed by a combination of compression described above with reference to FIGS. 37 and 38 and expansion described above with reference to FIGS. 40 and 41.

Coordinate points on a line LN1 extending in a region in which the color reproduction range 302 of the proofer 14 in the L*a*b* space is greater than the color reproduction range 102 of the printer 11 in the L*a*b* space are expanded so as to fully use the color reproduction range 302 of the proofer 14. On the other hand, coordinate points on a line LN2 extending in a region in which the color reproduction range 102 of the printer 11 is greater than the color reproduction range 302 of the proofer 14 are compressed to a region in which the color reproduction range 302 of the proofer 14 is fully used. Because the direction of the expansion and the direction of compression are determined in the RGB color space depending on a device to be used, no discontinuous or unnatural color tone occurs in an image, although the mapping itself is performed in the L*a*b* space. Performing the mapping in the L*a*b* space makes it possible to achieve high accuracy in mapping. Note that no coordinate transformation is performed and original colors are maintained for coordinate points located on a line LN3 extending in a region in which the color reproduction range 102 of the printer 11 is equal in extent to the color reproduction range 302 of the proofer 14.

Note that although in FIG. 43 the mapping is performed in the L*-a* plane for the convenience of illustration, the mapping is actually performed in the three-dimensional space, as mentioned earlier.

Figure 44:
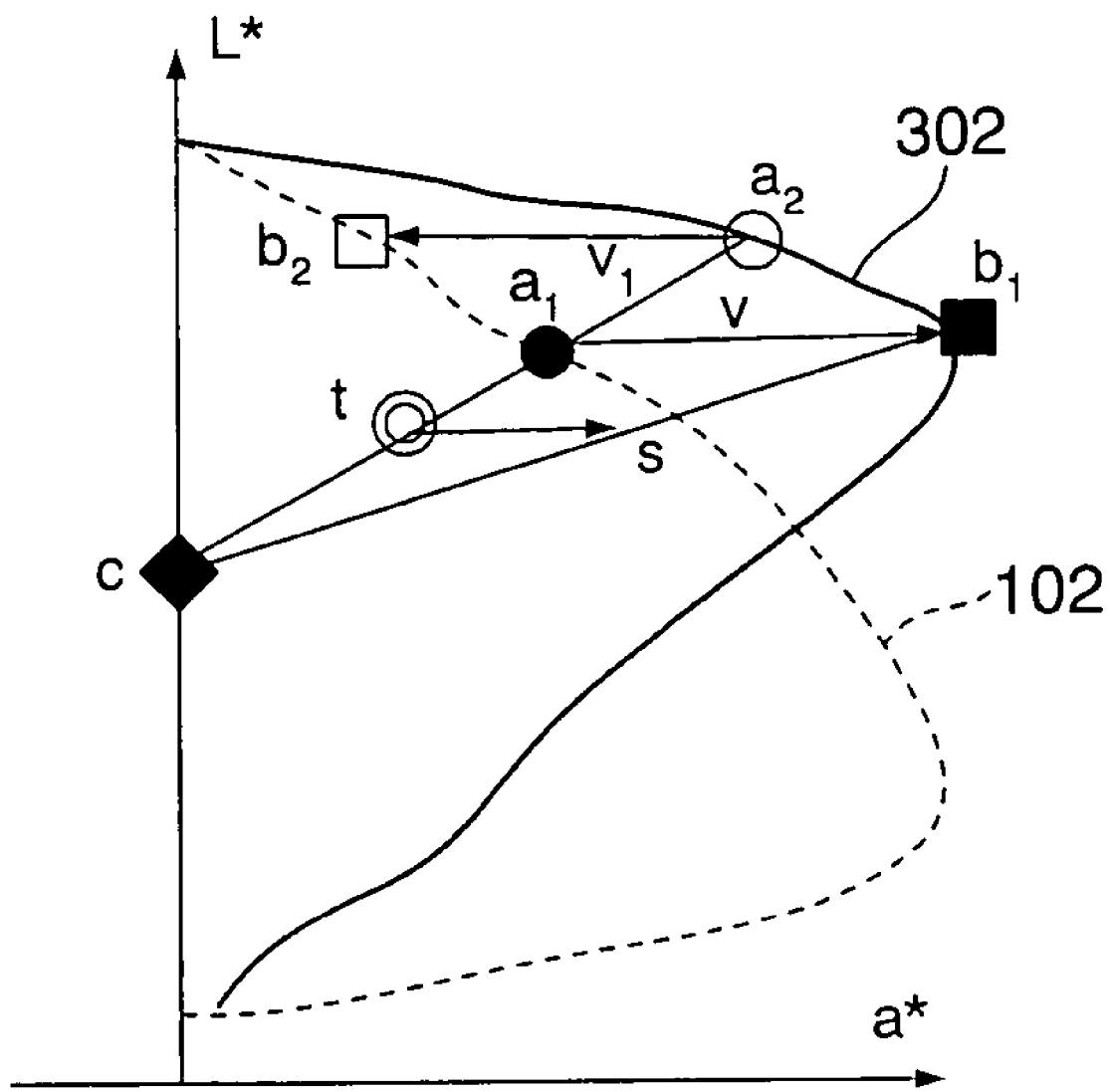
FIG. 44 is a diagram showing an example of a coordinate transformation in the first step in the flow chart shown in FIG. 33.
Figure 45:
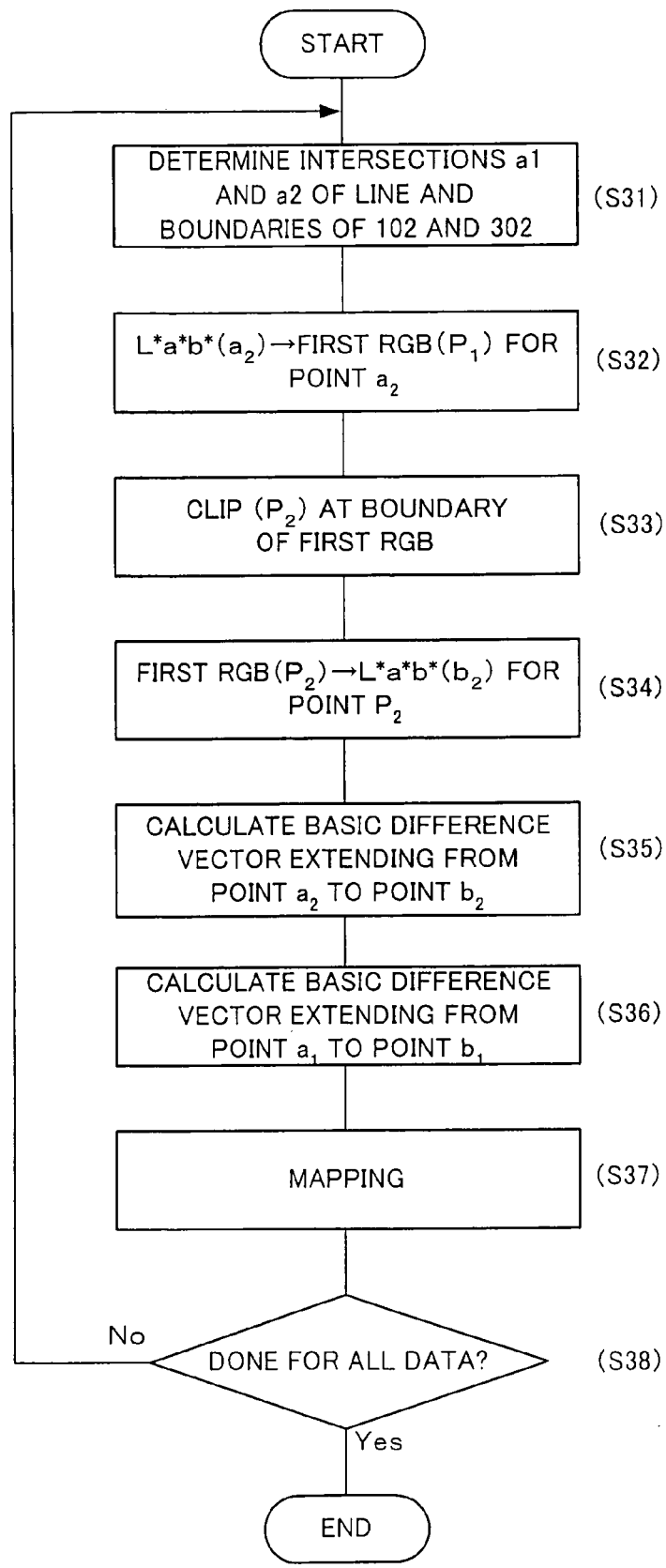
FIG. 45 is a flow chart of the example of the coordinate transformation shown in FIG. 44.

FIG. 44 shows a third example of the coordinate transformation in the first step in the flow chart shown in FIG. 33, and FIG. 45 is a flow chart of the third example of the coordinate transformation. In this third example, as in the second example described above with reference to FIGS. 40 and 41, the first reference coordinate point a1 determined in step S31 is assumed to be located within the inside of the color reproduction range 302 of the proofer 14 mapped in the L*a*b* space.

In this third example, as in the first and second examples described above, first, a reference coordinate transformation point c to be used as a reference in the coordinate transformation is set on the L* axis (gray axis). An intersection of a straight line passing through the reference coordinate transformation point c and a first coordinate point t to be subjected to the coordinate transformation and a boundary of the color reproduction range 102, mapped in the L*a*b* space, of the printer 11 is determined. This intersection is used as a first reference coordinate point a1. An intersection of the above-described straight line and the boundary of the color reproduction range 302 of the proofer 14 mapped in the L*a*b* space is determined, and the resultant intersection is employed as a third reference coordinate point a2 (step S31).

In a case in which the second coordinate transformation step (step b21) shown in the flow chart of FIG. 33 includes an adaptation transformation, the color reproduction range 102 of the printer 11 mapped in the L*a*b* space is assumed, in the following discussion, to have already been subjected to the adaptation transformation, as in the first and second examples described above.

Subsequently, the third reference coordinate point a2 determined in the above-described manner is mapped into the first RGB color space dependent on the printer 11 from the L*a*b* space (step S32). A resultant point $P_1$ mapped in the first RGB color space is mapped onto the boundary of the color reproduction range of the printer 11 by clipping the point $P_1$ at the boundary of the first RGB color space (step S33). A resultant point $P_2$ obtained as a result of the mapping is then mapped into the L*a*b* space (step S34). A resultant point on the boundary of color reproduction range 102 of the printer 11 in the L*a*b* space is referred to as a fourth reference coordinate point b2.

Subsequently, a basic difference vector v1 is determined which extends from the third reference coordinate point a2 to the fourth reference coordinate point b2 (step S35). An intersection of a straight line extending parallel to the difference vector v1 and passing through the first reference coordinate point a1 and the boundary of the color reproduction range 302 of the proofer 14 in the L*a*b* space is employed as a second reference coordinate point b1, and a basic difference vector v is determined which extends from the first reference coordinate point a1 to the second reference coordinate point b2 (step S36). Thereafter, in a similar manner as in the first and second examples described above, the first coordinate point t is mapped to a coordinate point (second coordinate point s) at which a line extending from the first coordinate point t in a direction parallel to the basic difference vector v intersects with a line extending from the reference coordinate transformation point c to the second reference coordinate point b1 (step S37).

The coordinate transformation described above is performed for all coordinate points in the L*a*b* space which are located within the color reproduction range 102 of the printer 11 and whose corresponding first reference coordinate point a1 obtained in the step S31 falls inside the color reproduction range 302 of the proofer 14 in the L*a*b* space (step S38).

In this third example described above with reference to FIGS. 44 and 45, an error occurs when the color reproduction range 102 of the printer 11 expressed in the L*a*b* space is greatly different from the color reproduction range 302 of the proofer 14 expressed in the L*a*b* space, that is, when the difference vector v1 is greatly different from the basic difference vector v. However, when the two vectors v1 and v are located close to each other and they can regarded to be equal, the third example can be advantageously employed to perform the required calculation in a shorter time compared with the time required in the second example described above with reference to FIGS. 40 and 41.

Figure 46:
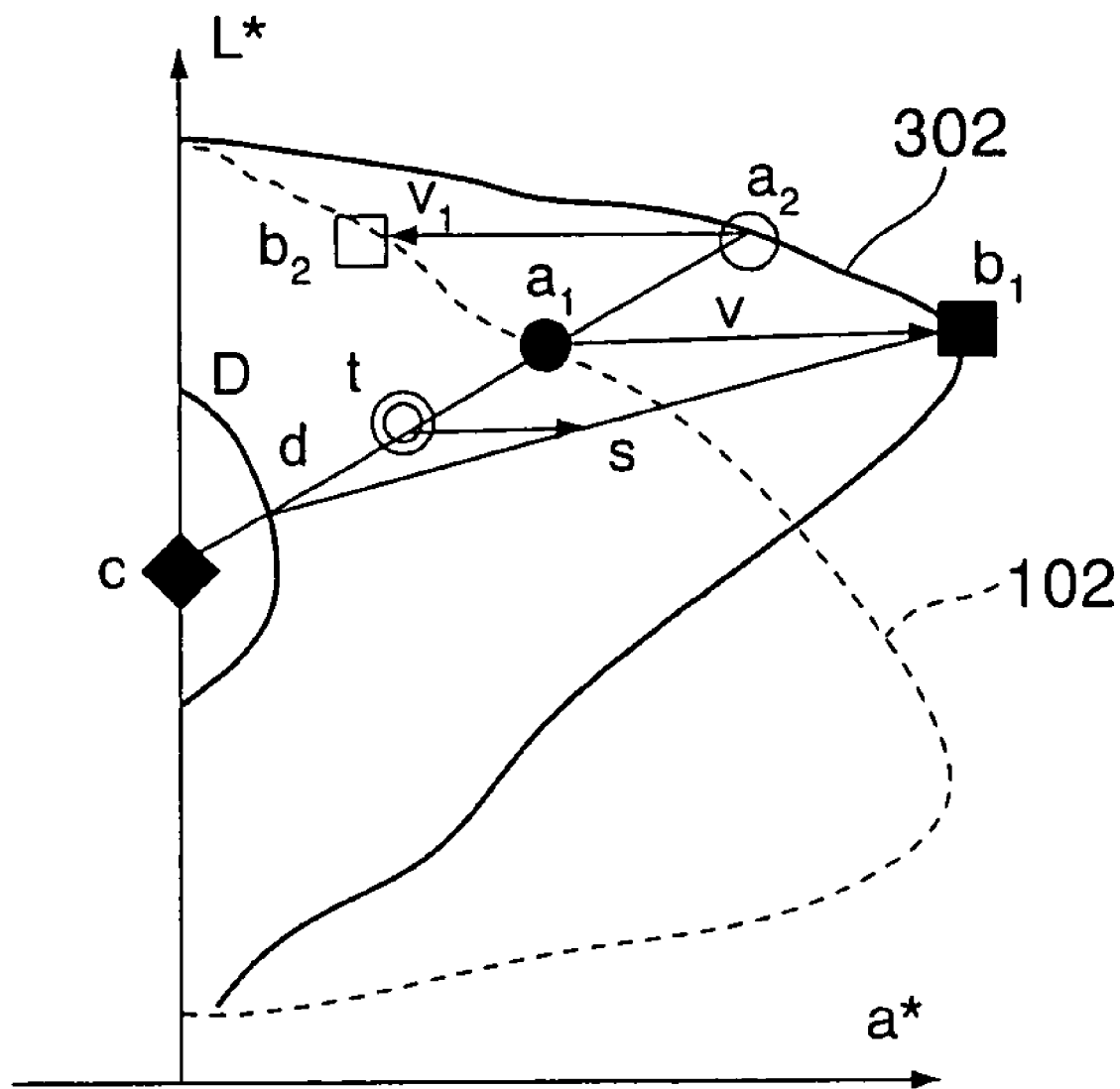
FIG. 46 is a diagram showing a modification to the example of the coordinate transformation shown in FIGS. 44 and 45.

FIG. 46 is a diagram showing a modification to the third example of the coordinate transformation described above with reference to FIGS. 44 and 45.

In this modified coordinate transformation process, in a similar manner as described above with reference to FIG. 39 or 42, a region D is set around the reference coordinate transformation point c, and an intersection d of a boundary of the region D and a straight line extending from the reference coordinate transformation point c to the first reference coordinate point a1 is determined. The first coordinate point t is then mapped to a coordinate point on a straight line extending from the intersection d to the second reference coordinate point b1.

Note that coordinate points within the region D remain at their original position without being moved by the coordinate transformation.

Figure 47:
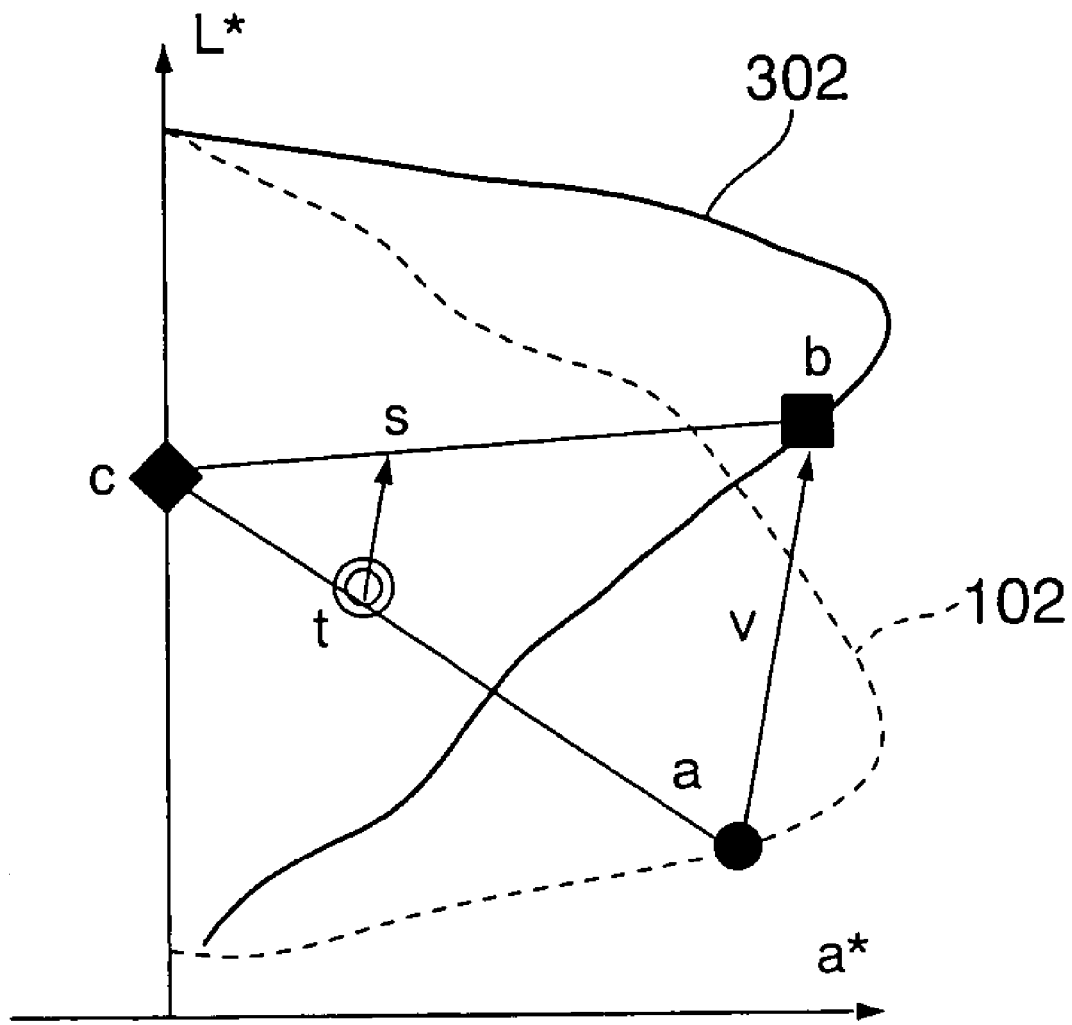
FIG. 47 is a diagram showing an example of a coordinate transformation in the first step in the flow chart shown in FIG. 33.
Figure 48:
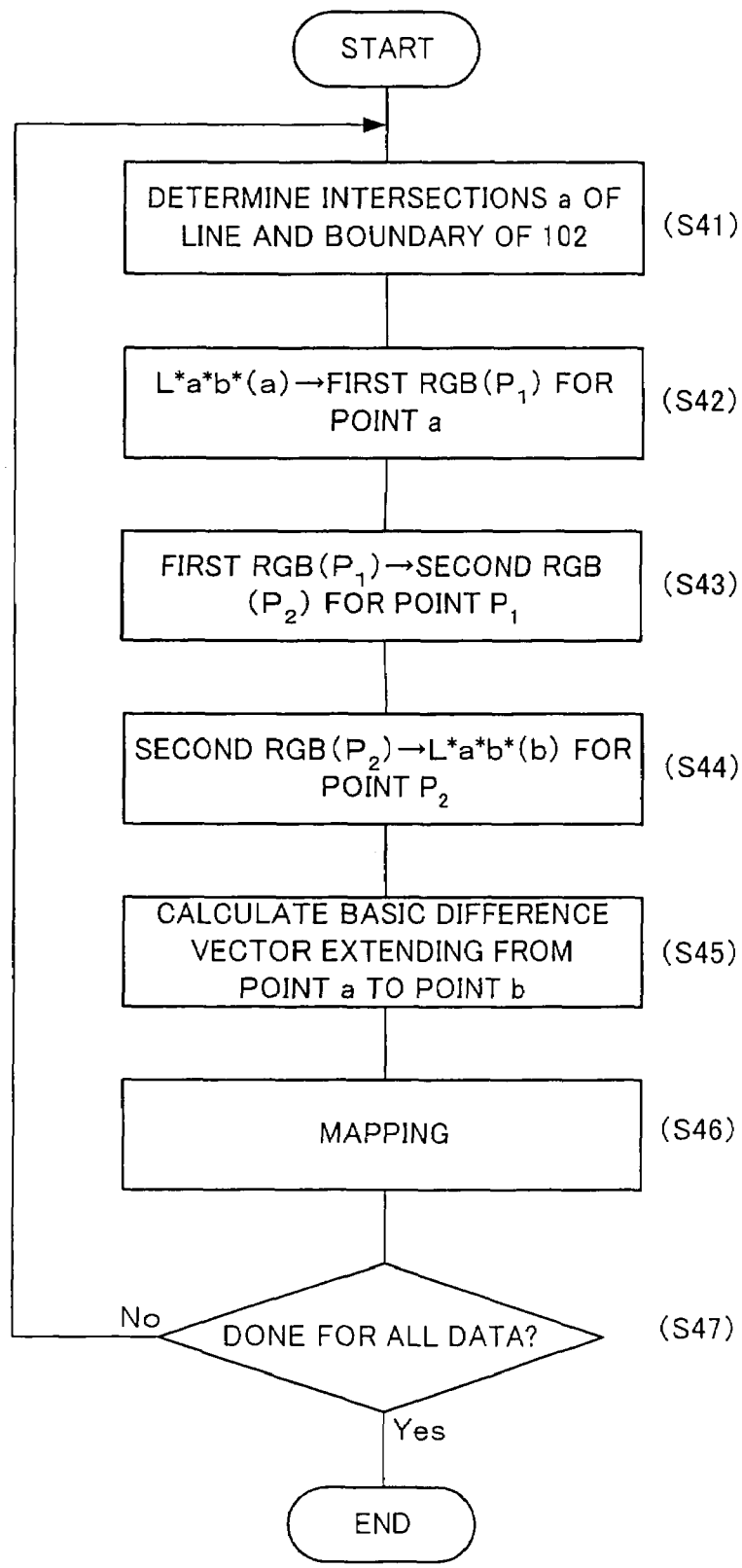
FIG. 48 is a flow chart of the example of the coordinate transformation shown in FIG. 47.

FIG. 47 shows a fourth example of the coordinate transformation in the first step in the flow chart shown in FIG. 33, and FIG. 48 is a flow chart of the fourth example of the coordinate transformation.

This fourth example can be employed regardless of whether a first reference coordinate point a determined in step S41 is located within the inside or outside of the color reproduction range 302 of the proofer 14 mapped in the L*a*b* space.

In this fourth example, as in the first to third examples described above, first, a reference coordinate transformation point c is set on the L* axis (gray axis). An intersection of a straight line passing through the reference coordinate transformation point c and a first coordinate point t to be subjected to the coordinate transformation and a boundary of the color reproduction range 102, expressed in the L*a*b* space, of the printer 11 is determined, and the resultant intersection is employed as a first reference coordinate point a (step S41).

Subsequently, the first reference coordinate point a is mapped into the first RGB color space dependent on the printer 11 (step S42).

Furthermore, a coordinate value corresponding to the coordinate value of point $P_1$ mapped in the first RGB color space is determined. Typically, a coordinate point $P_2$ which is located in the second RGB color space dependent on the proofer 14 and which has the same coordinate value as that of the point $P_1$ is employed (step S43). More specifically, for example, when the first reference coordinate point a shown in FIG. 47 is mapped to a point $P_1$ with coordinates (R, G, B)=(0, 255, 0) in the first reference coordinate point, a point located in the second RGB color space and having the same coordinates (R, G, B)=(0, 255, 0) is employed as a point $P_2$.

Subsequently the point $P_2$ in the second RGB color space is mapped into the L*a*b* space from the second RGB color space, and the resultant point is employed as a second reference coordinate point b (step S44).

Since the first reference coordinate point a is on the boundary of the color reproduction range 102 of the printer 11 in the L*a*b* space, when the first reference coordinate point a is mapped into the first RGB color space, the resultant point is located on the boundary of the color reproduction range of the printer 11 expressed in the first RGB color space (for example, the resultant point is located at (R, G, B)=(0, 255, 0)).

A point with the same coordinates in the second RGB color space is then located on the boundary of the color reproduction range of the proofer 14 expressed in the second RGB color space, and a second reference coordinate point b obtained by mapping this point into the L*a*b* space is also located on the boundary of the color reproduction range 302 of the proofer 14 expressed in the L*a*b* space.

Subsequently, a basic difference vector v is determined which extends from the first reference coordinate point a to the second reference coordinate point b (step S45), and there is determined a second coordinate point s at which a line extending from the first coordinate point t in a direction parallel to the basic difference vector v intersects with a line extending from the reference coordinate transformation point c to the second reference coordinate point b (step S46).

The above-described coordinate transformation is performed sequentially over the entire region of the color reproduction range 102 of the printer 11 expressed in the L*a*b* space.

Figure 49:
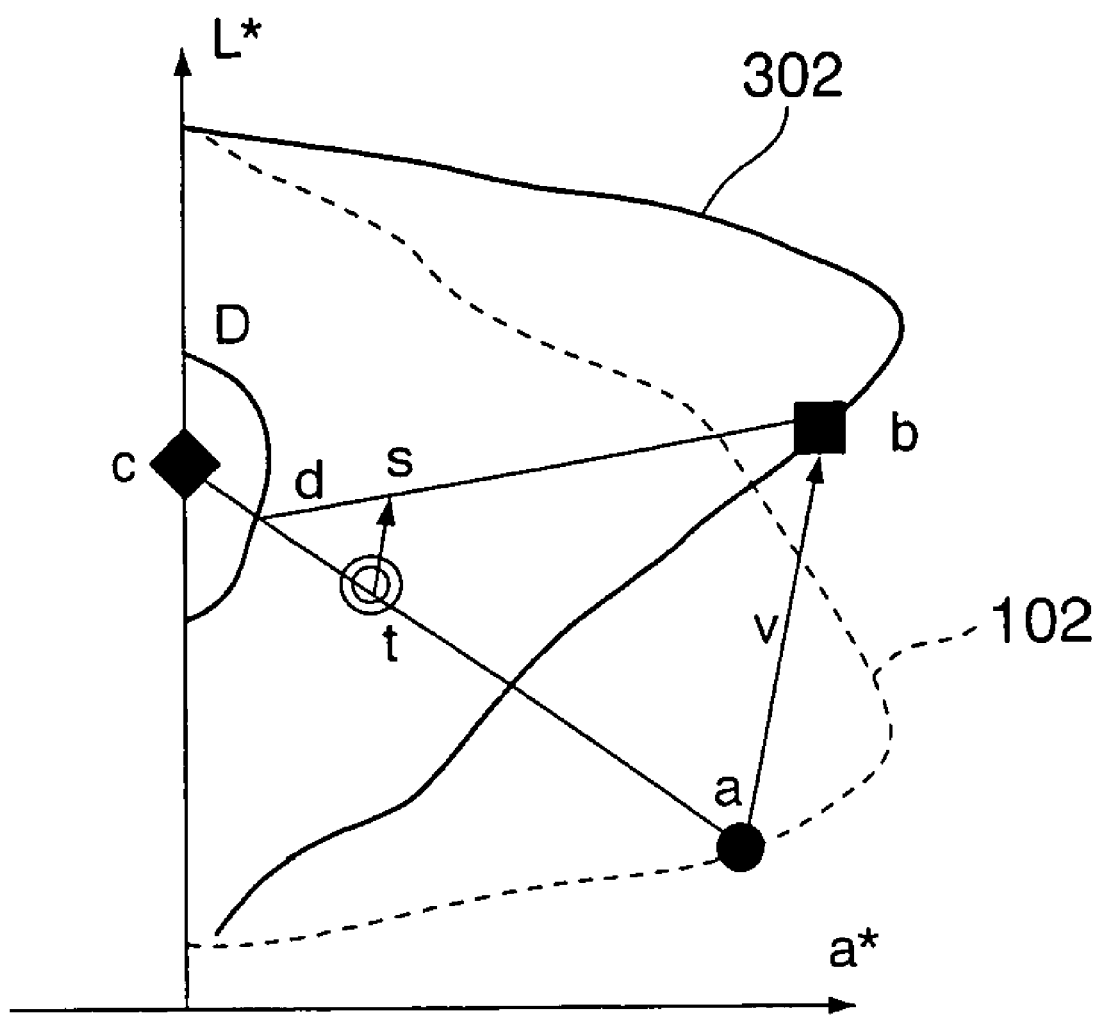
FIG. 49 is a diagram showing a modification to the example of the coordinate transformation shown in FIGS. 47 and 48.

FIG. 49 is a diagram showing a modification to the fourth example of the coordinate transformation described above with reference to FIGS. 47 and 48.

In this modified coordinate transformation process, in a similar manner as described above with reference to FIG. 39, 42, or 46, a region D is set around the reference coordinate transformation point c, so that points in the inside of the region D are maintained at their original position without being mapped. The technique to maintain points in the inside of the region D without being mapped is similar to those used in the examples shown in FIGS. 39, 42, and 46, although a further detailed description is not given herein.

Referring again to FIG. 33, a third coordinate transformation step (step b3) is described below.

In this third coordinate transformation step (step b3), after a coordinate transformation (mapping) is performed in the L*a*b* space from the color reproduction range 102 of the printer 11 to the color reproduction range 302 of the proofer 14, resultant coordinate points in the color reproduction range 302 of the proofer 14 are further mapped into the second RGB color space in accordance with the color reproduction characteristic (proofer profile) of the proofer 14.

In the case of the first color conversion definition step (step (B)) of the color conversion definition method shown in FIG. 4, the first color conversion is defined so as to convert coordinate points in the color reproduction range of the printer 11 expressed in the first RGB color space ($R_1G_1B_1$ color space) dependent on the printer 11 to coordinate points in the color reproduction range of the proofer 14 (which well simulates the color reproduction range of the printing system 12) expressed in the second RGB color space ($R_2G_2B_2$ color space) dependent on the virtual proofer 14 whose color reproduction range is substantially equal to the color reproduction range of the printing system 12.

In contrast, in the second color conversion definition step (step (C)) of the color conversion definition method shown in FIG. 4, the color conversion is defined as follows.

In the second color conversion definition step (step (C)), the steps of the profile production method shown in FIG. 6 are performed. More specifically, the K-value definition step (step (c1)), the K-value calculation step (step (c2)), and the K-value constraint usage step (step (c3)) are performed, and by relating the proofer profile (FIG. 16) produced in the profile production step (step (A)) in FIG. 4 to CMYK, a link profile 54 (FIG. 17) is produced which defines the correspondence between coordinate points ($R_2G_2B_2$ values) in the second RGB color space and CMYK values.

First, in the K-value definition step (step (c1)), the K value is defined for each point on the gray axis and on ridgelines of the color reproduction range determined in the profile production process (step (A)) for the proofer 14, such that for each point on the gray axis, a K value determined according to a K-value constraint in printing ((K=K(C)) (FIG. 15) is employed, while for each point on ridgelines, a minimum value of K values usable in definition of coordinates in the CMYK color space, that is, a minimum value of K values defined in the printing-system profile 52 shown in FIG. 14 is employed.

More specifically, for each point on the gray axis on which R=G=B, a K value determined according to the K-value constraint K=K(C) is assigned.

For each point on ridgelines other than ridgelines extending from respective vertices of R, G, and B to a vertex of K, K=0 is employed because of general properties of ink.

For each point on three ridgelines extending from respective vertices of R, G, and B to the vertex of K, a minimum K value is selected from those that are defined in the printing-system profile 52 shown in FIG. 14 and that are usable to realize a L*a*b* value at the point of interest, and the selected minimum K value is employed for the point of interest.

For example, in the printing-system profile 52 shown in FIG. 14, if K values equal to or greater than 30 are usable to realize a L*a*b* value=$L_X^*a_X^*b_X^*$ at a point of interest on a ridgeline (that is, $L_X^*a_X^*b_X^*$ cannot be realized by any combination of C, M, Y, and K values if K<29, but $L_X^*a_X^*b_X^*$ can be realized by using some combination of C, M, Y, and K values if K≧30), K=30 is employed.

After K values area assigned to respective points on the gray axis and respective points on each ridgeline in the K-value definition step (step (c1)) in FIG. 6, then in the K-value calculation step (step (c2)) in FIG. 6, a K value for each point on the surfaces of the color reproduction range of the proofer 14 other than points on the ridgelines and a K value for each point in the inside of the color reproduction range of the proofer 14 other than points on the gray axis are calculated by means of interpolation in which the K values determined in the K-value definition step for respective points on the ridgelines and points on the gray axis are used as a boundary condition. More specifically, coefficients $d_0$ to $d_9$ of the following quadratic are determined such that the quadratic best fits for the $R_2G_2B_2$ values of sample points on the gray axis and on the ridgelines of the color reproduction range.

$$K=d_0R_2^2+d_1G_2^2+d_2B_2^2+d_3R_2G_2+d_4G_2B_2+d_5B_2R_2+d_6R_2+d_7G_2+d_8B_2+d_9$$

In the determination of the coefficients, it is desirable that a weight as large as, for example, 1000 be assigned to respective sample points of $R_2=G_2=B_2$ (points on the gray axis) so that K values in regions close to the gray axis are strongly affected by K values on the gray axis and thus K values in such regions become substantially equal to the K values on the gray axis. This makes it possible to strictly satisfy the K-value constraint K=K(C) along the gray axis of the printer 11 even when there is a slight difference between the gray axis of the printer 11 used and the gray axis of the virtual proofer 14.

After K values have been assigned to respective points on the gray axis and respective points on each ridgeline in the K-value definition step (step (c1)) in FIG. 6, and then in the K-value calculation step (step c2) in FIG. 6, K values have been calculated over the entire color reproduction range using the K values determined in the K-value definition step as the boundary condition, a CMYK value is assigned to each point in the color reproduction range according to the printing-system profile 52 shown in FIG. 14 under the K-value constraint for each point of the color reproduction range.

In the profile production step (step (A)) in FIG. 4, the profile of the proofer 14 (proofer profile 53 (FIG. 16)) has been produced as described earlier. That is, a $R_2B_2G_2$ value dependent on the proofer 14 and a L*a*b* value independent of the proofer 14 are assigned to each point in the color reproduction range of the proofer 14. By further assigning a CMYK value for each point in the entire range of the proofer 14, a link profile 54 is produced which defines the correspondence between $R_2G_2B_2$ values dependent on the proofer 14 shown in FIG. 17 and CMYK values dependent on the printing system. This link profile 54 corresponds to color matching (second color conversion definition) in the color conversion apparatus 10 shown in FIG. 1.

Figure 50:
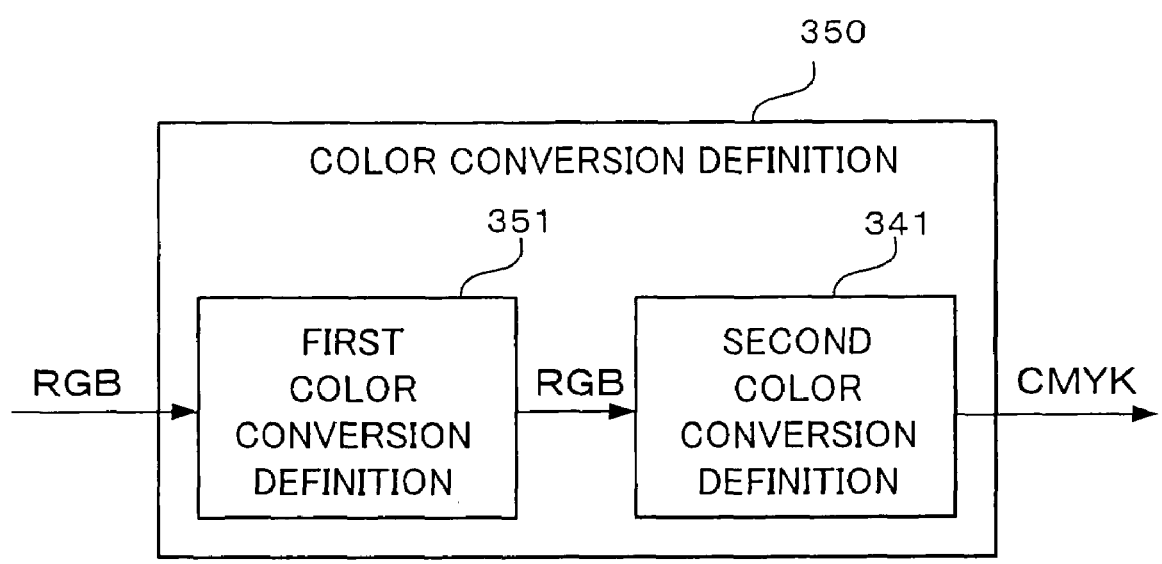
FIG. 50 is a conceptual diagram showing a color conversion definition including a first color conversion definition and a second color conversion definition.

FIG. 50 is a conceptual diagram showing the color conversion definition including the first color conversion definition and the second color conversion definition.

A color conversion definition 350 is produced which defines the correspondence between RGB data (indicating a coordinate point in the first RGB color space) intended for use by the printer and CMYK data for use in printing (data indicating a coordinate point in the CMYK color space indented for use by the printing system 12 (FIG. 1) by combining the first color conversion definition 351 determined in the first color conversion definition step in step (B) of in FIG. 4 and the second color conversion definition 341 determined in the second color conversion definition step in step (C) in FIG. 4. As described earlier, the resultant color conversion definition 350 is set in the color conversion apparatus 10 shown in FIG. 1, and the color conversion definition 350 set in the color conversion apparatus 10 is used to convert given RGB data representing an image and intended for use by the printer 11 to CMYK data for use in printing.

The CMYK data produced via the conversion using the color conversion definition 350 has a K value adapted for use by the printing system 12 (and thus the CMYK data is excellent in printability), and the difference between the color reproduction range of the printer 11 and the color reproduction range of printing system 12 is well accommodated. By using the CMYK data, it is possible to obtain a printed image 12a having colors very similar to colors of a printed image 11a printed by the printer 11 according to the RGB data intended for use by the printer 11.

Although in the embodiments described above, the printer 11 shown in FIG. 1 is employed as the first device according to the present invention, the first device used in the present invention is not limited to an output device such as the printer 11, but an input device such as a color scanner that scans an image and outputs RGB image data of the image may also be employed as the first device. For example, the present invention may be used to define a color conversion from RGB data obtained by the input device to CMYK data that is excellent in printability and that represents colors very similar to the colors of the original image from which the RGB data has been obtained.

In the embodiments described above, the proofer 14 shown in FIG. 1 is used as the second device according to the present invention. Note that the proofer 14 is employed only for illustration of the present invention, and any type of device having a color reproduction range very similar to the color reproduction range of the printing system 12 may be employed as the second device.

What is claimed is:

1. A color conversion definition apparatus that defines a color conversion from a coordinate point in a color reproduction range of a first device expressed in a first RGB color space dependent on the first device intervening between image data and an image to a coordinate point in a color reproduction range of printing expressed in a CMYK color space for use in printing, the apparatus comprising:

a profile production section that produces a virtual device profile between a second RGB color space and a reference color space, the second RGB color space being dependent on a virtual second device intervening between image data and an image, the virtual second device having a color reproduction range simulating the color reproduction range of printing;

a first color conversion definition section that defines a first color conversion from a coordinate point in the color reproduction range of the first device expressed in the first RGB color space to a coordinate point in the color reproduction range of the second device expressed in the second RGB color space, based on a device profile of the first device and the virtual device profile produced in the virtual device profile production section; and a second color conversion definition section that defines a second color conversion from a coordinate point in the second RGB color space within the color reproduction range of the second device to a coordinate point in the CMYK color space within the color reproduction range of printing, wherein the virtual device profile is produced such that:

a ridgeline profile is produced in which a ridgeline between two coordinate points in the color reproduction range of the second device in the second RGB space are related to a ridgeline between two corresponding coordinate points in the reference color space;

a gray axis profile is produced in which a coordinate point on a gray axis in the color reproduction range of the second device in the second RGB space is related to a corresponding coordinate point in the reference color space; and the virtual device profile is calculated by interpolating values corresponding to the ridgeline profile and gray axis profile as a boundary condition, and wherein the profile production section further comprises a color reproduction range definition section that defines the color reproduction range of the second device such that vertices of W, C, M, Y, R, G, and B in the color reproduction range of the second device coincide with corresponding vertices of W, C, M, Y, R, G, and B in the color reproduction range of printing, a ridgeline between any two vertices of W, C, M, Y, R, G, and B in the color reproduction range of the second device coincides with a ridgeline between two corresponding vertices in the color reproduction range of printing, a vertex of K in the color reproduction range of the second device is set at a point (C, M, Y, K)=(100, 100, 100, $K_{max}$) where $K_{max}$ is a maximum allowable value of K according to a K-value constraint, and ridgelines extend from the respective vertices of R, G, and B to the vertex of K of the color reproduction range of the second device in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100).

2. A color conversion definition apparatus according to claim 1, wherein the ridgeline profile is produced in which coordinates on ridgelines in the color reproduction range of the second device in the second RGB color space are related to coordinates in the reference color space such that when a plurality of points equally spaced from each other on an arbitrary boundary edge of the color reproduction range, defined by the color reproduction range definition section, of the second device in the second RGB color space are mapped onto the reference color space, the resultant mapped points in the reference color space are located on a ridgeline corresponding to the arbitrary boundary edge of the color reproduction range of the second device and spaced equally from each other; and wherein the virtual device profile is calculated in surface planes other than the ridgelines and in the inside of the color reproduction range of the second device by means of interpolation in which the produced ridgeline profile is used as a boundary condition.

3. A color conversion definition apparatus according to claim 2, wherein the gray axis profile is produced in which coordinates on the gray axis in the color reproduction range of the second device in the second RGB color space are related to coordinates in the reference color space such that when a plurality of points equally spaced from each other on the gray axis extending between two vertices of W and K in the color reproduction range, defined by the color reproduction range definition section, of the second device in the second RGB color space are mapped onto the reference color space, the resultant mapped points in the reference color space are located on a gray axis corresponding to the gray axis in the color reproduction range of the second device and spaced equally from each other, and wherein the virtual device profile is calculated in surface planes other than the ridgelines and in the inside of the color reproduction range of the second device by means of the interpolation in which the produced ridgeline profile and the produced gray axis profile are used as a boundary condition.

4. A profile production apparatus that produces a virtual device profile between a RGB color space and a reference color space, the RGB color space being dependent on a virtual device intervening between image data and an image, the virtual device having a color reproduction range simulating a color reproduction range of printing, the apparatus comprising: a color reproduction range definition section that defines a color reproduction range of the virtual device such that vertices of W, C, M, Y, R, G, and B in the color reproduction range of the device coincide with corresponding vertices of W, C, M, Y, R, G, and B in the color reproduction range of printing, a ridgeline between any two vertices of W, C, M, Y, R, G, and B in the color reproduction range of the second device coincides with a ridgeline between two corresponding vertices in the color reproduction range of printing, a vertex of K in the color reproduction range of the device is set at a point (C, M, Y, K)=(100, 100, 100, $K_{max}$) where $K_{max}$ is a maximum allowable value of K according to a K-value constraint, and ridgelines extend from the respective vertices of R, G, and B to the vertex of K of the color reproduction range of the device in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K) (100, 0, 100, 100), and (C, M, Y, K)=(100, 100, 0, 100).

5. A profile production apparatus according to claim 4, further comprising;
   a ridgeline profile production section that produces a ridgeline profile in which coordinates on ridge lines in the color reproduction range of the device in the RGB color space are related to coordinates in the reference color space such that when a plurality of points equally spaced from each other on an arbitrary boundary edge of the color reproduction range, defined by the color reproduction range definition section, of the device in the RGB color space are mapped onto the reference color space, the resultant mapped points in the reference color space are located on a ridgeline corresponding to the arbitrary boundary edge of the color reproduction range of the device and spaced equally from each other; and
   a profile calculation section that calculates a profile in surface planes other than ridgelines and in the inside of the color reproduction range of the device by means of interpolation in which the ridgeline profile produced by the ridgeline profile production section is used as a boundary condition.

6. A profile production apparatus according to claim 5, further comprising;
   a gray axis profile production section that produces a gray axis profile in which coordinates on a gray axis in the color reproduction range of the device in the RGB color space are related to coordinates in the reference color space such that when a plurality of points equally spaced from each other on the gray axis extending between two vertices of W and K in the color reproduction range, defined by the color reproduction range definition section, of the device in the RGB color space are mapped onto the reference color space, the resultant mapped points in the reference color space are located on a gray axis corresponding to the gray axis in the color reproduction range of the device and spaced equally from each other,
   wherein the profile calculation section calculates the profile in surface planes other than the ridgelines and in the inside of the color reproduction range of the second device by means of the interpolation in which the ridgeline profile produced by the ridgeline profile production section and the gray axis profile produced by the gray axis profile production section are used as a boundary condition.

7. A color conversion definition program storage medium which stores a color conversion definition program that is executed in an information processing apparatus whereby the information processing apparatus operates as a color conversion definition apparatus that defines a color conversion from a coordinate point in a color reproduction range of a first device expressed in a first RGB color space dependent on the first device intervening between image data and an image to a coordinate point in a color reproduction range of printing expressed in a CMYK color space of printing, the color conversion definition apparatus comprising:
   a profile production section that produces a virtual device profile between a second RGB color space and a reference color space, the second RGB color space being dependent on a virtual second device intervening between image data and an image, the virtual second device having a color reproduction range simulating the color reproduction range of printing;
   a first color conversion definition section that defines a first color conversion from a coordinate point in the first RGB color space within the color reproduction range of the first device to a coordinate point in the second RGB color space within the color reproduction range of the second device, based on a device profile of the first device and the virtual device profile produced in the virtual device profile production section; and
   a second color conversion definition section that defines a second color conversion from a coordinate point in the second RGB color space within the color reproduction range of the second device to a coordinate point in the CMYK color space within the color reproduction range of printing,
   wherein the virtual device profile is produced such that:
      a ridgeline profile is produced in which a ridgeline between two coordinate points in the color reproduction range of the second device in the second RGB space are related to a ridgeline between two corresponding coordinate points in the reference color space;
      a gray axis profile is produced in which a coordinate point on a gray axis in the color reproduction range of the second device in the second RGB space is related to a corresponding coordinate point in the reference color space; and
      the virtual device profile is calculated by interpolating values corresponding to the ridgeline profile and gray axis profile as a boundary condition, and
   wherein the profile production section further comprises a color reproduction range definition section that defines the color reproduction range of the second device such that vertices of W, C, M, Y, R, G, and B in the color reproduction range of the second device coincide with corresponding vertices of W, C, M, Y, R, G, and B in the color reproduction range of printing, a ridgeline between any two vertices of W, C, M, Y, R, G, and B in the color reproduction range of the second device coincides with a ridgeline between two corresponding vertices in the color reproduction range of printing, a vertex of K in the color reproduction range of the second device is set at a point (C, M, Y, K)=(100, 100, 100, $K_{max}$) where $K_{max}$ is a maximum allowable value of K according to a K-value constraint, and ridgelines extend from the respective vertices of R, G, and B to the vertex of K of the color reproduction range of the second device in such a manner that they first extend from the respective vertices of R, G, and B to midpoints along respective ridgelines toward vertices (C, M, Y, K)=(0, 100, 100, 100), (C, M, Y, K)=(100, 0, 100, 100), and (C, M, Y, K)=(100, 100, 0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100), 8. A profile production program storage medium which stores a profile production program that is executed in an information processing apparatus whereby the information processing apparatus operates as a profile production apparatus that produces a virtual device profile of, with respect to a reference color space, a RGB color space dependent on a virtual device intervening between image data and an image and having a color reproduction range simulating a color reproduction range in printing, the profile production apparatus including a color reproduction range definition section that defines a color reproduction range of the virtual device such that vertices of W, C, M, Y, R, G, and B in the color reproduction range of the device coincide with corresponding vertices of W, C, M, Y, R, G, and B in the color reproduction range of printing, a ridgeline between any two vertices of W, C, M, Y, R, G, and B in the color reproduction range of the second device coincides with a ridgeline between two corresponding vertices in the color reproduction range of printing, a vertex of K in the color reproduction range of the device is set at a point (C, M, Y, K)=(100, 100, 100, $K_{max}$) where $K_{max}$ is a maximum allowable value of K according to a K-value constraint, and ridgelines extend from the respective vertices of R, G, and B to the vertex of K of the color reproduction range of the device in such a manner that they first extend from the respective vertices of R, G, and B to midpoints along respective ridgelines toward vertices (C, M, Y, K)=(0, 100, 100, 100), (C, M, Y, K)=(100,0, 100, 100), and (C, M, Y, K)=(100, 100,0, 100), and further extend from the respective midpoints to the vertex of K set at (C, M, Y, K)=(100, 100, 100, $K_{max}$) deviating from the ridgelines toward (C, M, Y, K)=(0, 100, 100, 100), (C, M, Y, K)=(100, 0, 100, 100), and (C, M, Y, K)=(100, 100, 0, 100).

* * * * *